US011790595B2

(12) United States Patent
Laine et al.

(10) Patent No.: US 11,790,595 B2
(45) Date of Patent: *Oct. 17, 2023

(54) METHOD FOR HANDLING OF OUT-OF-ORDER OPAQUE AND ALPHA RAY/PRIMITIVE INTERSECTIONS

(71) Applicant: NVIDIA Corporation, Santa Clara, CA (US)

(72) Inventors: Samuli Laine, Uusimaa (FI); Tero Karras, Uusimaa (FI); Greg Muthler, Austin, TX (US); William Parsons Newhall, Jr., Woodside, CA (US); Ronald Charles Babich, Jr., Murrysville, PA (US); Ignacio Llamas, Palo Alto, CA (US); John Burgess, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,024

(22) Filed: Sep. 30, 2021

(65) Prior Publication Data

US 2022/0020202 A1    Jan. 20, 2022

Related U.S. Application Data

(63) Continuation of application No. 16/919,700, filed on Jul. 2, 2020, now Pat. No. 11,164,360, which is a
(Continued)

(51) Int. Cl.
*G06T 15/06* (2011.01)
*G06T 1/20* (2006.01)
*G06T 15/00* (2011.01)

(52) U.S. Cl.
CPC ............. *G06T 15/06* (2013.01); *G06T 1/20* (2013.01); *G06T 15/005* (2013.01); *G06T 2210/21* (2013.01)

(58) Field of Classification Search
CPC ......... G06T 15/005; G06T 15/06; G06T 1/20; G06T 2210/21
See application file for complete search history.

(56) References Cited

U.S. PATENT DOCUMENTS 6,489,955 B1    12/2002   Newhall, Jr.
6,760,024 B1    7/2004    Lokovic
(Continued)

OTHER PUBLICATIONS

U.S. Appl. No. 14/563,872, filed Dec. 8, 2014.
(Continued)

*Primary Examiner* — Daniel F Hajnik
(74) *Attorney, Agent, or Firm* — Nixon & Vanderhye, P.C.

(57) ABSTRACT

A hardware-based traversal coprocessor provides acceleration of tree traversal operations searching for intersections between primitives represented in a tree data structure and a ray. The primitives may include opaque and alpha triangles used in generating a virtual scene. The hardware-based traversal coprocessor is configured to determine primitives intersected by the ray, and return intersection information to a streaming multiprocessor for further processing. The hardware-based traversal coprocessor is configured to provide a deterministic result of intersected triangles regardless of the order that the memory subsystem returns triangle range blocks for processing, while opportunistically eliminating alpha intersections that lie further along the length of the ray than closer opaque intersections.

22 Claims, 43 Drawing Sheets

Related U.S. Application Data continuation of application No. 16/101,196, filed on Aug. 10, 2018, now Pat. No. 10,740,952.

(56) References Cited

U.S. PATENT DOCUMENTS

| | | | |
|---|---|---|---|
| 8,059,122 B1* | 11/2011 | MacGillivray | G06T 15/06 345/424 |
| 8,773,422 B1 | 7/2014 | Garland et al. | |
| 9,552,664 B2 | 1/2017 | Laine et al. | |
| 9,569,559 B2 | 2/2017 | Karras et al. | |
| 9,582,607 B2 | 2/2017 | Laine et al. | |
| 9,607,426 B1 | 3/2017 | Peterson | |
| 10,025,879 B2 | 7/2018 | Karras et al. | |
| 10,235,338 B2 | 3/2019 | Laine et al. | |
| 2004/0125103 A1 | 7/2004 | Kaufman et al. | |
| 2011/0285710 A1* | 11/2011 | Mejdrich | G06T 15/06 345/426 |
| 2014/0078143 A1 | 3/2014 | Lee et al. | |
| 2016/0070767 A1 | 3/2016 | Karras et al. | |
| 2016/0070820 A1 | 3/2016 | Laine et al. | |
| 2016/0071234 A1 | 3/2016 | Lehtinen et al. | |
| 2016/0071310 A1 | 3/2016 | Karras et al. | |
| 2016/0071313 A1 | 3/2016 | Laine et al. | |
| 2018/0089885 A1 | 3/2018 | Wald | |
| 2018/0225862 A1 | 8/2018 | Petkov | |
| 2019/0019326 A1 | 1/2019 | Clark et al. | |
| 2019/0057539 A1 | 2/2019 | Stanard et al. | |

OTHER PUBLICATIONS

U.S. Appl. No. 14/697,480, filed Apr. 27, 2015.
U.S. Appl. No. 14/737,343, filed Jun. 11, 2015.
U.S. Appl. No. 16/101,066, filed Aug. 10, 2018.
U.S. Appl. No. 16/101,109, filed Aug. 10, 2018.
U.S. Appl. No. 16/101,148, filed Aug. 10, 2018.
U.S. Appl. No. 16/101,180, filed Aug. 10, 2018.
U.S. Appl. No. 16/101,232, filed Aug. 10, 2018.
U.S. Appl. No. 16/101,247, filed Aug. 10, 2018.

IEEE 754-2008 Standard for Floating-Point Arithmetic, Aug. 29, 2008, 70 pages.
The Cg Tutorial, Chapter 7, "Environment Mapping Techniques," NVIDIA Corporation, 2003, 32 pages.
Akenine-Möller, Tomas, et al., "Real-Time Rendering," Section 9.8.2, Third Edition CRC Press, 2008, p. 412.
Appel, Arthur, "Some techniques for shading machine renderings of solids," AFIPS Conference Proceedings: 1968 Spring Joint Computer Conference, 9 pages.
Foley, James D., et al., "Computer Graphics: Principles and Practice," 2nd Edition Addison-Wesley 1996 and 3rd Edition Addison-Wesley 2014.
Glassner, Andrew, "An Introduction to Ray Tracing," Morgan Kaufmann, 1989.
Hall, Daniel, "Advanced Rendering Technology," Graphics Hardware 2001, 7 pages.
Hery, Christophe, et al., "Towards Bidirectional Path Tracing at Pixar," 2016, 20 pages.
Kajiya, James T., "The Rendering Equation," SIGGRAPH, vol. 20, No. 4, 1986, pp. 143-150.
Parker, Steven G., et al., "OptiX: A General Purpose Ray Tracing Engine," ACM Transactions on Graphics, vol. 29, Issue 4, Article No. 66, Jul. 2010, 13 pages.
Quinnell, Eric Charles, "Floating-Point Fused Multiply-Add Architectures," Dissertation, University of Texas at Austin, 2007, 163 pages.
Stich, Martin, "Introduction to NVIDIA RTX and DirectX Ray Tracing," NVIDIA Developer Blog, Mar. 19, 2018, 13 pages.
Whitted, Turner, "An Improved Illumination Model for Shaded Display," Communications of the ACM, vol. 23, No. 6, Jun. 1990, pp. 343-349.
Woop, Sven, "A Ray Tracing Hardware Architecture for Dynamic Scenes," Thesis, Universität des Saarlandes, 2004, 100 pages.
Woop, Sven, et al., "RPU: A Programmable Ray Processing Unit for Realtime Ray Tracing," ACM Transactions on Graphics, Jul. 2005, 11 pages.
Woop, Sven, et al., "Watertight Ray/Triangle Intersection," Journal of Computer Graphics Techniques, vol. 2, No. 1, 2013, pp. 65-82.
Office Action dated Jul. 11, 2019, issued in U.S. Appl. No. 16/101,066.

* cited by examiner

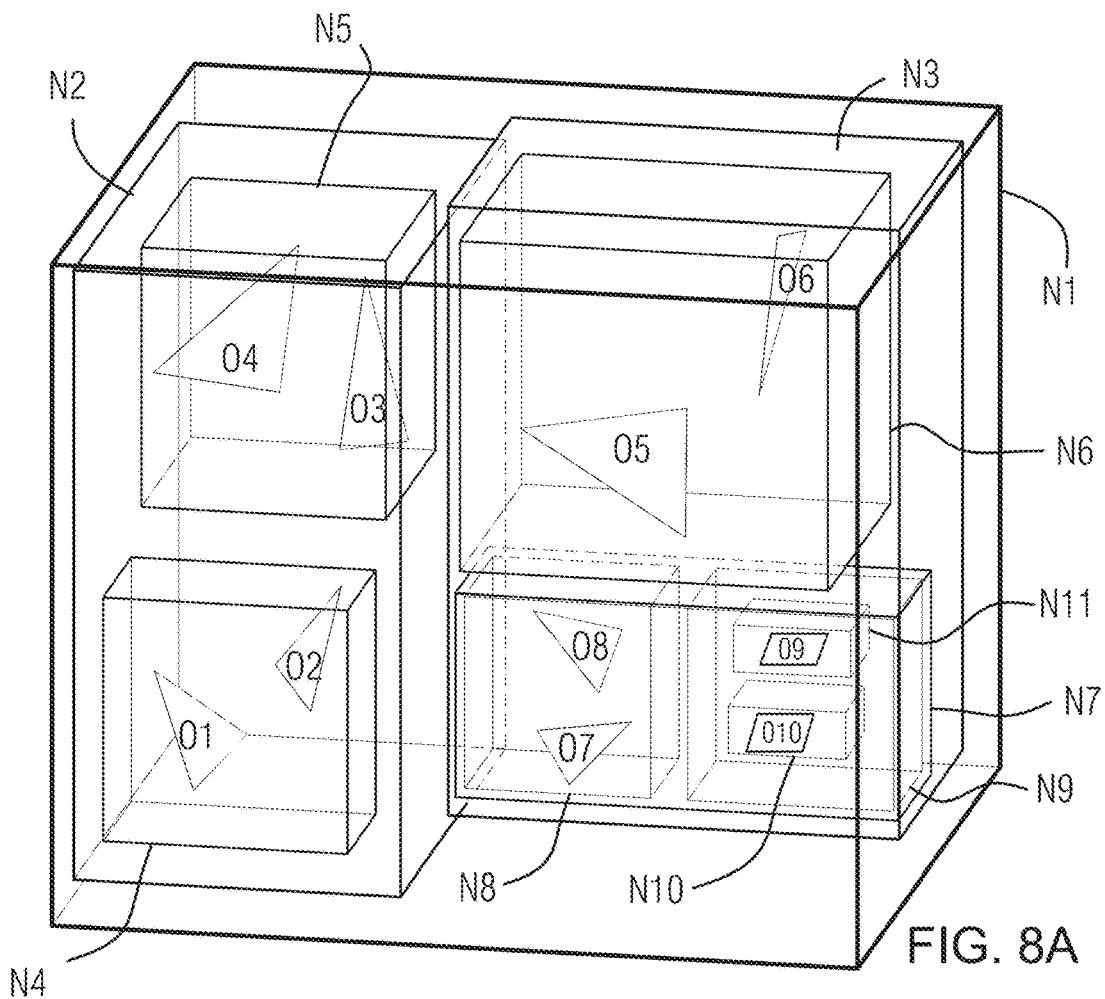
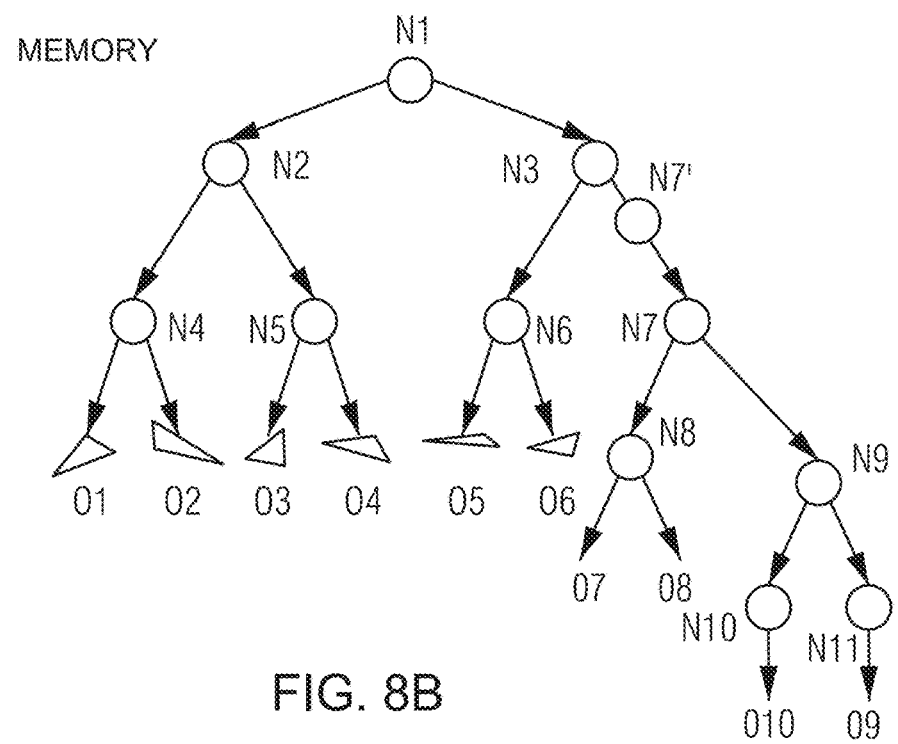
FIG. 8B

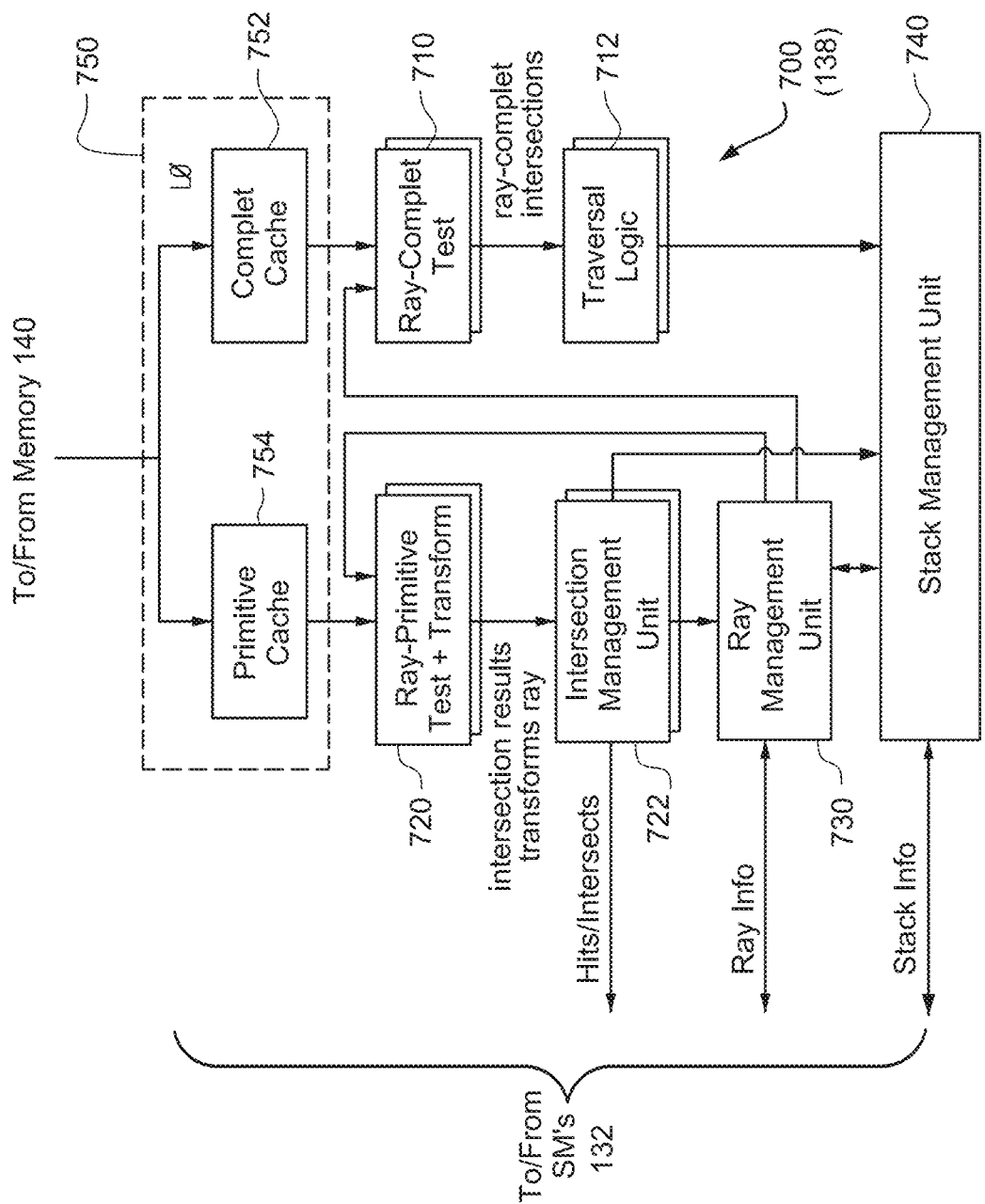
FIG. 9 TRAVERSAL COPROCESSOR

Example Ray Tracing Shading Pipeline

TTU Processing

Example Process To Generate an Image

Example Parallel Processing Unit

Example Memory Partition Unit

Example General Processing Cluster

Graphics Processing Pipeline

Example Streaming Multiprocessor

Example Streaming Multiprocessor

METHOD FOR HANDLING OF OUT-OF-ORDER OPAQUE AND ALPHA RAY/PRIMITIVE INTERSECTIONS

CROSS-REFERENCE TO RELATED PATENTS AND APPLICATIONS

This application is a continuation of U.S. application Ser. No. 16/919,700, filed Jul. 2, 2020 which is a continuation of U.S. application Ser. No. 16/101,196, filed Aug. 10, 2018, now U.S. Pat. No. 10,740,952, issued Aug. 11, 2020, which is hereby incorporated by reference and is related to the following commonly-assigned US patents and patent applications, the entire contents of each of which are incorporated by reference: U.S. application Ser. No. 14/563,872 titled "Short Stack Traversal of Tree Data Structures" filed Dec. 8, 2014; U.S. Pat. No. 9,582,607 titled "Block-Based Bounding Volume Hierarchy"; U.S. Pat. No. 9,552,664 titled "Relative Encoding For A Block-Based Bounding Volume Hierarchy" as; U.S. Pat. No. 9,569,559 titled "Beam Tracing" filed Mar. 18, 2015; U.S. Pat. No. 10,025,879 titled "Tree Data Structures Based on a Plurality of Local Coordinate Systems"; US application Ser. No. 14/737,343 titled "Block-Based Lossless Compression of Geometric Data" filed Jun. 11, 2015; and the following US Applications filed concurrently herewith:

U.S. patent application Ser. No. 16/101,066 titled "Method for Continued Bounding Volume Hierarchy Traversal on Intersection without Shader Intervention";

U.S. patent application Ser. No. 16/101,109 titled "Method for Efficient Grouping of Cache Requests for Datapath Scheduling";

U.S. patent application Ser. No. 16/101,247 titled "A Robust, Efficient Multiprocessor-Coprocessor Interface";

U.S. patent application Ser. No. 16/101,180 titled "Query-Specific Behavioral Modification of Tree Traversal";

U.S. patent application Ser. No. 16/101,148 titled "Watertight Ray Triangle Intersection"; and U.S. patent application Ser. No. 16/101,232 titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. Still more particularly, the example non-limiting technology herein relates to a hardware-based traversal coprocessor that efficiently traverses an acceleration data structure e.g., for real time ray tracing. In still more detail, the technology herein provides an improved hardware-based traversal coprocessor for handling out-or-order opaque and alpha ray-primitive intersections. The improved hardware-based traversal coprocessor may be configured to provide a deterministic result of intersected primitives regardless of the order that the memory subsystem returns primitive range blocks for processing, while opportunistically eliminating alpha intersections that lie further along the length of the ray than closer opaque intersections.

BACKGROUND & SUMMARY

If you look around the visual scene before you, you will notice that some of the most interesting visual effects you see are produced by light rays interacting with surfaces. This is because light is the only thing we see. We don't see objects—we see the light that is reflected or refracted by the objects. Most of the objects we can see reflect light (the color of an object is determined by which parts of light the object reflects and which parts it absorbs). Shiny surfaces such as metallic surfaces, glossy surfaces, ceramics, the surfaces of liquids and a variety of others (even the corneas of the human eyes) act as mirrors that specularly reflect light. For example, a shiny metal surface will reflect light at the same angle as it hit the surface. An object can also cast shadows by preventing light from reaching other surfaces that are behind the object relative to a light source. If you look around, you will notice that the number and kinds of reflections and the number, kinds and lengths of shadows depend on many factors including the number and type of lights in the scene. A single point light such as a single faraway light bulb will produce single reflections and hard shadows. Area light sources such as windows or light panels produce different kinds of reflection highlights and softer shadows. Multiple lights will typically produce multiple reflections and more complex shadows (for example, three separated point light sources will produce three shadows which may overlap depending on the positions of the lights relative to an object).

If you move your head as you survey the scene, you will notice that the reflections change in position and shape (the shadows do the same). By changing your viewpoint, you are changing the various angles of the light rays your eyes detect. This occurs instantaneously—you move your head and the visual scene changes immediately.

The simple act of drinking a cup of tea is a complex visual experience. The various shiny surfaces of the glossy ceramic cup on the table before you reflect each light in the room, and the cup casts a shadow for each light. The moving surface of the tea in the cup is itself reflective. You can see small reflected images of the lights on the tea's surface, and even smaller reflections on the part of the tea's surface where the liquid curves up to meet the walls of the cup. The cup walls also cast shadows onto the surface of the liquid in the cup. Lifting the cup to your mouth causes these reflections and shadows to shift and shimmer as your viewpoint changes and as the surface of the liquid is agitated by movement.

We take these complexities of reflections and shadows for granted. Our brains are adept at decoding the positions, sizes and shapes of shadows and reflections and using them as visual cues. This is in part how we discern the position of objects relative to one another, how we distinguish one object from another and how we learn what objects are made of. Different object surfaces reflect differently. Specular (mirror type) reflection of hard metal creates images of reflected objects, while diffuse reflection off of rough surfaces is responsible for color and lights up objects in a softer way. Shadows can be soft and diffuse or hard and distinct depending on the type of lighting, and the lengths and directions of the shadows will depend on the angle of the light rays relative to the object and our eyes.

Beginning artists typically don't try to show reflection or shadows. They tend to draw flat scenes that have no shadows and no reflections or highlights. The same was true with computer graphics of the past.

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $\frac{1}{30}^{th}$ or $\frac{1}{60}^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

Some have built other technologies onto this basic scan conversion rasterization approach to allow real time graphics systems to accomplish a certain amount of realism in rendering shadows and reflections. For example, texture mapping has sometimes been used to simulate reflections and shadows in a 3D scene. One way this is commonly done is to transform, project and rasterize objects from different perspectives, write the rasterized results into texture maps, and sample the texture maps to provide reflection mapping, environment mapping and shadowing. While these techniques have proven to be useful and moderately successful, they do not work well in all situations. For example, so-called "environment mapping" may often require assuming the environment is infinitely distant from the object. In addition, an environment-mapped object may typically be unable to reflect itself. See e.g., http://developer.download-.nvdia.com/CgTutorial/cg_tutorial_chapter07.html. These limitations result because conventional computer graphics hardware—while sufficiently fast for excellent polygon rendering—does not perform the light visualization needed for accurate and realistic reflections and shadows. Some have likened raster/texture approximations of reflections and shadows as the visual equivalent of AM radio.

There is another graphics technology which does perform physically realistic visibility determinations for reflection and shadowing. It is called "ray tracing". Ray tracing was developed at the end of the 1960's and was improved upon in the 1980's. See e.g., Apple, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

Much research has been done on making the process of tracing rays more efficient and timely. See e.g., Glassner, An Introduction to Ray Tracing (Academic Press Inc., 1989). Because each ray in ray tracing is, by its nature, evaluated independently from the rest, ray tracing has been called "embarrassingly parallel." See e.g., Akenine-Möller et al., Real Time Rendering at Section 9.8.2, page 412 (Third Ed. CRC Press 2008). As discussed above, ray tracing involves effectively testing each ray against all objects and surfaces in the scene. An optimization called "acceleration data structure" and associated processes allows the graphics system to use a "divide-and-conquer" approach across the acceleration data structure to establish what surfaces the ray hits and what surfaces the ray does not hit. Each ray traverses the acceleration data structure in an individualistic way. This means that dedicating more processors to ray tracing gives a nearly linear performance increase. With increasing parallelism of graphics processing systems, some began envisioning the possibility that ray tracing could be performed in real time. For example, work at Saarland University in the mid-2000's produced an early special purpose hardware system for interactive ray tracing that provided some degree of programmability for using geometry, vertex and lighting shaders. See Woop et al., "RPU: A Programmable Ray Processing Unit for Real Time Ray Tracing" (ACM 2005). As another example, Advanced Rendering Technology developed "RenderDrive" based on an array of AR250/350 rendering processors derived from ARM1 and enhanced with custom pipelines for ray/triangle intersection and SIMD vector and texture math but with no fixed-function traversal logic. See e.g., http://www.graphicshardware.org/previous/www_2001/presentations/Hot3D_Daniel_Hall.pdf Then, in 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US20160070820; and US20160070767.

Given the great potential of a truly interactive real time ray tracing graphics processing system for rendering high quality images of arbitrary complexity in response for example to user input, further work is possible and desirable.

Need for Efficient Dynamic Interaction Between Components Performing Ray Tracing In some contexts, it may be helpful to report results of an investigation in a particular fashion. Suppose for example that a boss asks an employee to investigate venues for a company summer picnic. The boss lists several criteria she's interested in: availability on certain weekends, cost, convenient location, adequate parking, whether there is a playground, whether there is a pool, whether there is a softball field, etc. The employee calls around, visits some of the sites, and now wants to provide his boss with the results of his investigation.

In what order should the employee provide the results? In the order the employee visited the sites? In the order the employee liked the venues? The employee and the boss can have a conversation and discuss the results, so perhaps the order of reporting is not so important. But now suppose the boss asks the employee to write a report summarizing his findings so a committee of middle managers can decide on the venue. Now, the order in which the employee provides the results becomes more important. Reporting in a random order or in an order known only to the employee is less efficient and could cause confusion.

Often, computers may perform operations and calculate results in orders that cannot be predicted in advance. For example, sometimes a processor needs to wait on a certain resource (e.g., memory contents) becoming available before completing a task, but may be able to make forward progress on another task while it is waiting. Sometimes, the most efficient algorithm or process for the computer to use to perform a task is not the order in which the tasks were requested but rather a completely different order that is known only to the computer. This is especially true in contexts such as computer graphics ray tracers that require a processor to traverse a potentially very large and complicated graph such as a bounding volume hierarchy to discover which parts of certain geometry the ray intersects. The order in which the processor traverses the graph may depend on a lot of variables including for example how the graph is constructed, how it is stored in memory, which parts of the graph are intersected by the ray, what range of primitives are relevant, the characteristics of the primitives found to intersect the ray, and so on.

Much work has been done in devising more efficient ways for ray tracing shaders and pipelines to communicate. However, efficient dynamic interaction between streaming multiprocessors and a traversal coprocessor is a complex matter in which further improvements are possible and desirable.

BRIEF DESCRIPTION OF THE DRAWINGS

FIG. 8A illustrates an example non-limiting bounding volume hierarchy (BVH).

FIG. 8B shows an example acceleration data structure in the form of a graph or tree.

FIG. 9 shows a simplified example non-limiting traversal co-processor comprising a tree traversal unit (TTU).

DETAILED DESCRIPTION OF NON-LIMITING EMBODIMENTS

Figure 1:
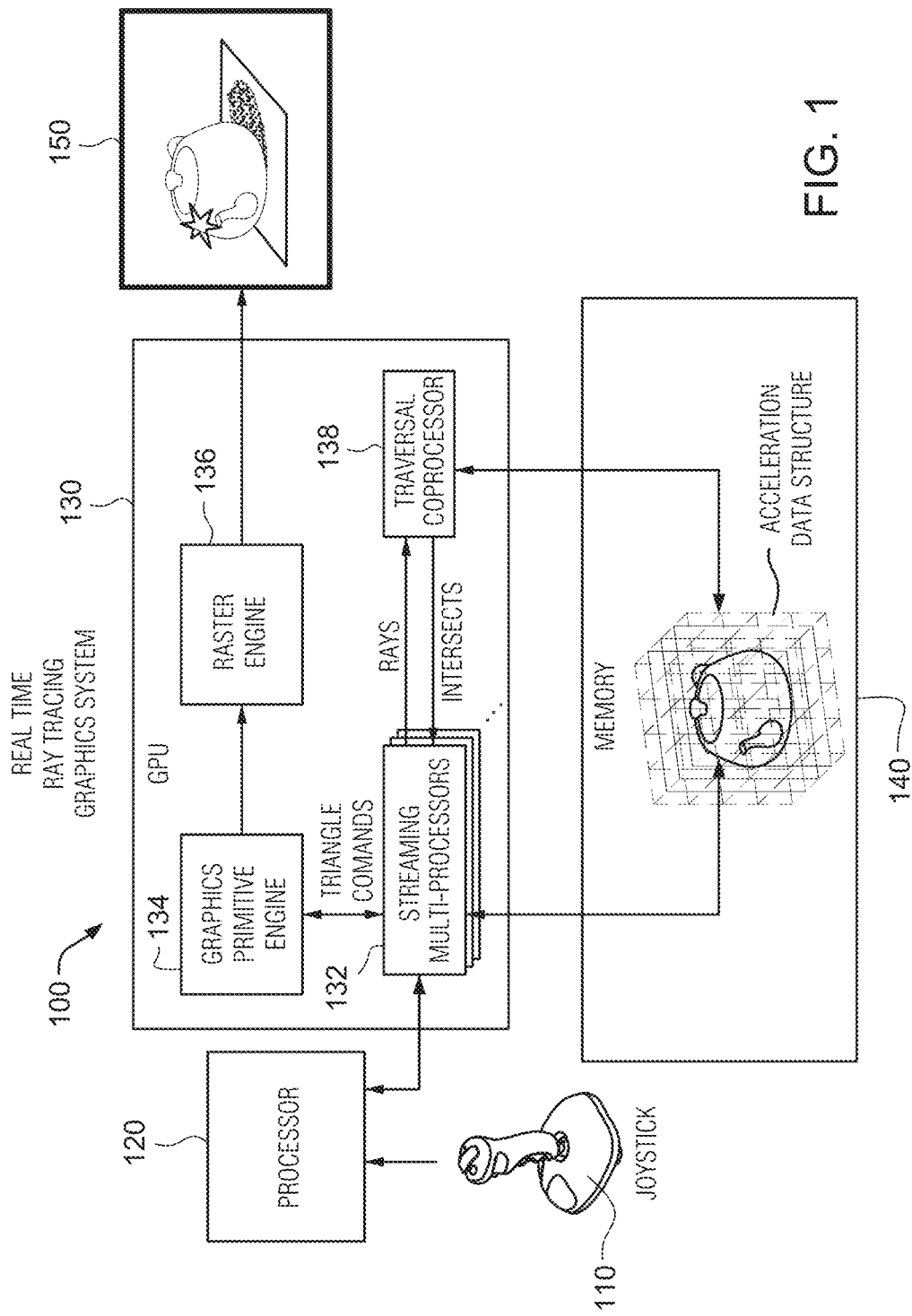
FIG. 1 illustrates an example non-limiting ray tracing graphics system.

The technology herein provides hardware capabilities that accelerate ray tracing to such an extent that it brings the power of ray tracing to games and other interactive real time computer graphics, initially enabling high effect quality in shadows and reflections and ultimately global illumination. In practice, this means accelerating ray tracing by a factor of up to an order of magnitude or more over what would be possible in software on the same graphics rendering system.

In more detail, the example non-limiting technology provides dedicated hardware to accelerate ray tracing. In non-limiting embodiments, a hardware co-processor (herein referred to as a "traversal coprocessor" or in some embodiments a "tree traversal unit" or "TTU") accelerates certain processes supporting interactive ray tracing including ray-bounding volume intersection tests, ray-primitive intersection tests and ray "instance" transforms.

In some non-limiting embodiments, the traversal co-processor performs queries on an acceleration data structure for processes running on potentially massively-parallel streaming multiprocessors (SMs). The traversal co-processor traverses the acceleration data structure to discover information about how a given ray interacts with an object the acceleration data structure describes or represents. For ray tracing, the traversal coprocessors are callable as opposed to e.g., fixed function units that perform an operation once between logical pipeline stages running different types of threads (e.g., vertex threads and pixel threads).

In some non-limiting embodiments, the acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor tests rays against the primitives to determine which object surfaces the rays intersect and which object surfaces are visible along the ray.

The traversal co-processor performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached. Once the traversal co-processor traverses the acceleration data structure to reach a terminal or "leaf" node that contains a geometric primitive, it performs an accelerated ray-primitive intersection test that determines whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray).

The traversal co-processor also accelerates the transform of each ray from world space into object space to obtain finer and finer bounding box encapsulations of the primitives and reduce the duplication of those primitives across the scene. Objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

The presently disclosed non-limiting embodiments thus provide a traversal co-processor, a new subunit of one or a group of streaming multiprocessor SMs of a 3D graphics processing pipeline. In order to understand where the traversal co-processor fits in the overall picture, it may be helpful to understand a few fundamentals of the algorithm employed by most or all modern ray tracers. But it should be pointed out that the technology herein provides a generic capability to determine, for a thread running in a GPU, what the nearest visible thing is from a given point along a specified direction, or if anything lies between two points. A common use case for such capability will be in processes that start tracing rays from points that have already been rasterized on triangles using conventional scan conversion techniques. The disclosed technology can but does not necessarily replace or substitute for scan conversion technology, and may often augment it and be used in conjunction with scan conversion techniques to enhance images with photorealistic reflections, shadows and other effects.

Ray Tracing Techniques

Generally, ray tracing is a rendering method in which rays are used to determine the visibility of various elements in the scene. Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. See Akenine-Möller et al., cited above. Ray tracing technology thus allows a graphics system to develop physically correct reflections and shadows that are not subject to the limitations and artifacts of scan conversion techniques.

Traversal Coprocessor

The basic task the traversal coprocessor performs is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. By pre-processing the scene geometry and building a suitable acceleration data structure in advance, however, it is possible to reduce the average-case complexity to O(log n). In ray tracing, the time for finding the closest (or for shadows, any) intersection for a ray is typically order O(log n) for n objects when an acceleration data structure is used. For example, bounding volume hierarchies (BVHs) of the type commonly used for modern ray tracing acceleration data structures typically have an O(log n) search behavior.

Bounding Volume Hierarchies

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In such instances, the traversal coprocessor may be called a "tree traversal unit" or "TTU".

Given a BVH, ray tracing amounts to a tree search where each node in the tree visited by the ray has a bounding volume for each descendent branch or leaf, and the ray only visits the descendent branches or leaves whose corresponding bound volume it intersects. In this way, only a small number of primitives must be explicitly tested for intersection, namely those that reside in leaf nodes intersected by the ray. In the example non-limiting embodiments, the traversal coprocessor accelerates both tree traversal (including the ray-volume tests) and ray-primitive tests. As part of traversal, the traversal coprocessor can also handle "instance transforms"—transforming a ray from world-space coordinates into the coordinate system of an instanced mesh (object space) e.g., in order to avoid the computational complexity of transforming the primitive vertices into world space. It can do so in a MIMD (multiple-instruction, multiple data) fashion, meaning that the rays are handled independently once inside the traversal coprocessor.

Example Non-Limiting Real Time Interactive Ray Tracing System

FIG. 1 illustrates an example real time ray interactive tracing graphics system 100 for generating images using three dimensional (3D) data of a scene or object(s). System 100 includes an input device 110, a processor(s) 120, a graphics processing unit(s) (GPU(s)) 130, memory 140, and a display(s) 150. The system shown in FIG. 1 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable streaming multiprocessors (SMs) 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

Traversal Coprocessor Addition to Architecture

To enable the GPU 130 to perform ray tracing in real time in an efficient manner, the GPU is provided with traversal coprocessor 138 coupled to one or more SMs 132. The traversal coprocessor 138 includes hardware components configured to perform operations commonly utilized in ray tracing algorithms. A goal of the traversal coprocessor 138 is to accelerate operations used in ray tracing to such an extent that it brings the power of ray tracing to real-time graphics application (e.g., games), enabling high-quality shadows, reflections, and global illumination. As discussed in more detail below, the result of the traversal coprocessor 138 may be used together with or as an alternative to other graphics related operations performed in the GPU 130.

In the example architecture shown, the new hardware component called a "traversal coprocessor" 138 is used to accelerate certain tasks including but not limited to ray tracing. Ray tracing refers to casting a ray into a scene and determining whether and where that ray intersects the scene's geometry. This basic ray tracing visibility test is the fundamental primitive underlying a variety of rendering algorithms and techniques in computer graphics. For example, ray tracing can be used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". To overcome limitations in image quality that can be achieved with rasterization, system 100 can also generate entire images or parts of images using ray tracing techniques. Ray tracing may also be used as the basic primitive to accurately simulate light transport in physically-based rendering algorithms such as path tracing, photon mapping, Metropolis light transport, and other light transport algorithms.

More specifically, SMs 132 and the traversal coprocessor 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with traversal coprocessor 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the traversal coprocessor 138 is capable of accelerating in hardware certain of the more computationally-intensive aspects of that process.

In the example non-limiting technology herein, traversal coprocessor 138 accelerates both ray-box tests and ray-primitive tests. As part of traversal, it can also handle at least one level of instance transforms, transforming a ray from world-space coordinates into the coordinate system of an instanced mesh. In the example non-limiting embodiments, the traversal coprocessor 138 does all of this in MIMD fashion, meaning that rays are handled independently once inside the traversal coprocessor.

In the example non-limiting embodiments, the traversal coprocessor 138 operates as a servant (coprocessor) to the SMs (streaming multiprocessors) 132. In other words, the traversal coprocessor 138 in example non-limiting embodiments does not operate independently, but instead follows the commands of the SMs 132 to perform certain computationally-intensive ray tracing related tasks much more efficiently than the SMs 132 could perform themselves.

In the examples shown, the traversal coprocessor 138 receives commands via SM 132 instructions and writes results back to an SM register file. For many common use cases (e.g., opaque triangles with at most one level of instancing), the traversal coprocessor 138 can service the ray tracing query without further interaction with the SM 132. More complicated queries (e.g., involving alpha-tested triangles, primitives other than triangles, or multiple levels of instancing) may require multiple round trips. In addition to tracing rays, the traversal coprocessor 138 is capable of performing more general spatial queries where an AABB or the extruded volume between two AABBs (which we call a "beam") takes the place of the ray. Thus, while the traversal coprocessor 138 is especially adapted to accelerate ray tracing related tasks, it can also be used to perform tasks other than ray tracing.

In addition to the traversal coprocessor 138, the example non-limiting technology used to support the system 100 of FIG. 1 provides additional accelerated ray tracing enhancements to a number of units as well as a substantial effort devoted to BVH construction. BVH construction need not be hardware accelerated (although it may be in some non-limiting embodiments) but could instead be implemented using highly-optimized software routines running on SMs 132 and/or CPU 120 and/or other development systems e.g., during development of an application. The following exposition describes, among other things, software-visible behavior of the traversal coprocessor 138, interfaces to surrounding units (SMs 132 and the memory subsystem), and additional features that are part of a complete ray-tracing solution such as certain enhancements to the group of SMs 132 and the memory caching system.

In example non-limiting embodiments, the traversal coprocessor 138 allows for quick traversal of an acceleration data structure (e.g., a BVH) to determine which primitives (e.g., triangles used for generating a scene) in the data structure are intersected by a query data structure (e.g., a ray). The traversal coprocessor 138 provides solutions for problems related to the practice of TTU-accelerated ray-traced rendering in a software application running on a GPU. Exemplary non-limiting embodiments of this disclosure, may extend, for example, the Tree Traversal Unit (TTU) described in U.S. Pat. No. 9,582,607 and the beam tracing method described in U.S. Pat. No. 9,569,559 to support mid-traversal ray/triangle intersection such that triangles can be handled directly by the TTU without requiring SM intervention, thus avoiding frequent costly synchronizations which may be needed without exemplary non-limiting embodiments of this disclosure. U.S. Pat. Nos. 9,582,607 and 9,569,559 are incorporated by reference.

In the example non-limiting embodiments, the traversal coprocessor 138 allows for quick traversal of an acceleration data structure (e.g., a BVH) to determine which primitives (e.g., triangles used for generating a scene) in the data structure are intersected by a query data structure (e.g., a ray). For example, the traversal coprocessor 138 may determine which triangles in the acceleration data structure are intersected by the ray and return a closest opaque hit and/or one or more alpha hits to the SM 132. Because returning a result to the SM 132 on every triangle intersection is costly in terms of interface and thread synchronization, the traversal coprocessor 138 may omit some of the intersected triangles from the results provided to the SM 132. The omitted triangles may only include triangles that are provably capable of being omitted without a functional impact on visualizing the virtual scene.

The traversal coprocessor 138 may include a result queue for storing intersection information of intersected primitives until the intersection results are returned to the SM 132. In some cases, the result queue may be filled with intersections before all of the primitives in the primitive range are tested. When the result queue is filled with results and an additional intersected primitive is identified, the traversal coprocessor 138 may return the intersection information in the result queue to the SM 132 and receive an updated query from the SM 132 to continue testing the primitive range for additional intersections with the ray.

The primitive range may be spread out over multiple cache line sized blocks stored in memory. Upon request to test the primitive range for ray-primitive intersections, the blocks are supplied to the traversal coprocessor 138 for processing. Due to the hierarchy of the memory system 140 the blocks may be provided to the traversal coprocessor 138 for processing in random order. One option is for the traversal coprocessor 138 to receive all of the blocks before starting the primitive intersection test so that the blocks may be processed in the order they are stored in memory. This approach will identify the intersected primitives in the order they are stored in memory and transmit a deterministic result to the SM 132. However, waiting for all of the blocks to be retrieved from the memory 140 before initiating the primitive intersection test is time consuming and may not provide the processing speeds needed for real-time ray processing.

In some example non-limiting embodiments, the traversal coprocessor 138 may process the blocks as they are received from memory 140 instead of waiting for all of the blocks to be received and processing the blocks in memory order. However, processing the blocks in the order they are received from memory may not provide deterministic results. In particular, deterministic results may not be provided when the triangles are processed out of memory order and multiple returns of the intersection results need to be made to the SM 132 due to a small size of the result queue.

For example, if the same query is processed by the traversal coprocessor 138, the intersected primitives may be determined and identified to the SM 132 in a different order each time because each time the blocks may be supplied to the TTU 700 in a different order. Because the SM 132 is configured to use the intersection results to perform further processing and/or issue additional intersection queries as the intersection results are received, the SM 132 may not be able to ensure reliable image quality and stability in scenes when the results are not provided in a deterministic manner.

To produce stable images without objectionable artifacts, the traversal coprocessor 138 may be configured to perform the traversal that produces a deterministic result for a query given a ray and a primitive range containing a mixture of opaque and alpha primitives spanning multiple blocks regardless of the order that the memory subsystem returns those blocks to the co-processor. Example non-limiting embodiments provide a traversal coprocessor 138 configured to produce deterministic intersection results regardless of the order that the memory 140 returns the blocks with primitives to the traversal coprocessor 132, while opportunistically omitting primitives from the results which are provably capable of being omitted without a functional impact on visualizing the virtual scene. Deterministic results may be provided to the SM 132 by returning intersection results for some primitives (e.g., alpha primitives) in a stored memory order rather than in the spatial order they are located in the scene or in the order the intersections are determined.

The traversal coprocessor 138 may be configured to produce stable images without objectionable artifacts with traversal rules that produce a deterministic result for a query given a ray and a primitive range containing a mixture of opaque and alpha primitives spanning multiple blocks regardless of the order that the memory subsystem returns those blocks to the traversal coprocessor 138.

The traversal co-processor 138 may be configured to perform a number of mid-traversal returns to the SM to handle alpha intersections whose number and content do not vary from run to run. As will be discussed in more detail below, changes in the order of blocks returned to the traversal coprocessor 138 may produce a different ordering of opaque intersections that can mask or not mask different sets of alpha intersections found within the same primitive range. The traversal coprocessor 138 disclosed in this application includes a result queue and rules for out-of-order block processing to ensure that the side-effects resulting from the completed processing of the primitive range will be consistent from run to run.

In an exemplary embodiment, the intersection management unit in the traversal coprocessor 138 may only shorten the ray and return the contents of the result queue to the SM after all the blocks have been processed and the nearest opaque intersection has been found. The intersection management unit may be configured to ensure that each alpha intersection appearing ahead of the nearest opaque intersection is presented to the SM in memory order, thus the number and content would not vary from run to run.

In some exemplary embodiments the number and content of returns to the SM can vary as function of the number of result queue entries. As will be discussed in more detail below, embodiments of this disclosure allow for number of result queue entries and/or number of identified results to have no impact on the functional correctness of the image and will not vary from run to run as a consequence of memory return order.

Exemplary non-limiting embodiments of this disclosure improve ray tracing performance without compromising image quality. By supporting accelerated ray/triangle intersection during traversal, the TTU is able to offload a substantial amount of computation from the streaming processors and avoid an expensive synchronization performance penalty. Because real-time ray tracing must provide as good or better image quality and stability as real-time rasterization, it is important that the TTU's ray-triangle intersection exhibits the properties of watertightness, conservatism, and single-hit. Exemplary non-limiting embodiments of this disclosure allow for real-time ray tracing to be applied in real-time games employing millions of triangles.

Traversing an Acceleration Data Structure

A good way to accelerate ray tracing is to use an acceleration data structure. The acceleration data structure represents the 3D model of an object or a scene in a manner that will help assist in quickly deciding which portion of the object a particular ray is likely to intersect and quickly rejecting large portions of the scene the ray will not intersect. A bounding volume hierarchy (BVH) data structure is one type of acceleration data structure which can help reduce the number of intersections to test. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

Figure 2A:
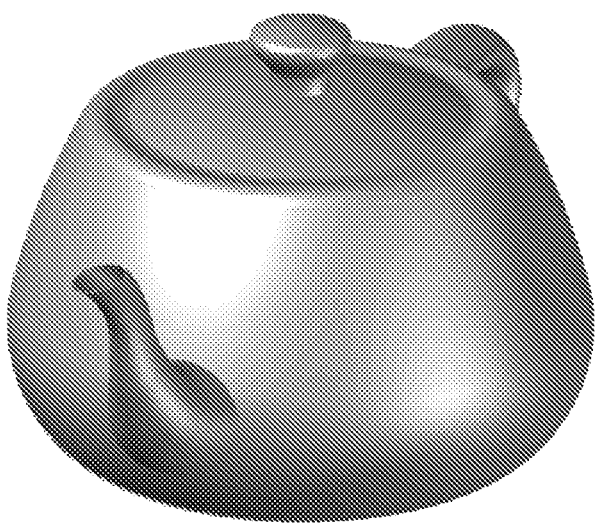
FIG. 2A shows an example specular object.
Figure 2B:
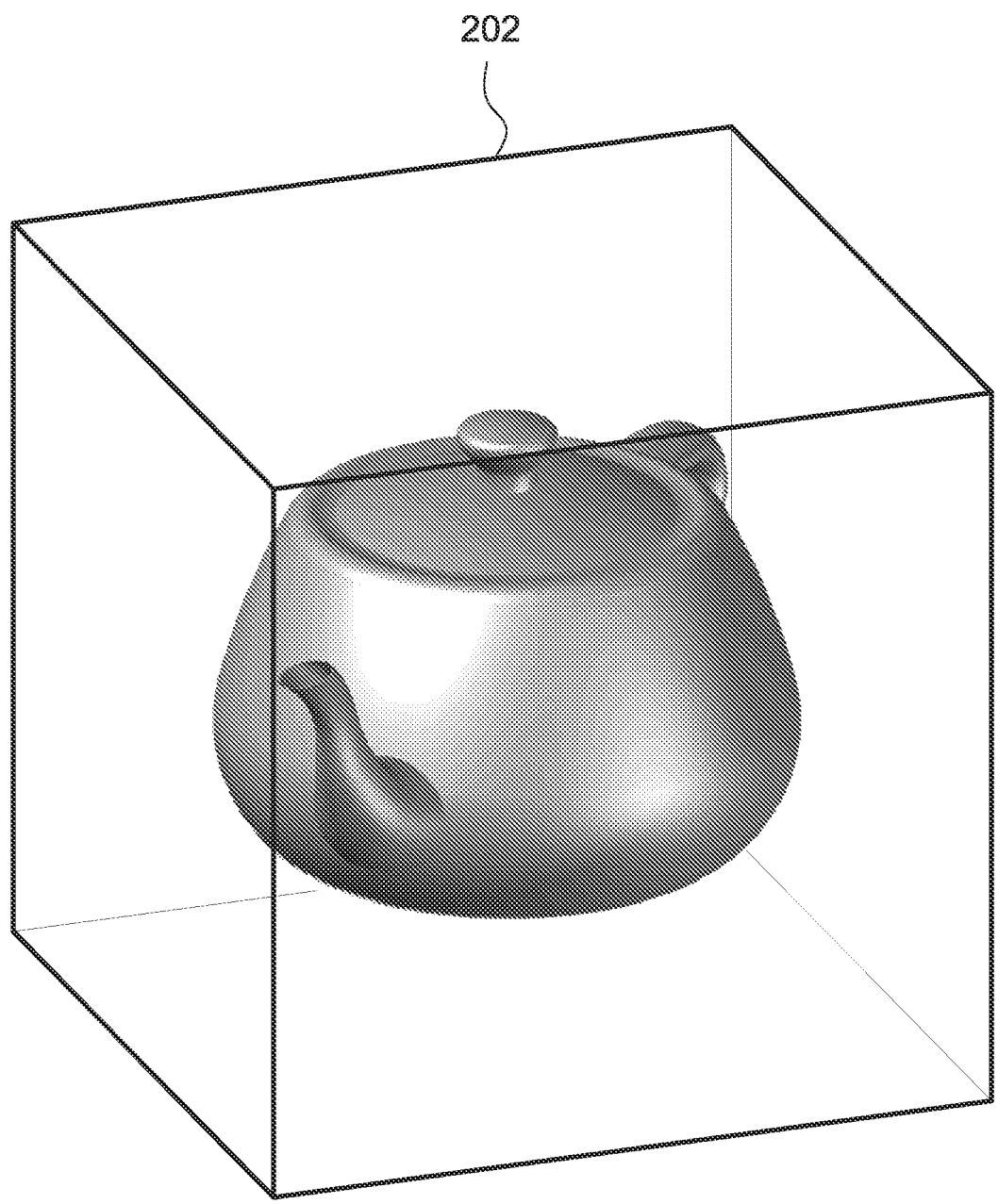
FIG. 2B shows the example object within a bounding volume.

To illustrate how a bounding volume hierarchy works, FIGS. 2A-2G show a teapot recursively subdivided into smaller and smaller hierarchical bounding volumes. FIG. 2A shows a teapot object, and FIG. 2B shows a bounding volume 202 (in this case a box, cube or rectangular parallelepiped) enclosing the whole teapot. The bounding volume 202, which can be efficiently defined by its vertices, provides an indication of the spatial location of the object and is typically dimensioned to be just slightly larger than the object.

The first stage in acceleration structure construction acquires the bounding boxes of the referenced geometry. This is achieved by executing for each geometric primitive in an object a bounding box procedure that returns a conservative axis-aligned bounding box for its input primitive such as box 202 shown in FIG. 2B. Using these bounding boxes as elementary primitives for the acceleration structures provides the necessary abstraction to trace rays against arbitrary user-defined geometry (including several types of geometry within a single structure). Because in FIG. 2B the bounding volume 202 is larger than and completely contains the teapot, a ray that does not intersect bounding volume cannot intersect the teapot, although a ray that does intersect the bounding volume may or may not intersect the teapot. Because the bounding volume 202 is readily defined by the x, y, z coordinates of its vertices in 3D space and a ray is defined by its x, y, z coordinates in 3D space, the ray-bounding volume test to determine whether a ray intersects the bounding volume 202 is straightforward (although some transform may be used to adjust to different coordinate systems, as will be explained below).

Figure 2C:
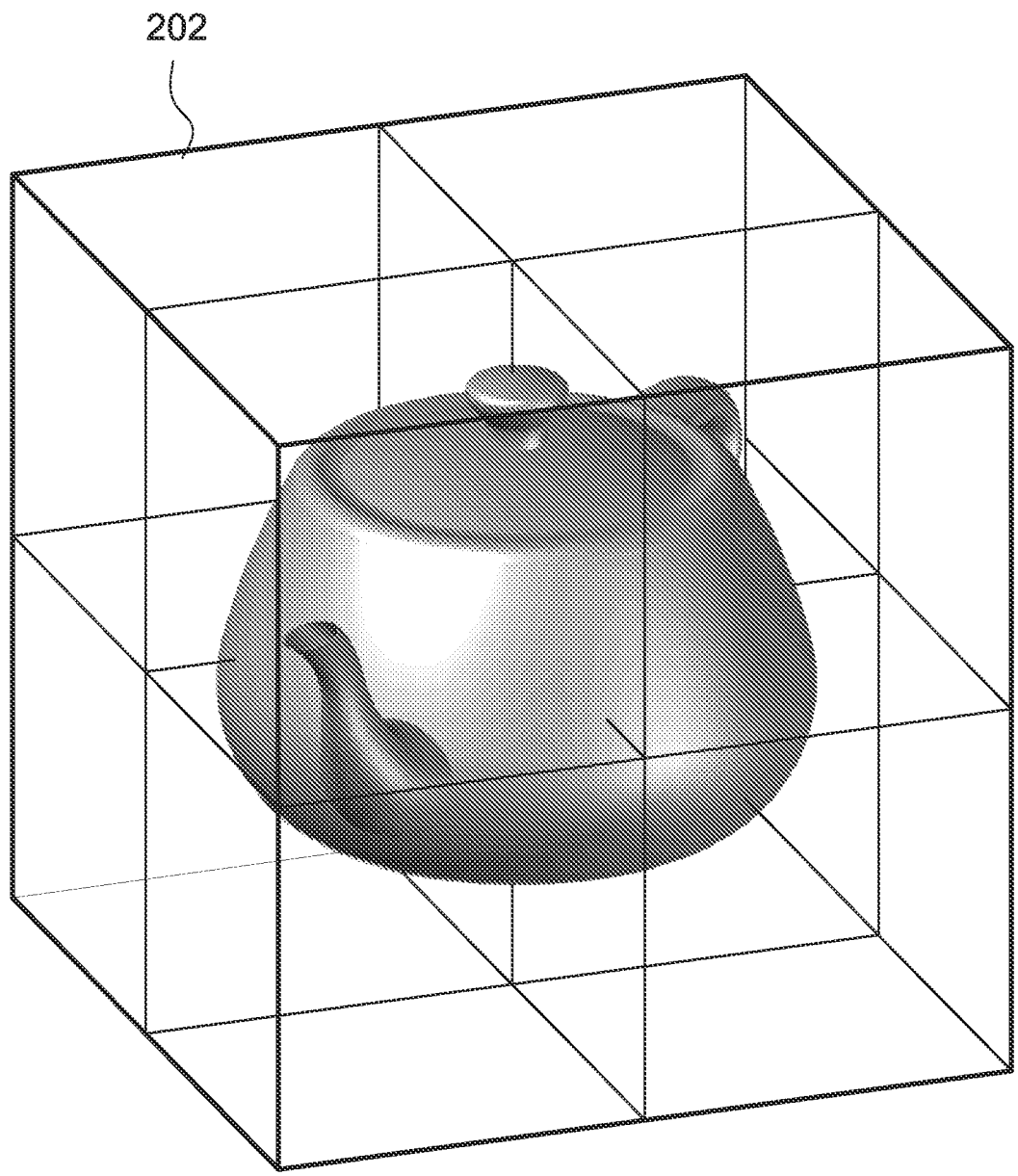
FIG. 2C shows an example volumetric subdividing of the FIG. 2B bounding volume.

FIG. 2C, shows the bounding volume 202 subdivided into smaller contained bounding volumes. While the subdivision scheme shown here for purposes of illustration is a so-called 8-ary subdivision or "octree" in which each volume is subdivided into eight smaller volumes of uniform size, many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

Figure 2D:
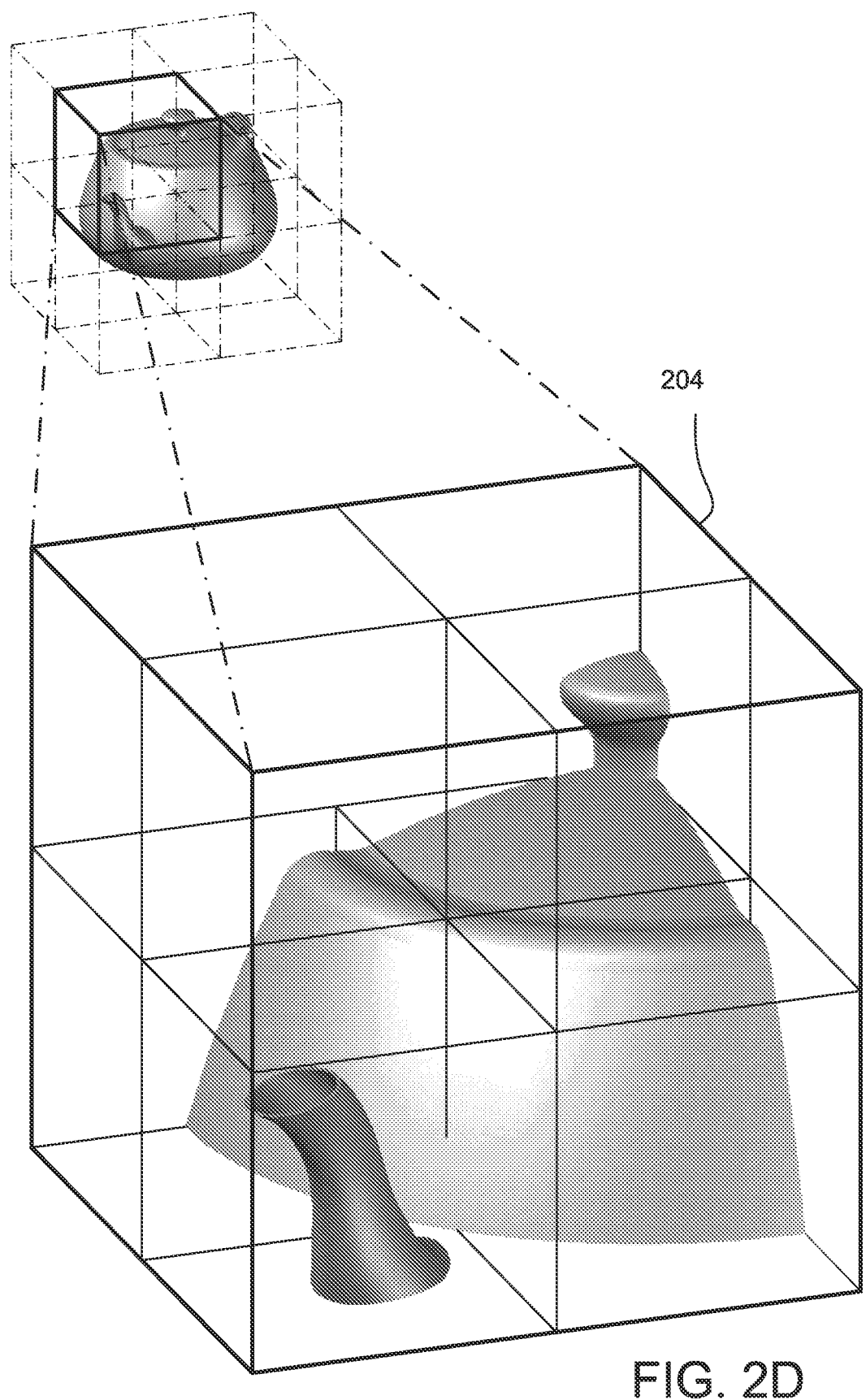
FIGS. 2D, 2E and 2F show example further levels of volumetric subdivision of the bounding volume to create a bounding volume hierarchy (BVH).

Each of the subdivided bounding volumes shown in FIG. 2C can be still further subdivided. FIG. 2D shows one of the subdivided volumes 204 of FIG. 2C being further subdivided to provide additional subdivided encapsulated bounding volumes. As shown in FIG. 2D, some of the subdivided bounding volumes include portions of the teapot and some do not. Volumes that do not contain a portion of the teapot are not further subdivided because the further subdivisions provide no further spatial information about the teapot. Already subdivided bounding volumes that do include at least one portion of the teapot can be still further recursively subdivided—like the emergence of each of a succession of littler and littler cats from the hats of Dr. Seuss's' *The Cat In The Hat Comes Back* (1958). The portions of the space within bounding volume 202 that contain geometry are recursively subdivided to permit the traversal coprocessor 138 to use the volumetric subdivisions to efficiently discover where the geometry is located relative to any given ray. It can be noted that while a spatial or active subdivision of the volume is possible, many implementations will create the hierarchical structure defining volumes and subvolumes ahead of time. In such cases, the builder may often build the hierarchy up from individual triangles and not down from the whole scene. Building up means you do not need to determine if some subdivided volume contains anything since by definition it contains what is below it in a hierarchy of volumetric subdivisions.

Figure 2E:
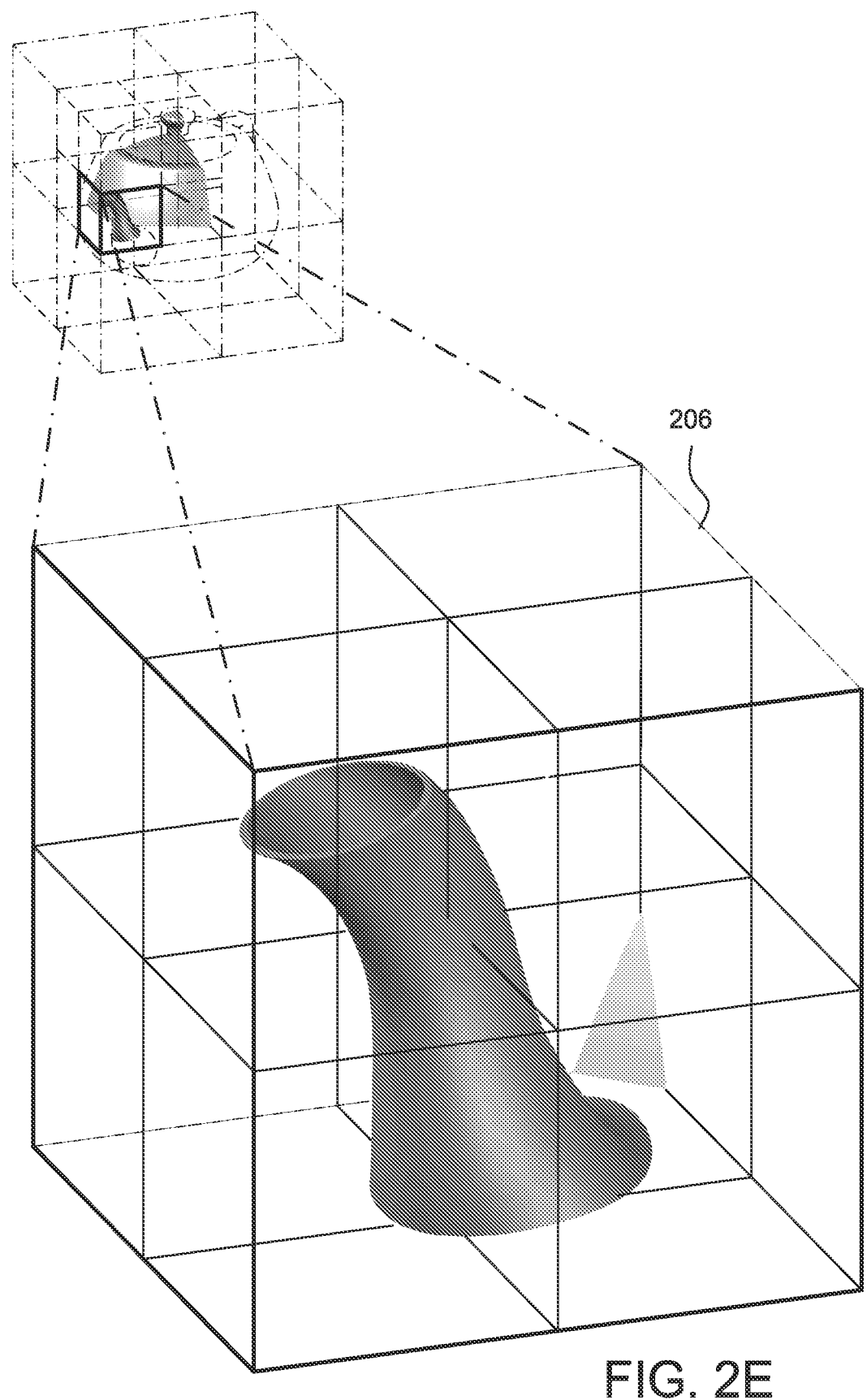
Figure 2F:
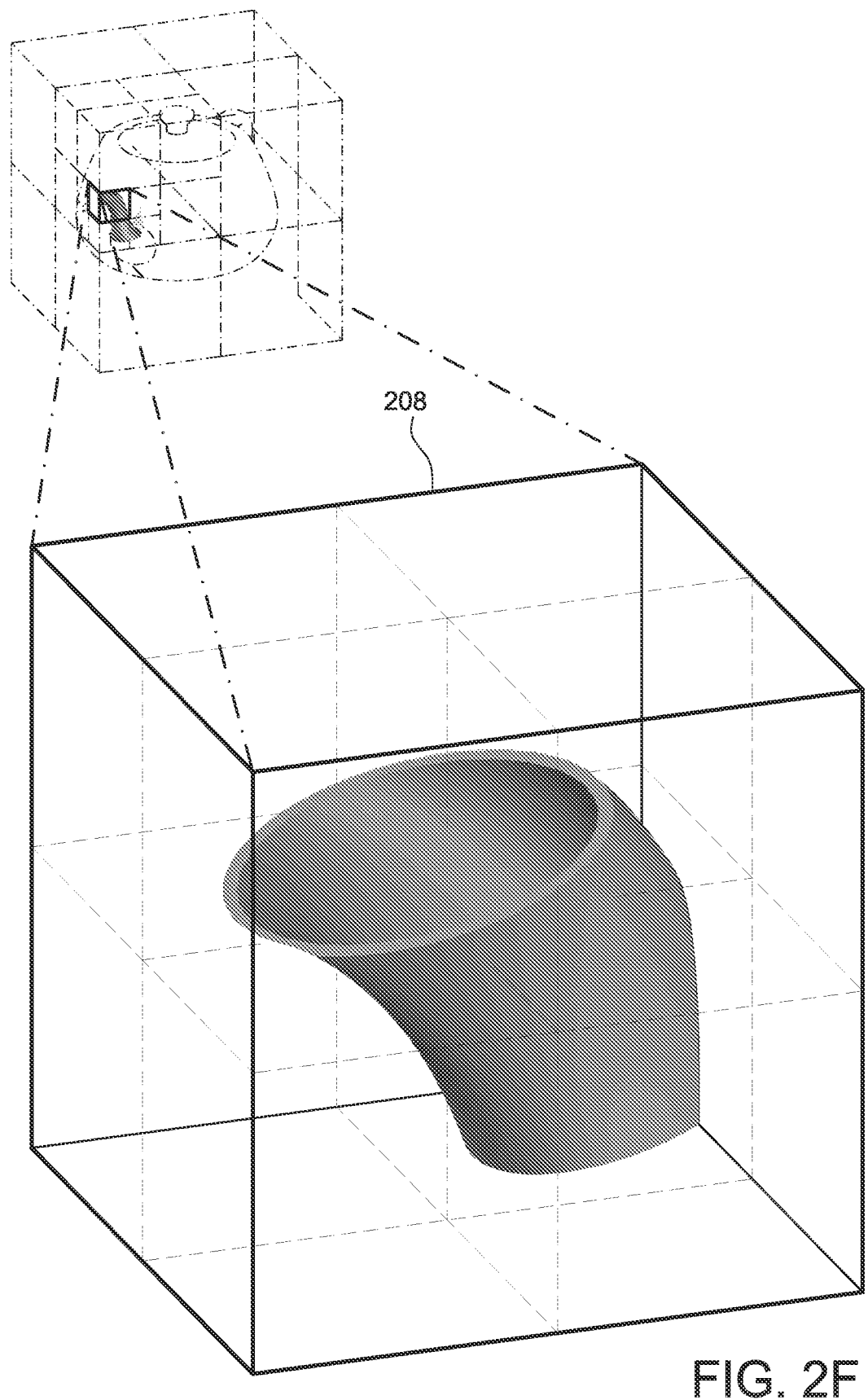

FIG. 2E shows a further such subdivision of bounding volume 204 into a further smaller contained bounding volume 206 containing in this example just the spout of the teapot plus another surface on the wall of the teapot, and FIG. 2F shows an additional subdivision of bounding volume 206 into still smaller contained subdivision 208 encapsulating the end of the teapot's spout. Depending on the way the BVH is constructed, bounding volume 208 can be further and further subdivided as desired—and traversal coprocessor 138 enables the FIG. 1 system 100 to efficiently traverse the BVH down to any arbitrary subdivision level. The number and configurations of recursive subdivisions will depend on the complexity and configuration of the 3D object being modeled as well as other factors such as desired resolution, distance of the object from the viewpoint, etc.

Figure 2G:
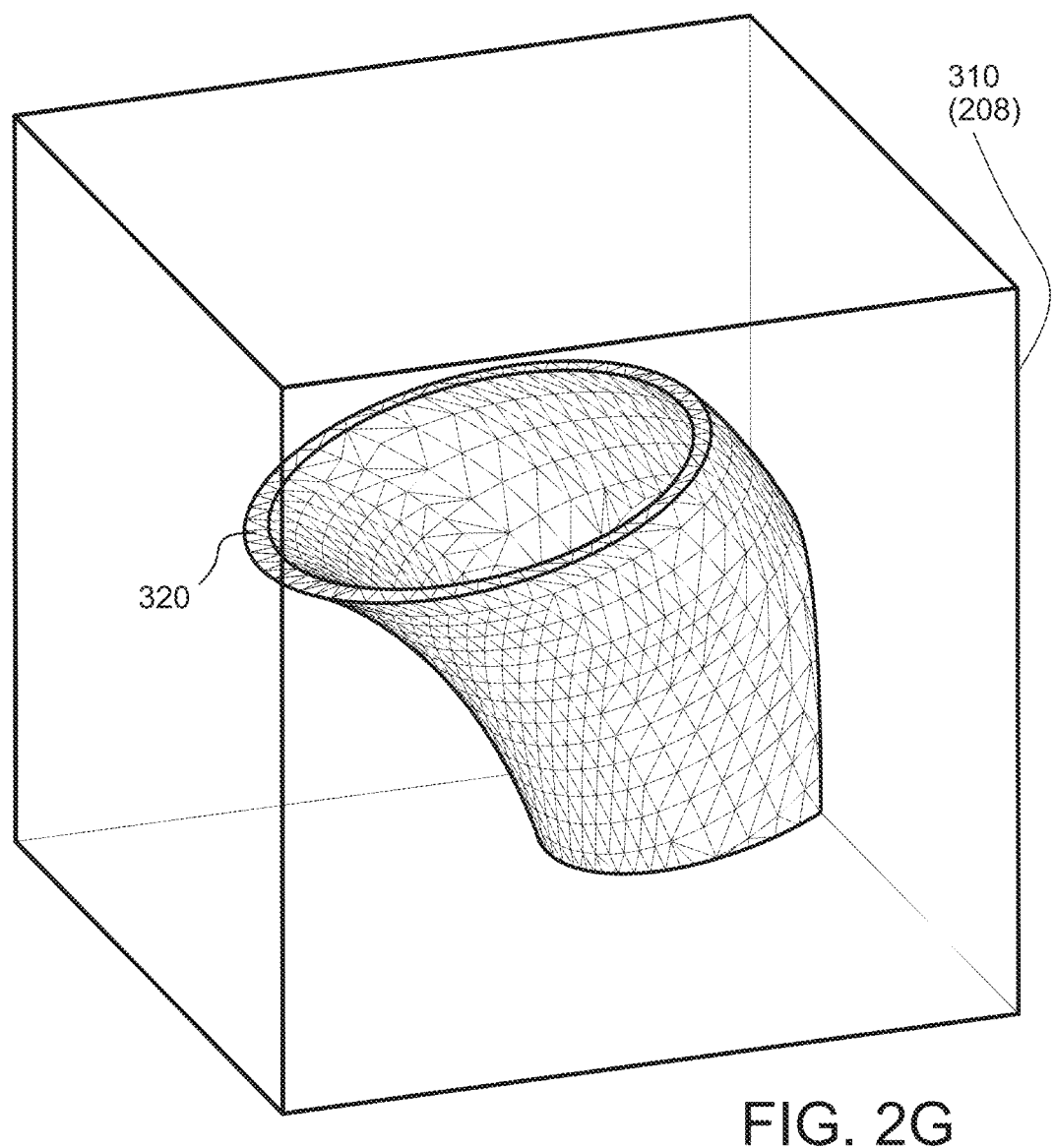
FIG. 2G shows an example portion of the object comprised of primitive surfaces, in this case triangles.

At some level of subdivision (which can be different levels for different parts of the BVH), the traversal coprocessor 138 encounters geometry making up the encapsulated object being modeled. Using the analogy of a tree, the successive volumetric subdivisions are the trunk, branches, boughs and twigs, and the geometric is finally revealed at the very tips of the tree, namely the leaves. In this case, FIG. 2G shows the surface of the teapot's spout defined by an example mesh of geometric primitives. The geometric primitives shown are triangles but other geometric primitives, such as quads, lines, rectangles, quadrics, patches, or other geometric primitives known to those familiar with the state of the art, may be used (in one embodiment, such other types of primitives may be expressed as or converted into triangles). The geometric primitives in the mesh represent the shape of the 3D surface of the object being modeled. The example shown here is a mesh, but bounded geometry can include discontinuous geometry such as particles that may not be connected. In the example non-limiting embodiments, the traversal coprocessor 138 also accelerates ray intersection tests with this geometry to quickly determine which triangles are hit by any given ray. Determining ray-primitive intersections involves comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. For example, in the mesh shown in FIG. 2G, the spout of the teapot alone is made up of over a hundred triangles—although it may be more efficient in some implementations to further volumetrically subdivide and thereby limit the number of triangles in any such "leaf node" to something like 16 or fewer.

As discussed above, ray tracing procedures determine what geometric primitives of a scene are intersected by a ray. However, due to the large number of primitives in a 3D scene, it may not be efficient or feasible to test every geometric primitive for an intersection. Acceleration data structures, such as BVH, allow for quick determination as to which bounding volumes can be ignored, which bounding volumes may contain intersected geometric primitives, and which intersected geometric primitives matter for visualization and which do not.

Ray Intersection Testing

Figure 3A:
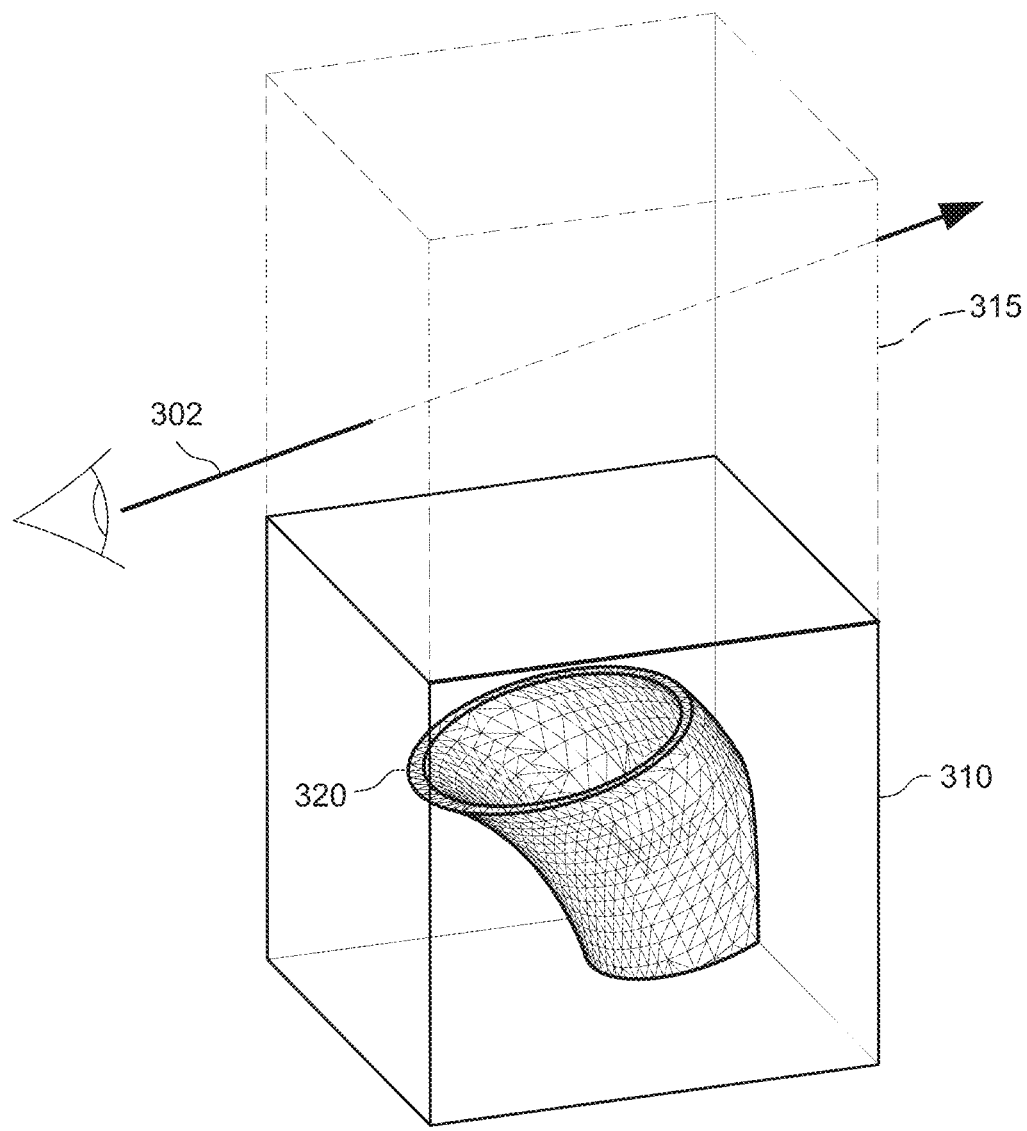
FIGS. 3A-3C show example simplified ray tracing tests to determine whether the ray passes through a bounding volume containing geometry and whether the ray intersects geometry.
Figure 3B:
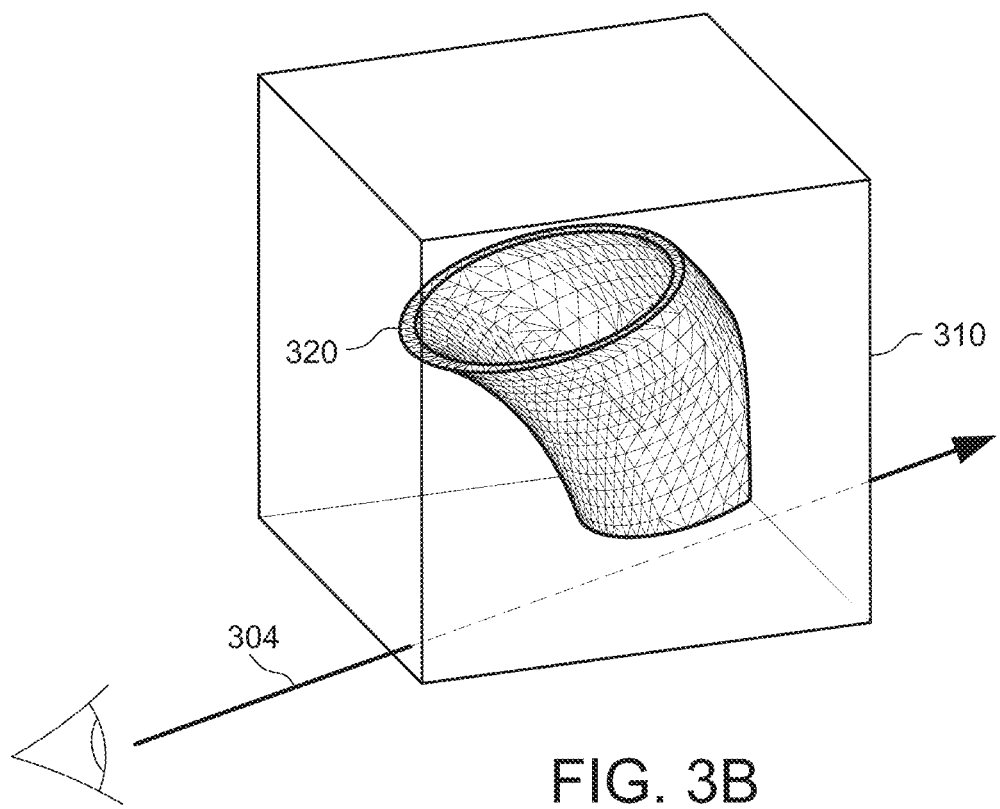
Figure 3C:
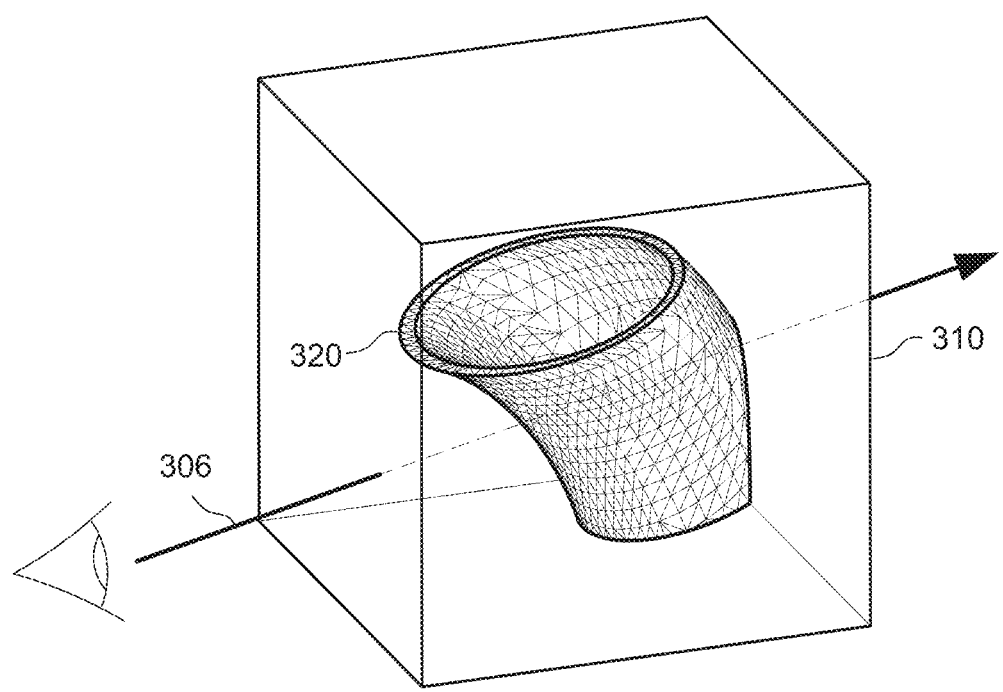

FIGS. 3A-3C illustrate ray tracing applied to the FIG. 2G bounding volume 208 including triangle mesh 320. FIG. 3A shows a ray 302 in a virtual space including bounding volumes 310 and 315. To determine whether the ray 302 intersects one or more triangles in the mesh 320, each triangle could be directly tested against the ray 302. But to accelerate the process (since the object could contain many thousands of triangles), the ray 302 is first tested against the bounding volumes 310 and 315. If the ray 302 does not intersect a bounding volume, then it does not intersect any triangles inside of the bounding volume and all triangles inside the bounding volume can be ignored for purposes of that ray. Because in FIG. 3A the ray 302 misses bounding volume 310, the triangles of mesh 320 within that bounding volume need not be tested for intersection. While bounding volume 315 is intersected by the ray 302, bounding volume 315 does not contain any geometry and so no further testing is required.

On the other hand, if a ray such as ray 304 shown in FIG. 3B intersects a bounding volume 310 that contains geometry, then the ray may or may not intersect the geometry inside of the bounding volume so further tests need to be performed on the geometry itself to find possible intersections. Because the rays 304, 306 in FIGS. 3B and 3C intersect a bounding volume 310 that contains geometry, further tests need to be performed to determine whether any (and which) of the primitives inside of the bounding volume are intersected. In FIG. 3B, further testing of the intersections with the primitives would indicate that even though the ray 304 passes through the bounding volume 310, it does not intersect any of the primitives the bounding volume encloses (alternatively, as mentioned above, bounding volume 310 could be further volumetrically subdivided so that a bounding volume intersection test could be used to reveal that the ray does not intersect any geometry or more specifically which primitives the ray may intersect).

FIG. 3C shows a situation in which the bounding volume 310 intersected by ray 306 and contains geometry that ray 306 intersects. Traversal coprocessor 138 tests the intersections between the ray 306 and the individual primitives to determine which primitives the ray intersects.

Ray Tracing Operations

Figure 4:
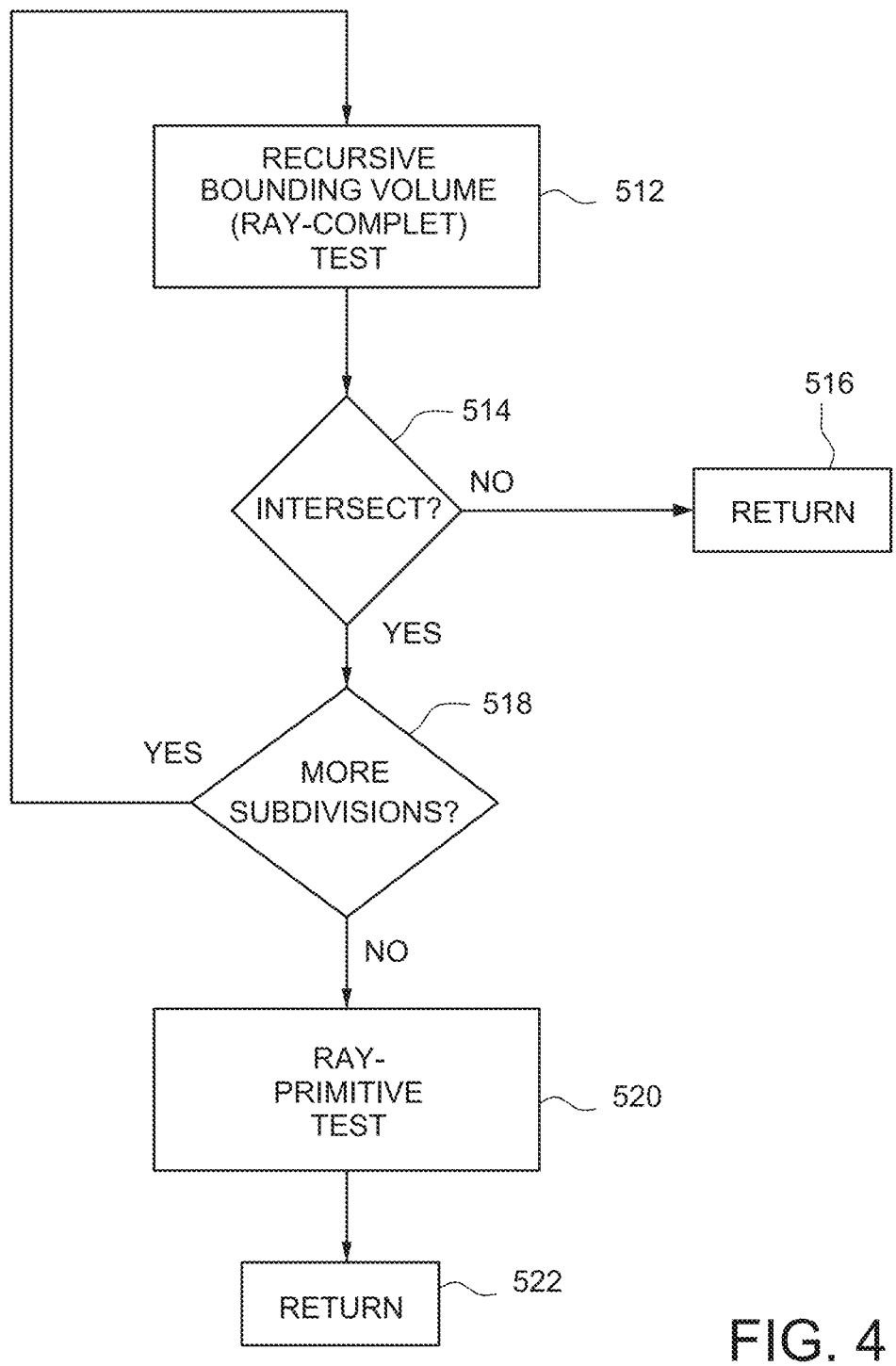
FIG. 4 illustrates an example ray tracing flowchart.

FIG. 4 is a flowchart summarizing example ray tracing operations the traversal coprocessor 138 performs as described above in cooperation with SM(s) 132. The FIG. 4 operations are performed by traversal coprocessor 138 in cooperation with its interaction with an SM 132. The traversal coprocessor 138 may thus receive the identification of a ray from the SM 132 and traversal state enumerating one or more nodes in one or more BVH's that the ray must traverse. The traversal coprocessor 138 determines which bounding volumes of a BVH data structure the ray intersects (the "ray-complet" test 512) and subsequently whether the ray intersects one or more primitives in the intersected bounding volumes and which triangles are intersected (the "ray-primitive test" 520). In example non-limiting embodiments, "complets" (compressed treelets) specify root or interior nodes (i.e., volumes) of the bounding volume hierarchy with children that are other complets or leaf nodes of a single type per complet.

First, the traversal coprocessor 138 inspects the traversal state of the ray. If a stack the traversal coprocessor 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the traversal coprocessor 138 can return this result to the requesting SM 132. This is because if a ray misses a bounding volume (as in FIG. 3A with respect to bounding volume 310), then the ray will miss all other smaller bounding volumes inside the bounding volume being tested and any primitives that bounding volume contains.

If the bounding box test performed by the traversal coprocessor 138 reveals that the bounding volume is intersected by the ray ("Yes" in Step 514), then the traversal coprocessor determines if the bounding volume can be subdivided into smaller bounding volumes (step 518). In one example embodiment, the traversal coprocessor 138 isn't necessarily performing any subdivision itself. Rather, each node in the BVH has one or more children (where each child is a leaf or a branch in the BVH). For each child, there is a bounding volume and a pointer that leads to a branch or a leaf node. When a ray processes a node using traversal coprocessor 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The traversal coprocessor 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by traversal coprocessor 138 recursively applying steps 512-518.

Once the traversal coprocessor 138 determines that the bounding volumes intersected by the ray are leaf nodes ("No" in step 518), the traversal coprocessor performs a primitive (e.g., triangle) intersection test 520 to determine whether the ray intersects primitives in the intersected bounding volumes and which primitives the ray intersects. The traversal coprocessor 138 thus performs a depth-first traversal of intersected descendent branch nodes until leaf nodes are reached. The traversal coprocessor 138 processes the leaf nodes. If the leaf nodes are primitive ranges, the traversal coprocessor 138 tests them against the ray. If the leaf nodes are instance nodes, the traversal coprocessor 138 applies the instance transform. If the leaf nodes are item ranges, the traversal coprocessor 138 returns them to the requesting SM 132. In the example non-limiting embodiments, the SM 132 can command the traversal coprocessor 138 to perform different kinds of ray-primitive intersection tests and report different results depending on the operations coming from an application (or an software stack the application is running on) and relayed by the SM to the TTU. For example, the SM 132 can command the traversal coprocessor 138 to report the nearest visible primitive revealed by the intersection test, or to report all primitives the ray intersects irrespective of whether they are the nearest visible primitive. The SM 132 can use these different results for different kinds of visualization. Once the traversal coprocessor 138 is done processing the leaf nodes, there may be other branch nodes (pushed earlier onto the ray's stack) to test.

Multiple Intersections

In more detail, as shown in FIG. 3C, any given ray may intersect multiple primitives within a bounding volume. Whether the ray intersection within a given primitive matters for visualization depends on the properties and position of that primitive as well as the visualization procedures the SM 132 is performing. For example, primitives can be opaque, transparent or partially transparent (i.e., translucent). Opaque primitives will block a ray from passing through the primitive because the eye cannot see through the primitive's opaque surface. Transparent primitives will allow the ray to pass through (because the eye can see through the transparent primitive) but the situation may be more complex. For example, transparent primitives may have specular properties that cause some portion of the ray to reflect (think of reflection from a window pane) and the rest of the ray to pass through. Other transparent primitives are used to provide a surface onto which a texture is mapped. For example, each individual leaf of a tree may be modeled by a transparent primitive onto which an image of the leaf is texture mapped.

Figure 5A:
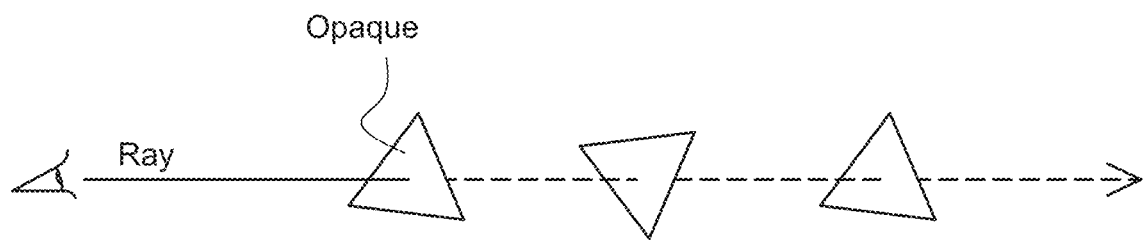
FIGS. 5A-5C show example different ray-primitive intersection scenarios.
Figure 5B:
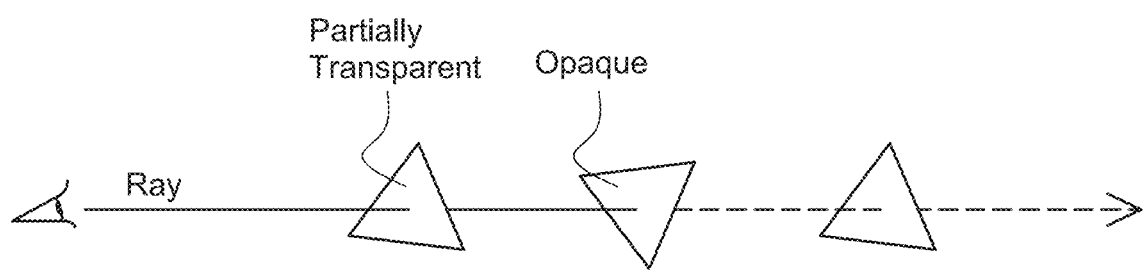
Figure 5C:
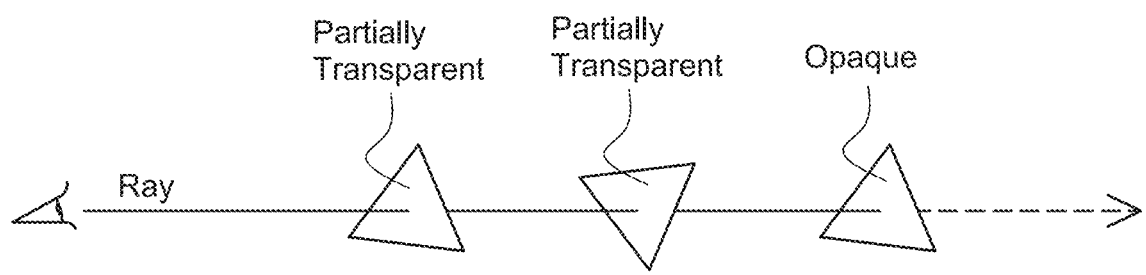

FIGS. 5A-5C illustrate some of these scenarios using an example of three triangles assumed to be in the same bounding volume and each intersected by a ray. FIG. 5A illustrates a ray directed towards these three triangles, with the first triangle the ray encounters relative to the viewpoint being opaque. Because the "front" (from the standpoint of the direction of the ray from the eye) intersected triangle is opaque, that triangle will block the ray so the ray will not reach the other triangles even through it spatially intersects them. In this example, the triangles "behind" the opaque triangle from the viewpoint can be ignored (culled) after the intersection of the opaque triangle is identified because the "front", opaque triangle hides the other triangles from the user's view along the ray. Culling is indicated by dotted lines in FIGS. 5A-5C. In this case, the traversal coprocessor 138 may only need to report the identification of the first, opaque triangle to the SM 132.

FIG. 5B illustrates a ray directed towards the same three triangles but now the nearest visible triangle is partially transparent rather than opaque. Because the nearest visible intersected triangle is at least partially transparent, the ray may pass through it to hit the opaque triangle behind it. In this case, the opaque triangle will be visible through the partially transparent triangle but will block the user's view of the third triangle along the ray. Here, the traversal coprocessor 138 may report the identification of both front triangles to the SM 132 but not report the third, culled triangle even though the ray spatially intersects that third triangle. Order of discovery may matter here. In the case of an alpha and opaque triangle, if the opaque was found first, the traversal coprocessor 138 returns the opaque triangle to the SM 132 with traversal state that will resume testing at the alpha triangle. While there is an implication here that the alpha means transparent, it really means "return me to the SM 132 and let the SM determine how to handle it." For example, an alpha triangle might be trimmed according to a texture or function so that portions of the triangle are cut away (i.e., absent, not transparent). The traversal coprocessor 138 does not know how the SM 132 will handle the alpha triangles (i.e., it does not handle transparent triangles differently from trimmed triangles). Thus, alpha triangles may or may not block or tint the light arriving from points beyond them along the ray, and in example embodiments, they require SM 132 intervention to handle/determine those things.

FIG. 5C illustrates a scenario in which the first two triangles the ray encounters are partially transparent. Because the first and second intersected triangles are at least partially transparent, the ray will pass through the first and second triangles to impinge upon the also-intersecting third opaque triangle. Because third intersected triangle is opaque, it will block the ray, and the ray will not impinge upon any other triangles behind the third triangle even though they may be spatially intersected by it. In this case, the traversal coprocessor 138 may report all three triangles to the SM 132 but need not report any further triangles behind the opaque triangle because the opaque triangle blocks the ray from reaching those additional triangles.

In some modes, however, the SM 132 may need to know the identities of all triangles the ray intersects irrespective of whether they are opaque or transparent. In those modes, the traversal coprocessor 138 can simply perform the intersection test and return the identities of all triangles the ray spatially intersects (in such modes, the traversal coprocessor will return the same intersection results for all three scenarios shown in FIGS. 5A-5C) and allow the SM 132 to sort it out—or in some cases command the traversal coprocessor 138 to do more tests on these same triangles.

As will be discussed in more detail below, when a ray intersects an opaque triangle, the traversal coprocessor 138 can in certain operations be programmed to reduce the length of the ray being tested to the location of the opaque triangle intersection so it will not report any triangles "behind" the intersected triangle. When a partially transparent triangle is determined to be intersected by a ray, the traversal coprocessor 138 will return a more complete list of triangles the ray impinges upon for purposes of visualization, and the requesting SM 132 may perform further processing to determine whether, based for example any texture or other properties of the triangle, the ray will be blocked, passed or partially passed and partially reflected. In example embodiments, the traversal coprocessor 138 does not have access to texture properties of triangles and so does not attempt to determine visualization with respect to those properties.

Textures or Other Surface Modifications

Figure 6A:
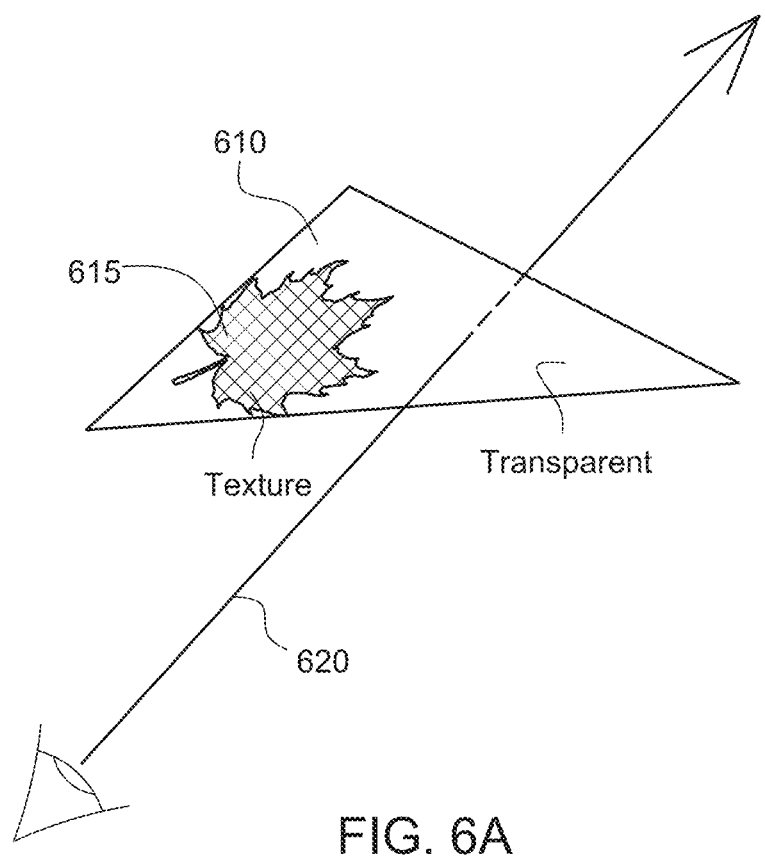
FIGS. 6A and 6B show an example of how texture mapping can impact ray-primitive intersection results.
Figure 6B:
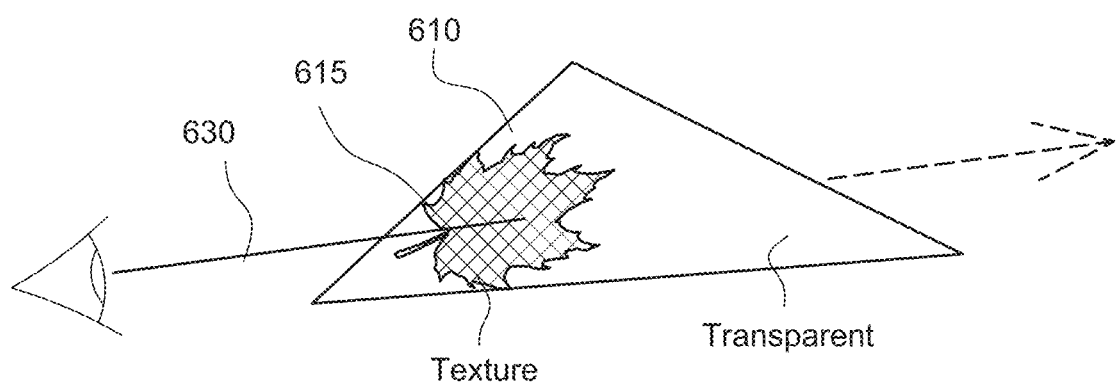

For example, FIGS. 6A and 6B show a transparent triangle 610 with a texture 615 of a leaf applied to the triangle. One could think of a triangle made of Plexiglas with a decal of a leaf applied to it. As shown in FIG. 6A, the ray 620 intersects the transparent triangle 610 at a point that is outside the applied texture 615. Because the ray 620 intersects the triangle outside the applied texture 615, the texture will not block the ray 620 and the ray will pass through the transparent triangle 610 without obstruction. This is like being able to see through the parts of the Plexiglas triangle that are not covered by the leaf decal. Note that in one example embodiment, the SM 132 makes the visibility determination since the traversal coprocessor 138 does not necessarily have access to information concerning the leaf decal. The traversal coprocessor 138 helps the SM 132 by returning to the SM the identification of the triangle that the ray intersects along with information concerning the properties of that triangle.

In FIG. 6B, the ray 630 intersects the transparent triangle where the texture 615 is applied. SM 132 will determine whether subsequent traversal by the traversal coprocessor 138 is necessary or not based on whether the texture 615 will block the ray 630 or allow the ray 630 to pass through. If the ray 630 is blocked by the texture 615, other triangles behind the transparent triangle 610, which may have otherwise been intersected by the ray 630, will be obstructed by the texture and not contribute to visualization along the ray. In the example non-limiting embodiments herein, the traversal coprocessor 138 does not have access to texture information and so it does not attempt to accelerate this determination. Traversal coprocessor 138 may for example return to the requesting SM 132 all intersections between the ray and the various triangles within the object, and the SM may then use the graphics primitive engine 134 to make further ray tracing visualization determinations. In other example embodiments, traversal coprocessor 138 could accelerate some or all of these tests by interacting with the texture mapping unit and other portions of the 3D graphics pipeline within graphics primitive engine 134 to make the necessary visualization determinations.

Coordinate Transforms

FIGS. 2A-3C involve only a single object, namely a teapot. Just as the room you are in right now contains multiple objects, most 3D scenes contain many objects. For example, a 3D scene containing a teapot will likely also contain a cup, a saucer, a milk pitcher, a spoon, a sugar bowl, etc. all sitting on a table. In 3D graphics, each of these objects is typically modelled independently. The graphics system 100 then uses commands from the processor 120 to put all the models together in desired positions, orientations and sizes into the common scene for purposes of visualization (just as you will set and arrange the table for serving tea). What this means is that the SM 132 may command traversal processor 138 to analyze the same ray with respect to multiple objects in the scene. However, the fact that each of these objects will be transformed in position, orientation and size when placed into the common scene is taken into account and accelerated by the traversal coprocessor 138. In non-limiting example embodiments, the transform from world-to-object space is stored in the world space BVH along with a world-space bounding box. The traversal coprocessor 138 accelerates the transform process by transforming the ray from world (scene) space into object space for purposes of performing the tests shown in FIG. 4. In particular, since the transformation of the geometry from object space into world (scene) space is computationally intensive, that transformation is left to the graphics pipeline graphics primitive engine 134 and/or raster engine 136 to perform as part of rasterization. The traversal coprocessor 138 instead transforms a given ray from world space to the coordinate system of each object defined by an acceleration data structure and performs its tests in object space.

Figure 7A:
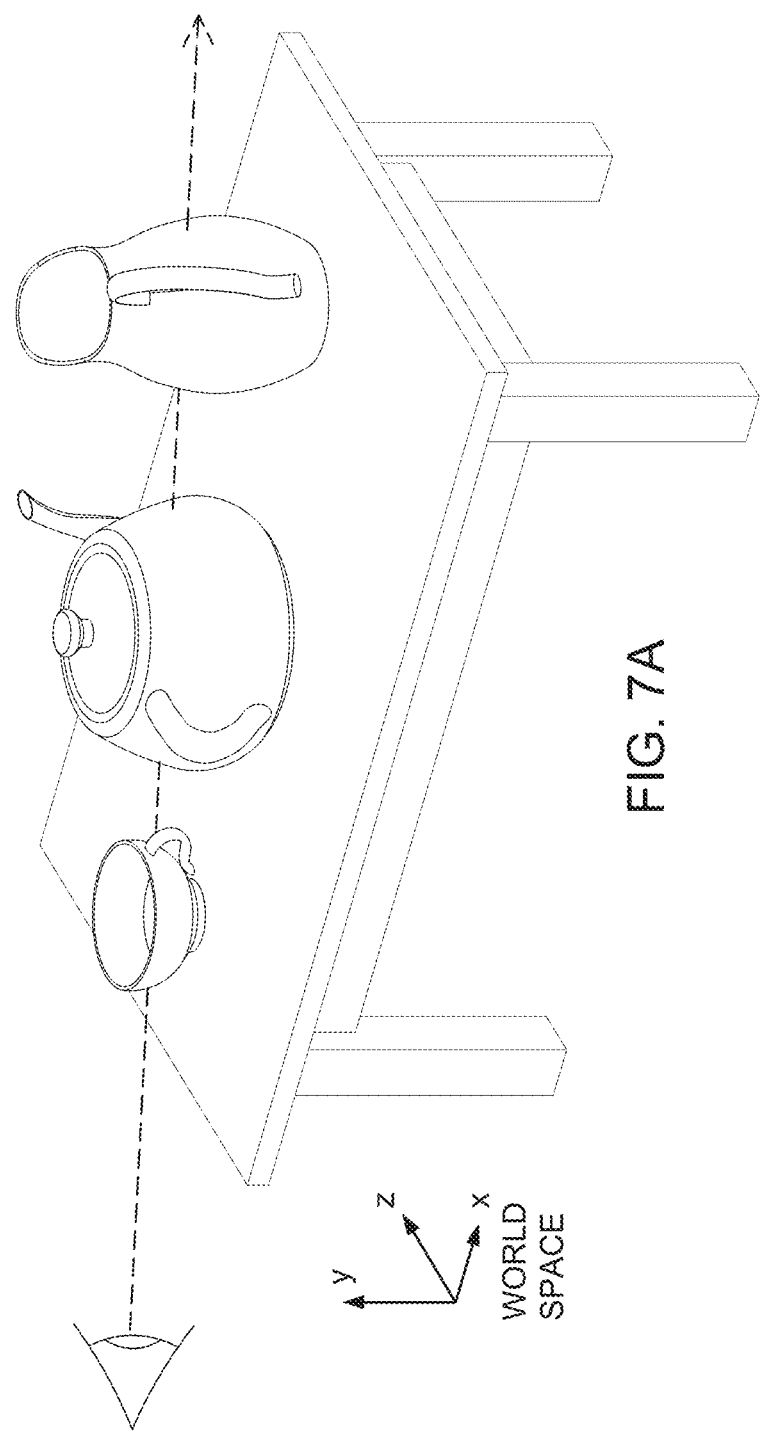
FIGS. 7A and 7B illustrate ray instance transforms.
Figure 7B:
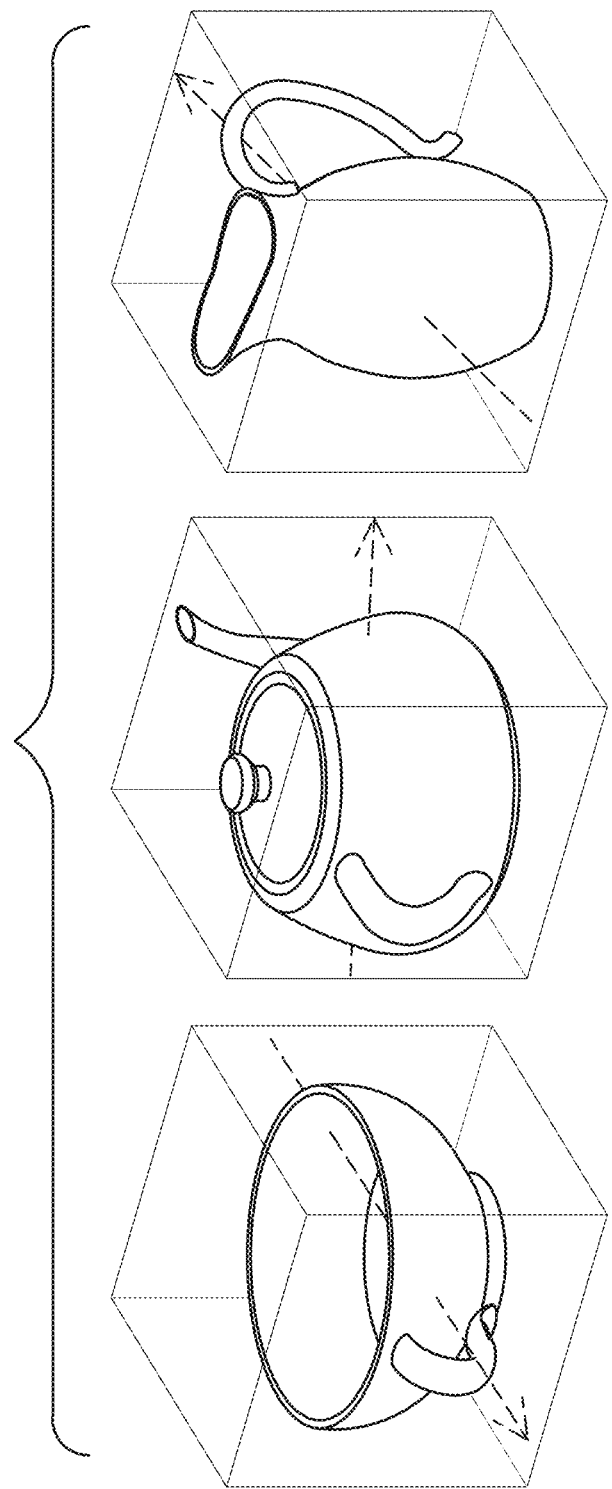

FIGS. 7A and 7B illustrates how the traversal coprocessor 138 transforms the same ray into three different object spaces. FIG. 7A shows three objects on a table: a cup, a teapot and a pitcher. These three objects and a table comprise a scene, which exists in world space. A ray that also is defined in world space emanates from the viewpoint and intersects each of the three objects.

FIG. 7B shows each of the three objects as defined in object spaces. Each of these three objects is defined by a respective model that exists in a respective object space. The traversal coprocessor 138 in example non-limiting embodiments transforms the ray into the object space of each object before performing the intersection tests for that object. This "instance transform" saves the computational effort of transforming the geometry of each object and the associated volumetric subdivisions of the acceleration data structure from object space to world space for purposes of the traversal coprocessor 138 performing intersection tests.

The requesting SM 132 keeps track of which objects are in front of which other objects with respect to each individual ray and resolves visibility in cases where one object hides another object, casts a shadow on another object, and/or reflects light toward another object. The requesting SM 132 can use the traversal processor 138 to accelerate each of these tests.

Example Tree BVH Acceleration Data Structure

FIGS. 8A and 8B show a recursively-subdivided bounding volume of a 3D scene (FIG. 8A) and a corresponding tree data structure (FIG. 8B) that may be accessed by the traversal coprocessor 138 and used for hardware-accelerated operations performed by traversal coprocessor. The division of the bounding volumes may be represented in a hierarchical tree data structure with the large bounding volume shown in FIG. 2B represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure may be stored in memory outside of the traversal coprocessor 138 and retrieved based on queries the SMs 132 issue to the traversal coprocessor 138. The tree data structure includes a plurality of nodes arranged in a hierarchy. The root nodes N1 of the tree structure correspond to bounding volume N1 enclosing all of the triangles O1-O8. The root node N1 may identify the vertices of the bounding volume N1 and children nodes of the root node.

In FIG. 8A, bounding volume N1 is subdivided into bounding volumes N2 and N3. Children nodes N2 and N3 of the tree structure of FIG. 8B correspond to and represent the bounding volumes N2 and N3 shown in FIG. 8A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5.

Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 8B tree structure correspond to and represent the FIG. 8A bounding volumes N4, N5, N6, N8, N10 and N11 in space.

The FIG. 8B tree is only three to six levels deep so that volumes N4, N5, N6, N8, N10 and N11 constitute "leaf nodes"—that is, nodes in the tree that have no child nodes. FIG. 8A shows that each of leaf node bounding volumes N4, N5, N6, and N8, contains two triangles of the geometry in the scene. For example, volumetric subdivision N4 contains triangles O1 & O2; volumetric subdivision N5 contains triangles O3 & O4; volumetric subdivision N6 contains trials O5 & O6; and volumetric subdivision N8 contains triangles O7 & O8. The tree structure shown in FIG. 8B represents these leaf nodes N4, N5, N6, and N7 by associating them with the appropriate ones of triangles O1-O8 of the scene geometry. To access this scene geometry, the traversal coprocessor 138 traverses the tree data structure of FIG. 8B down to the leaf nodes. In general, different parts of the tree can and will have different depths and contain different numbers of triangles. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).

The Internal Structure and Operation of Traversal Coprocessor 138

FIG. 9 shows an example simplified block diagram of traversal coprocessor 138 including hardware configured to perform accelerated traversal operations as described above (a still more detailed implementation of this traversal coprocessor 138 is described below). Because the traversal coprocessor 138 shown in FIG. 9 is adapted to traverse tree-based acceleration data structures such as shown in FIGS. 8A, 8B, it may also be called a "tree traversal unit" or "TTU" 700 (the 700 reference number is used to refer to the more detailed non-limiting implementation of traversal coprocessor 138 shown in FIG. 1). Tree traversal operations may include, for example, determining whether a ray intersects bounding volumes and/or primitives of a tree data structure (e.g., a BVH tree), which tests may involve transforming the ray into object space.

The TTU 700 includes dedicated hardware to determine whether a ray intersects bounding volumes and dedicated hardware to determine whether a ray intersects primitives of the tree data structure. In some embodiments, the TTU 700 may perform a depth-first traversal of a bounding volume hierarchy using a short stack traversal with intersection testing of supported leaf node primitives and mid-traversal return of alpha primitives and unsupported leaf node primitives (items). The intersection of primitives will be discussed with reference to triangles, but other geometric primitives may also be used.

In more detail, TTU 700 includes an intersection management block 722, a ray management block 730 and a stack management block 740. Each of these blocks (and all of the other blocks in FIG. 9) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 700. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 700. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 700 including one or more ray-complet test blocks 710 and one or more traversal logic blocks 712. A complet specifies root or interior nodes of a bounding volume. Thus, a complet may define one or more bounding volumes for the ray-complet test. The ray-complet test path of the TTU 700 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 700 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (e.g., short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 700 may request the BVH data structure identified in the query to be retrieved from memory outside of the TTU 700. Retrieved portions of the BVH data structure may be cached in the level-zero (L0) cache 750 within the TTU 700 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 700 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 612. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 700 may return intermediate as well as final results to the SM 132.

The intersected leaf nodes identify primitives that may or may not be intersected by the ray. One option is for the TTU 700 to provide e.g., a range of geometry identified in the intersected leaf nodes to the SM 132 for further processing. For example, the SM 132 may itself determine whether the identified primitives are intersected by the ray based on the information the TTU 700 provides as a result of the TTU traversing the BVH. To offload this processing from the SM 132 and thereby accelerate it using the hardware of the TTU 700, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 710 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 710.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture (see FIGS. 6A and 6B) and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 700 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection can be fully determined in the TTU 700 because the area of the opaque triangle blocks the ray from going past the surface of the triangle. For transparent triangles, ray intersections cannot in some embodiments be fully determined in the TTU 700 because TTU 700 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 710 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 700 (e.g., shortening the ray if the ray is blocked by the texture) based on this determination.

In one embodiment, the TTU 700 may be configured to return all triangles determined to intersect the ray to the SM 132 for further processing. Because returning every triangle intersection to the SM 132 for further processing is costly in terms of interface and thread synchronization, the TTU 700 may be configured to hide triangles which are intersected but are provably capable of being hidden without a functional impact on the resulting scene. For example, because the TTU 700 is provided with triangle type information (e.g., whether a triangle is opaque or transparent), the TTU 700 may use the triangle type information to determine intersected triangles that are occluded along the ray by another intersecting opaque triangle and which thus need not be included in the results because they will not affect the visibility along the ray. As discussed above with reference to FIGS. 5A-5C, if the TTU 700 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 700 and/or modify the query (e.g., shorten the ray if the ray is blocked by the texture) based on this determination.

Example Ray Tracing Shading Pipeline

Figure 10A:
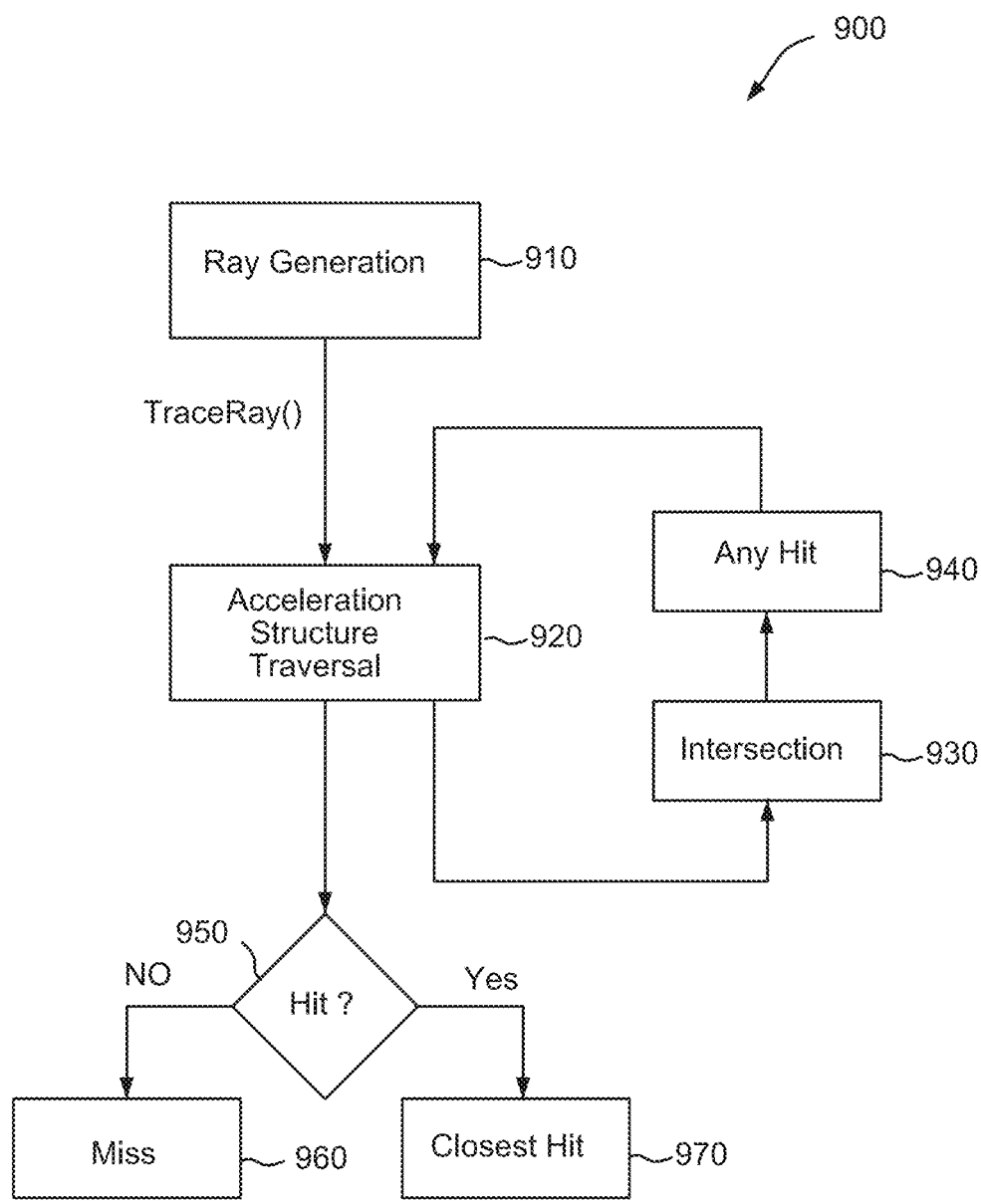
FIG. 10A illustrates an example non-limiting ray tracing shading pipeline flowchart.

FIG. 10A shows an exemplary ray tracing shading pipeline 900 that may be performed by SM 132 and accelerated by TTU 700. The ray tracing shading pipeline 900 starts by an SM 132 invoking ray generation 910 and issuing a corresponding ray tracing request to the TTU 700. The ray tracing request identifies a single ray cast into the scene and asks the TTU 700 to search for intersections with an acceleration data structure the SM 132 also specifies. The TTU 700 traverses (FIG. 10A block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 700 ray-primitive test block 720 performs an intersection 930 process to determine whether the ray intersects the primitives. The TTU 700 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 700 may return multiple intersections with different geometry in the scene in arbitrary order.

Alternatively, primitives that the TTU 700 determines are intersected may be further processed to determine 950 whether they should be shaded as a miss 960 or as a closest hit 970. The SM 132 can for example instruct the TTU 700 to report a closest hit in the specified geometry, or it may instruct the TTU to report all hits in the specified geometry. For example, it may be up to the SM 132 to implement a "miss" shading operation for a primitive the TTU 700 determines is intersected based on implemented environment lookups (e.g., approximating the appearance of a reflective surface by means of a precomputed texture image) such as shown in FIGS. 6A & 6B. The SM 132 may perform a closest hit shading operation to determine the closest intersected primitive based on material evaluations and texture lookups in response to closest hit reports the TTU 700 provided for particular object geometry.

Figure 10B:
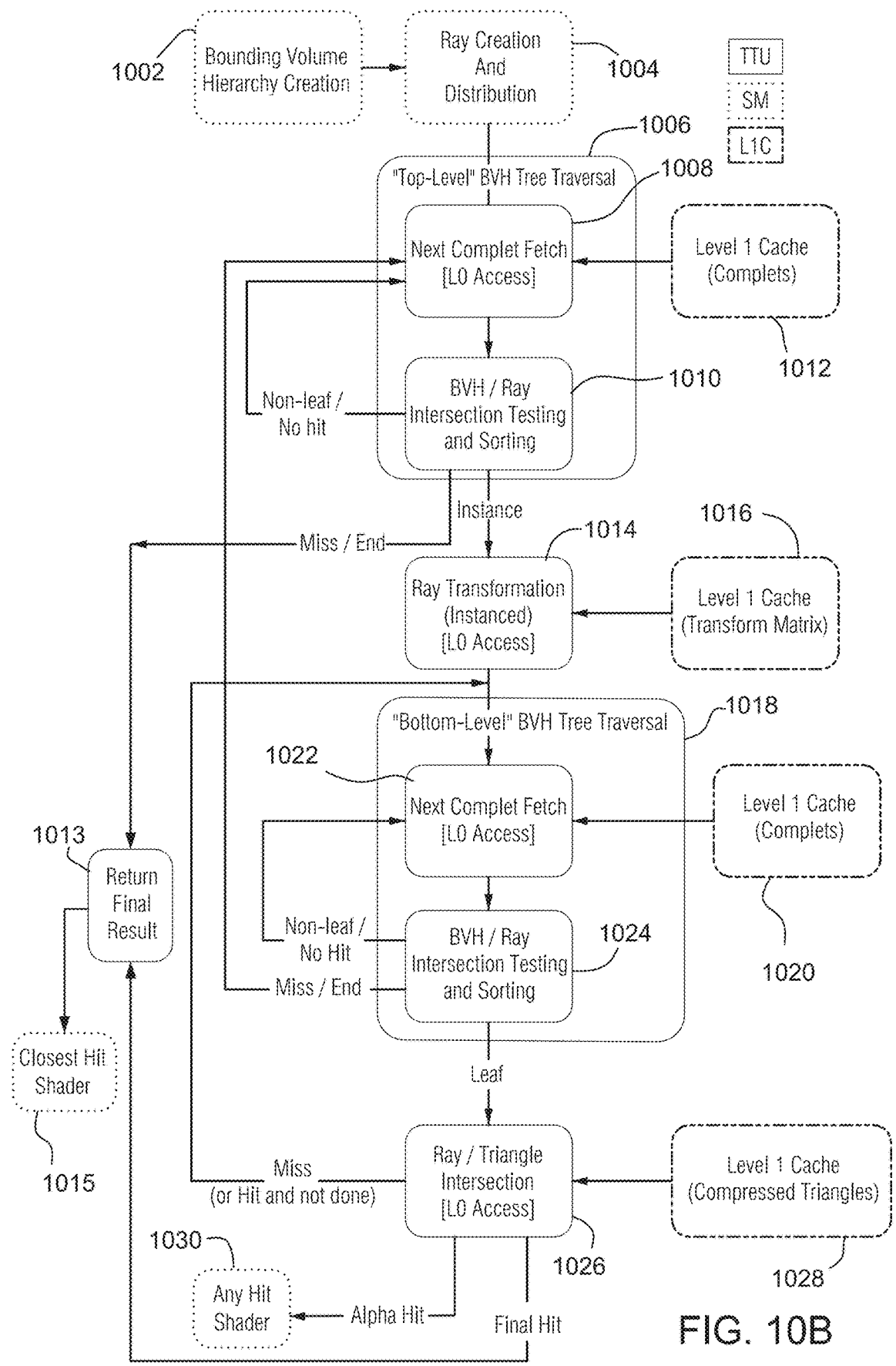
FIGS. 10B and 10C illustrate more detailed ray tracing pipelines.

The FIG. 10B more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 10B is essentially software-defined (which in example embodiments means it is determined by the SMs 132) but makes extensive use of hardware acceleration by TTU 700. Key components include the SM 132 (and the rest of the compute pipeline), the TTU 700 (which serves as a coprocessor to SM), and the L1 cache and downstream memory system, from which the TTU fetches BVH and triangle data.

The pipeline shown in FIG. 10B shows that bounding volume hierarchy creation 1002 can be performed ahead of time by a development system. It also shows that ray creation and distribution 1004 are performed or controlled by the SM 132 or other software in the example embodiment, as is shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 700. These do not have to be performed in the order shown, as handshaking between the TTU 700 and the SM 132 determines what the TTU 700 does and in what order.

The SM 132 presents one or more rays to the TTU 700 at a time. Each ray the SM 132 presents to the TTU 700 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 700 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 700 will process the query when the query intersects the bounding volume of a specific type or intersects a primitive of a specific primitive type. The mode flags the SM 132 provides to the TTU 700 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 700 to control various aspects of traversal behavior, back-face culling, and handling of the various child node types, subject to a pass/fail status of an optional RayOp test. RayOp tests add flexibility to the capabilities of the TTU 700, at the expense of some complexity. The TTU 700 reserves a "ray slot" for each active ray it is processing, and may store the ray flags, mode flags and/or the RayOp information in the corresponding ray slot buffer within the TTU during traversal.

In the example shown in FIG. 10B, the TTU 700 performs a top level tree traversal 1006 and a bottom level tree traversal 1018. In the example embodiment, the two level traversal of the BVH enables fast ray tracing responses to dynamic scene changes.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

In some embodiments, the top level traversal (in world space) is made in a BVH that may be dynamically recalculated (e.g., by SM 132) in response to changes in the scene, and the bottom level traversal is made in a BVH of bounding volumes that remain static or substantially static even when changes in the scene occur. The bounding volumes in the BVH used for the bottom level tree traversal 1018 (in object space) may encompass more detailed information regarding the scene geometry than the respective bounding volumes used in the top level tree traversal 1006, thereby avoiding or at least reducing the modification of the bottom level traversal BVH in response to scene changes. This helps to speed up ray tracing of dynamic scenes.

Example Top Level Tree Traversal

The top level tree traversal 1006 by TTU 700 receives complets from the L1 cache 1012, and provides an instance to the ray transformation 1014 for transformation or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

Figure 10C:
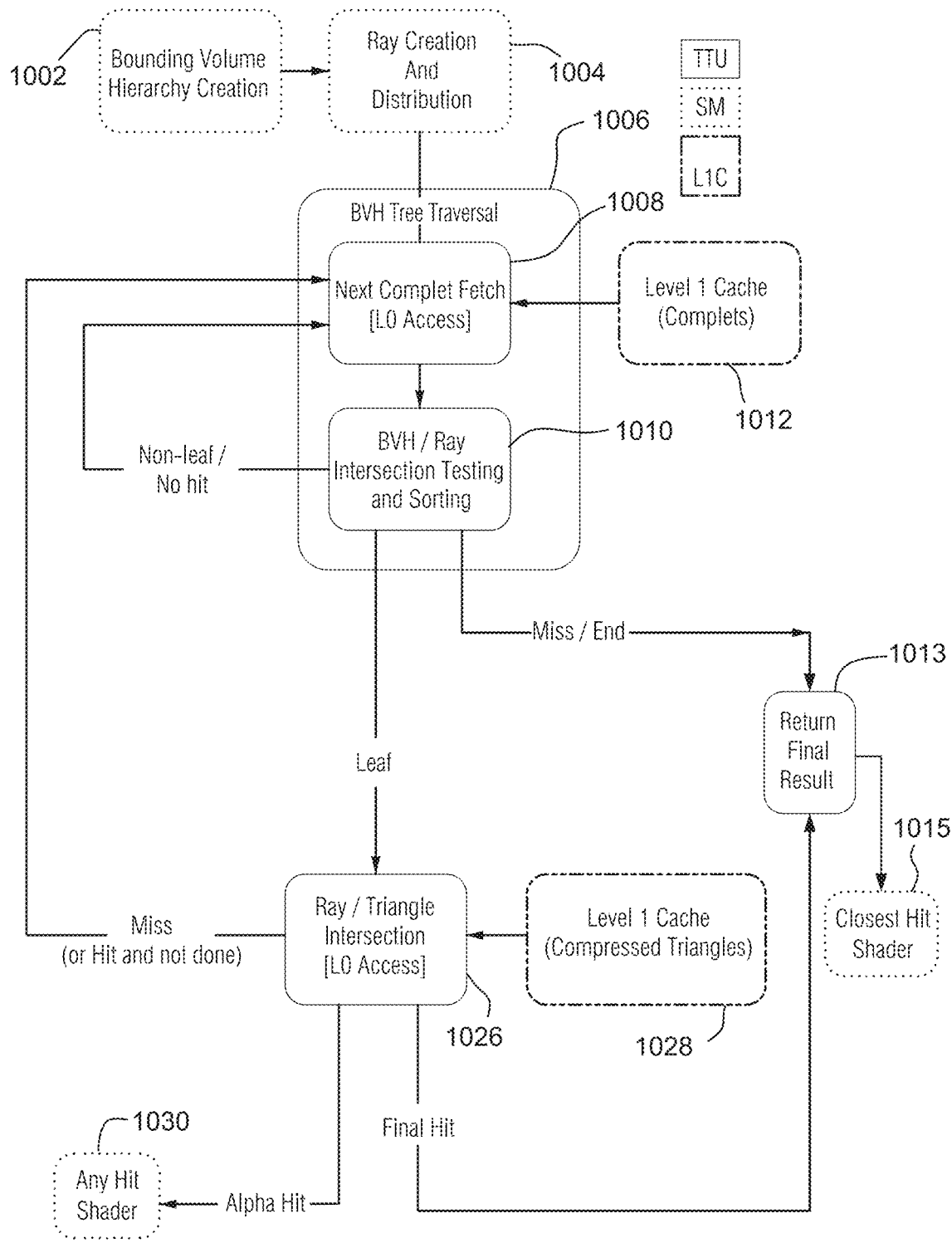

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 700, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 700 shown in FIG. 10C, the TTU does not execute a "bottom" level tree traversal 1018 and noninstanced tree BVH traversals are performed by blocks 1008, 1010 e.g., using only one stack. The TTU 700 can switch between the FIG. 10B instanced operations and the FIG. 10C non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582, 607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018.

Example Bottom Level Tree Traversal

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 700. The ray/triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection", and U.S. application Ser. No. 16/101,066 entitled "Method for Continued Bounding Volume Hierarchy Traversal on Intersection without Shader Intervention", which are hereby incorporated by reference in their entireties.

While the above disclosure is framed in the specific context of computer graphics and visualization, ray tracing and the disclosed traversal coprocessor could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

Example Ray Primitive Traversal with Deterministic Results

As discussed above, the TTU 700 includes dedicated hardware to determine whether a ray intersects bounding volumes and dedicated hardware to determine whether a ray intersects primitives of the tree data structure. The primitives of the tree data structure may include different geometric primitives (e.g., points, lines, triangles, quads, meshes, etc.), which are identified in the leaf nodes of the tree data structure. At least some of the primitives (e.g., triangles) may include a type designator to distinguish between different types of primitives. As discussed with reference to FIGS. 5A-5C, different types of triangles may include opaque triangles and alpha triangles.

The TTU 700 includes hardware that is configured to fully determine intersections for some type of primitives, while for other primitives the TTU 700 may only by itself determine possible intersections. For example, the TTU may fully determine that a ray intersects an opaque triangle. For alpha triangles, the TTU may only be able to determine that an intersection is possible and will need for the SM to resolve (e.g., based on texture information) whether or not the ray intersects a texture applied to the transparent triangle surface and/or whether the texture will block the ray.

In one embodiment, the TTU 700 may be configured to return all primitives determined to intersect the ray to the SM 132 for further processing. However, returning each intersected primitive and possibly intersected primitive to the SM 132 is costly in terms of interface and thread synchronization. In addition, the SM 132 will need resources to process at least some of the returned primitives to determine, for example based on texture mapping information, whether or not the ray intersects a texture applied to the transparent triangle and/or whether the ray will be blocked by the texture.

The TTU 700 provides a hardware solution to determine which intersected primitives can be omitted from the results provided to the SM 132 without a functional impact on visualization of the resulting scene. This allows for the TTU 700 to continue traversal of the BVH without intervention of a shader implemented in the SM with or without other associated hardware. For example, the TTU 700 may be configured to omit those primitives which are positioned behind an opaque primitive relative to a ray origin because, as discussed with reference to FIGS. 5A-5C, a ray in a scene will be blocked by an opaque primitive and will not reach other primitives even though the ray spatially intersects with them.

The TTU 700 may be configured to omit intersected primitives without a functional impact on visualization of the resulting scene while utilizing a small result queue in the TTU 700. When the number of intersected primitives (e.g., intersected alpha primitives) for a query exceeds the size of the result queue, the TTU 700 may need to perform multiple returns to the SM 132. When providing the intersection results to the SM 132 the results may need to be provided in a deterministic manner so that the SM 132 can provide consistent visualization results.

The TTU 700 may be configured to produce deterministic intersection results to the SM 132. The TTU 700 may be configured to produce deterministic intersection results even when the primitive range being tested for intersections is spread out over multiple cache line sized blocks that are provided to the TTU 700 in a random order. Accordingly, the TTU 700 may be configured to provide deterministic results to the SM 132 regardless of the order that the memory 140 returns blocks with primitive information to the TTU 700 for processing, while opportunistically omitting primitives from the results which are provably capable of being omitted without a functional impact on visualizing the virtual scene.

Deterministic results may help the SM to efficiently produce stable images without objectionable artifacts. For example, it is desirable for the TTU 700 to provide results to the SM in an order known to the SM. For example, if the SM sends the same query to the TTU 700 multiple times, the TTU 700 should provide the SM with the same results in the same sequence each time irrespective of factors such as the order in which the TTU 700 received data from memory or scheduled work internally. Deterministic results allow the SM to perform additional processing and issue appropriate requests (e.g., additional intersection queries) based on the received results in an efficient manner. In one example, if the TTU 700 does not provide deterministic results, the SM may issue a subsequent query which may not need to be issued or issue queries that do not accurately reflect what needs to be tested next for intersections. Inaccurately identifying the number and/or which primitives are intersected may introduce, for example, visual artifacts in images the system generates of a scene.

Meanwhile, the TTU 700 often calculates its results in orders that cannot be predicted in advance, based on variable factors such as the order in which the memory system retrieves traversal information the TTU 700 requests, the characteristics of the geometry in the graph, the specification of the SM's query to the TTU 700, internal scheduling within the TTU 700, and so on.

Figure 11:
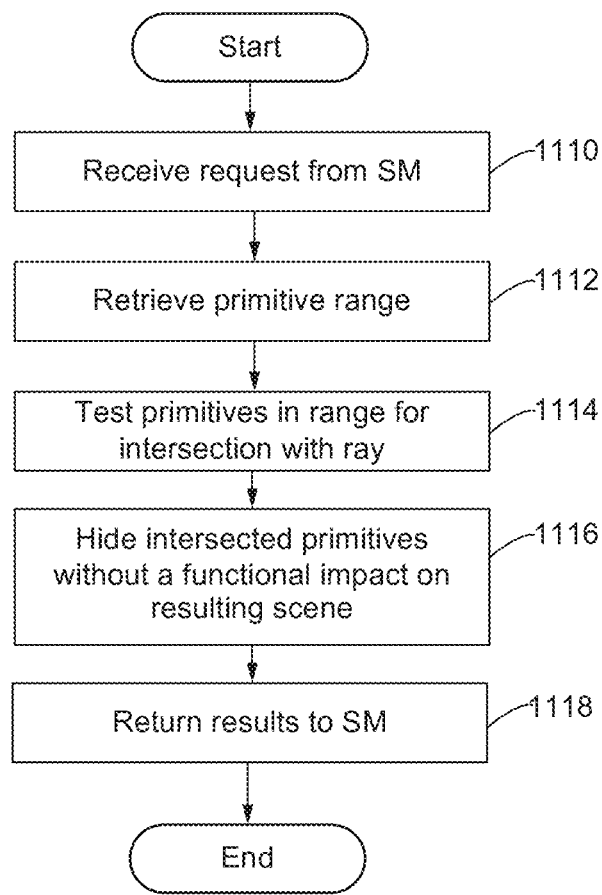
FIG. 11 is a flowchart of an example non-limiting method for accelerated ray-primitives intersection test.

FIG. 11 is a flowchart of an example non-limiting method for accelerated ray-primitives intersection test. The method may be performed by a TTU 700 disclosed in this application, but is not so limited.

The method includes receiving a request 1110. The request may be a query requesting a nearest intersection between a query data structure and a primitive range. The query may be received from an SM or may be the result of ray-complet test performed by the ray-complet test path of the TTU. In some embodiments the query data structure may be a ray given by its three-coordinate origin, three-coordinate direction, and minimum and maximum values for the t-parameter along the ray. The primitive range for the query may be identified in one or more stack entries of a stack management block in the TTU. The stack entries may be made based on results of finding intersected leaf nodes of a BVH in the ray-complet test path of the TTU.

The primitive range is retrieved from memory 1112. The primitive range may be retrieved from the TTU memory (e.g., triangle cache 754 of L0 cache 750) or memory outside of the TTU. The primitive range may for example be provided in a contiguous group of cacheline-sized blocks.

Each cacheline-sized block may include a header identifying the type of geometry expressed within the block and a primitive type of each primitive in the block. For example, the header may identify that the block includes triangles and indicate whether each triangle is an alpha primitive or an opaque primitive. The header may include an alpha bit for each primitive to designate whether the respective primitive is an alpha primitive or an opaque primitive.

Figure 12A:
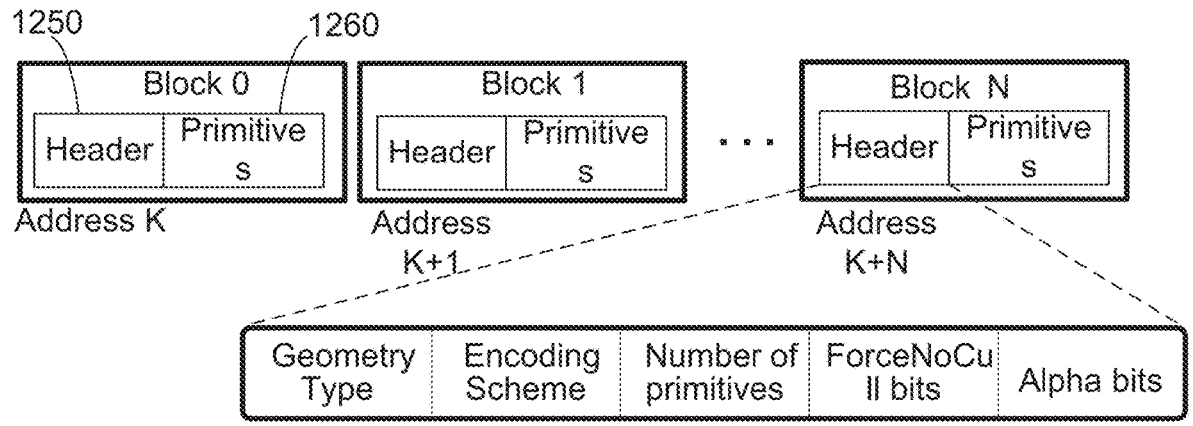
FIG. 12A illustrates a plurality of blocks 0-N identifying a primitive range according to an exemplary embodiment of this disclosure.

FIG. 12A illustrates a plurality of blocks 0-N identifying a primitive range according to an exemplary embodiment of this disclosure. Each block may include a header 1250 and geometric data for primitives 1260. Each block may be associated with a respective memory address (e.g., K, K+1, K+N) in physical or virtual memory. The geometric data for primitives may include vertices of a primitive (e.g., triangle including three vertices with each vertex identified by coordinates X0, Y0, Z0). In some embodiments, the geometric data may be compressed. As illustrated in FIG. 12A, the header may include type of geometry expressed within the block and the encoding scheme (for example, compressed triangles), the number of primitives in the block (minus one), and/or a set of ForceNoCull bits which indicate whether culling should be disabled for each primitive in the block, and/or a set of Alpha bits which indicate for each primitive in the block whether the primitive is an Alpha primitive or an Opaque primitive. The information included in the header 1250 is not limited to the information shown in FIG. 12A and may include other information such as application specific metadata for the primitives, and/or other primitive metadata values associated with one or more specific primitives in the block.

Each block may store geometric data for a plurality of primitives. In some embodiments, one or more blocks may include one or more opaque primitive and one or more alpha primitives. Each block may correspond in size to a cache line of the TTU 700 memory (e.g., L0 cache 750). In some embodiments, information for a varying number of primitives may be stored in any one block. The number of primitives stored within a given compressed block may be a function of data similarity of geometric data values for associated primitives. The blocks may be identified by a block number, with sequential blocks having corresponding sequential block numbers. Furthermore, sequential blocks may provide storage for sequentially identified primitives.

Examples of compressed and uncompressed blocks, and information that may be included in the header are disclosed in U.S. Patent Application Publication 2016/0071234, which is hereby incorporated by reference.

The method includes testing primitives in the primitive range for intersection with the ray 1114. Testing the primitives may include determining whether the ray intersects an area identified by the primitive (e.g., by vertices of a triangle in object-space coordinates). Each primitive in the primitive range may be tested for an intersection with the ray. To test the ray against the area identified by the vertices, the ray-triangle test path of the TTU 700 may transform the ray into the object-space coordinates of the primitive range using instance transforms.

The method includes omitting intersected primitives which can be determined to not have a functional impact on visualizing a resulting scene 1116. In one embodiment, an intersection management block 722 (see FIG. 9) may determine which spatially intersected primitives can be omitted from the results provided to the SM 132. The TTU 700 may determine that one or more spatially intersected primitives in the primitive range are occluded along the ray by another intersecting opaque triangle that is closer to the ray origin.

Because a closer opaque primitive in a scene will block the ray from passing through the primitive, the spatially intersected primitives occluded with respect to the ray origin by the opaque triangle do not need to be included in the result of intersected primitives and can be removed from the results to be reported to the SM 132 if they were previously added.

With reference to FIG. 5A, when the TTU determines that the ray intersects a front primitive which is opaque, the TTU can omit spatially intersected primitives behind the opaque primitive from the results. In FIG. 5B, the front spatially intersected primitive is an alpha primitive which may allow for the ray to pass through and hit other primitives. Primitives behind an alpha primitive should not be omitted from the reported results because the ray may, depending on location and or type of texture, pass though the alpha primitive and hit other primitives behind the alpha primitive. In some examples, the TTU may not able to determine by itself (e.g., without intervention of the SM) whether a spatial intersection alpha triangle will block a ray or allow the ray to pass to other primitives.

Accordingly, when the TTU determines that the ray spatially intersects an alpha primitive, the TTU adds the intersected alpha primitive to the results and continues the ray-primitive intersection test to determine any other spatially intersected primitives in the primitive range, which may be behind or in front the alpha primitive with reference to the direction of the ray. With reference to FIG. 5C, because the first two spatially intersected primitives are alpha primitives, both of the alpha primitives will be added to the result together with the opaque primitive.

In one embodiment, the TTU may omit primitives behind a spatially intersected opaque primitive only if all of the intersected primitives in the range are opaque. In another embodiment, the TTU may ignore primitives behind a spatially intersected opaque primitive regardless of whether other spatially intersected primitives are opaque or alpha primitives. In this example, the spatially intersected primitives which are excluded from the results may include opaque and/or alpha primitives.

The spatially intersected primitives which could have a functional impact on a resulting scene may be stored in a result queue (e.g., in the intersection management unit 722). The result queue provides a data structure within the TTU co-processor 700 for storing one or more opaque or alpha primitive intersections found during traversal. In one embodiment, the result queue allows the co-processor to defer alpha tests by the SM and potentially avoid them altogether if a closer opaque intersection occludes an alpha intersection.

Figure 12B:
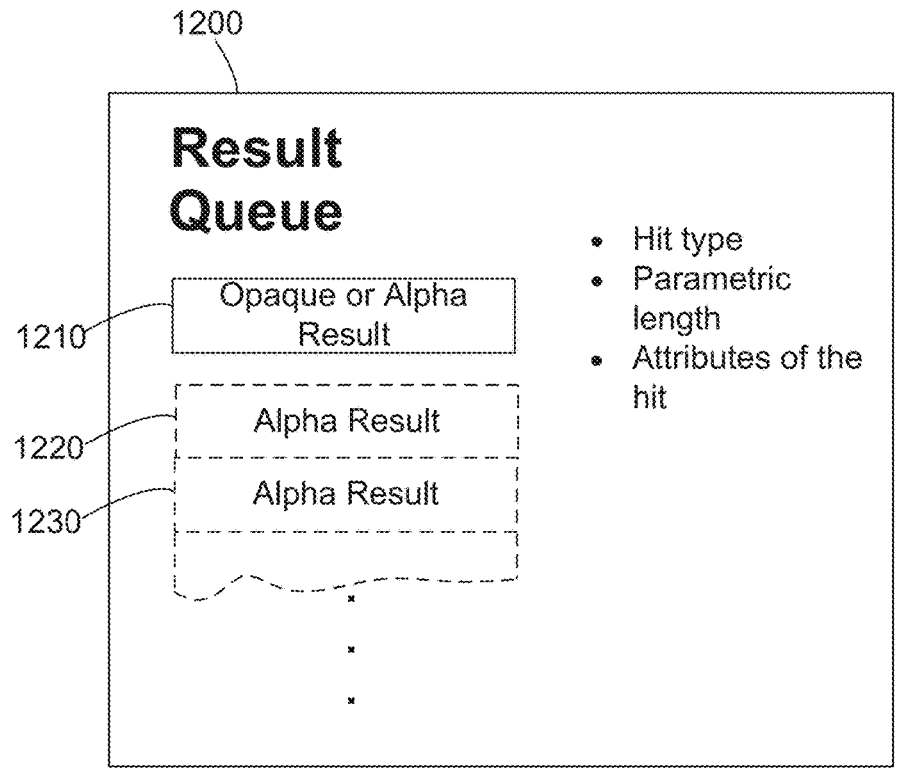
FIG. 12B illustrates a result queue according to an exemplary embodiment of this disclosure.

FIG. 12B illustrates a result queue 1200 according to an exemplary embodiment of this disclosure. The result queue 1200 may include an entry 1210 for one opaque primitive intersection or one alpha primitive intersection. The result queue 1200 may optionally include one or more additional entries 1220, 1230 for additional alpha intersections.

In one exemplary embodiment, each result queue entry specifies a hit type and a parametric length which specifies the point along the ray where the hit occurred and attributes of the hit such as the instance ID, material ID, or primitive ID which can be used by the SM to select a specific material shader and a set of resource bindings, and primitive IDs and (u,v) coordinates which can be used by the SM during shading to retrieve and interpolate attributes or sample textures.

In other embodiments, the result queue may include separate queues for opaque primitives and alpha primitives.

For example, the result queue may include a single entry for an opaque primitive intersection and one or more entries for alpha primitive intersections.

The method includes returning the results of intersected primitives to the SM 1118. The results may be returned to the SM when a query completes or in mid-traversal if the need should arise for SM intervention (for example, if the number of alpha hits found within a single triangle range exceeds the storage capacity for alphaHits of the result queue). If all of the primitives in the query are opaque, then the TTU can return only the closest opaque primitive to the SM. However, if the primitives include a mixture of opaque and alpha primitives, a plurality of alpha primitives may be intersected by the ray. Each of the intersected alpha primitives may be returned to the SM for further processing (e.g., to determine if there is a hit based on texture information associated with the alpha primitive).

The TTU 700 may return the intersected alpha primitives to the SM such that the results are deterministic regardless of the order the primitives in the primitive range are processed by the TTU 700. For example, the TTU 700 may process the primitives in the primitive range in the order that the cache line sized blocks are returned from the memory system 140 but return the results to the SM in an order known to the SM.

The order the cache line sized blocks are provided to the TTU 700 may depend on where in the hierarchy of the memory system 140 the requested blocks are located. Accordingly, the latency for each of the blocks may be different. For example, one of the requested blocks may be located in the L0 cache of the TTU, while other blocks may be located in the L1 cache or L2 cache of the memory hierarchy. In addition, as disclosed in co-pending commonly-assigned [US application Title: Method for Efficient Grouping of cache Requests for Data path Scheduling: Ref: 18-AU-012; 6610-33], the TTU L0 cache 750 does not necessarily handle requests in first-come-first-served order, but instead groups or bunches its responses. The L0 cache 750 may delay its response to "singletons" if it is busy providing a response to a group of rays. For at least these reasons, the order in which ray processing in the TTU receives requested parts of the BVH for testing may be unpredictable. Nevertheless, in example non-limiting embodiments, the TTU 700 may provide the intersected primitives in a deterministic manner to the SM by returning certain types of primitives (e.g., alpha primitives) in memory address order (e.g., ascending or descending) the primitives are stored rather than in the spatial order they are located in the scene or in the order the intersections are determined by the TTU 700.

The memory order of the primitives is provided by the address order the primitives are stored by the acceleration data structure (e.g., a BVH) in a physical memory or in a virtual memory. As discussed above, a leaf node identifies a primitive range stored in a plurality of contiguous cache line sized blocks. Primitive range may be expressed within the leaf data of the acceleration structure by an address of the first block containing the first primitive in the range, an index of the first primitive within that first block, a total number of blocks in the range, and an index of the last primitive in the last block. In the acceleration data structure the blocks associated with the primitive range are stored in a specific order and the primitives within each block are arranged in a specific order. The memory address order of the primitives is provided by the order of the blocks and the order of the primitives within each block. In some embodiments, the order of the primitives is specific to the particular acceleration data structure.

The SM may use the results to build the scene, issue additional queries to the TTU, and/or modify previously issued queries to the TTU. In one embodiment, spatially intersected primitives with the alpha bit set are returned to SM even if traversal has not completed. The spatially intersected primitives may be returned to the SM with traversal stack information which contains the state required to continue traversal if software determines that the triangle was in fact transparent. In one embodiment, the TTU may return the results to the SM after all of the primitives in the primitive range have been tested. In this embodiment, the size of the result queue needs to be sufficient to store all of the results.

In some embodiments, due to physical constraints, the result queue size may be limited to a single entry or few entries. For example, the result queue may include a single entry for the opaque intersection or the alpha intersection. In another example, the result queue may include a single entry for the opaque intersection and a plurality of entries (e.g., four entries) for the alpha intersections. When an intersection which cannot be discarded is identified and the result queue is full, the TTU 700 may return the results in the result queue to the SM with information for the SM to be able to resubmit the ray test query after processing one or more of the primitives identified in the results. For example, SM may resubmit the ray test query which skips over one or more primitives that have already been returned to the SM. Accordingly, if multiple alpha primitives are intersected in a ray, each intersected alpha primitive may be returned one by one to the SM.

The TTU 700 can be configured to provide the multiple alpha primitives determined to be intersected to the SM in the order they are stored in memory to provide deterministic results. In one example, when an alpha primitive intersection which cannot be omitted is identified and the result queue is full, the TTU 700 may replace one of the entries in the result queue with the new alpha primitive intersection. The TTU 700 may replace one of the entries in the result queue if the new alpha primitive intersection is located earlier in memory order than one of the alpha primitive intersections stored in the result queue.

Example Ray Triangle Traversal without Shader Intervention and with Deterministic Results In a more specific example, the TTU operates by tracing rays through a generated BVH which includes internal nodes, instance transforms, item ranges, and triangle ranges. Internal node intersections traverse further into the hierarchy. Instance node intersection can do a hardware accelerated instance transform and then continue traversal on the instanced child BVH. Item ranges are returned to the SM. Triangle ranges can use specific hardware acceleration inside the TTU in the Ray Triangle Test (RTT) block to determine an intersection between a ray and a specific triangle. In general a query is concerned about either the closest interaction to the ray origin or simply that there was an intersection.

The TTU has two types of triangles that it intersects: opaque and alpha. The type of triangle can be designated by a flag (e.g., an alpha triangle flag). The TTU may be configured to determine an intersection fully for an opaque triangle in the ray-triangle test path of the TTU. The TTU may not be able to fully determine an intersection for alpha triangles. For alpha triangles, the ray-triangle test path of the TTU determines that there could be an intersection and the information about the possible intersection is sent to the SM to determine the presence of absence of an actual intersection. An example use of an alpha triangle is in foliage where a leaf may be represented by a single triangle to which a texture is applied to define a tighter bound around the actual leaf shape. This concept is illustrated in FIGS. 6A and 6B where a texture 615 of a leaf is applied to a portion of the triangle 610. The alpha triangle flag can also be applied to otherwise opaque triangles so that the TTU returns every triangle intersected by the ray.

The TTU includes the Intersection Management Unit (IMU) and a result queue which allow the TTU to handle the different primitive hit types and not have to return all intersected triangles to the SM. Reducing those returns is desirable since a return to the SM requires a warp-wide synchronization. The intersection results are stored in the result queue and are returned to the SM when a query completes or in mid-traversal if the need should arise for SM intervention (for example, if the number of alpha hits found within a single triangle range exceeds the storage capacity for alphaHits of the resultQueue).

Figure 13:
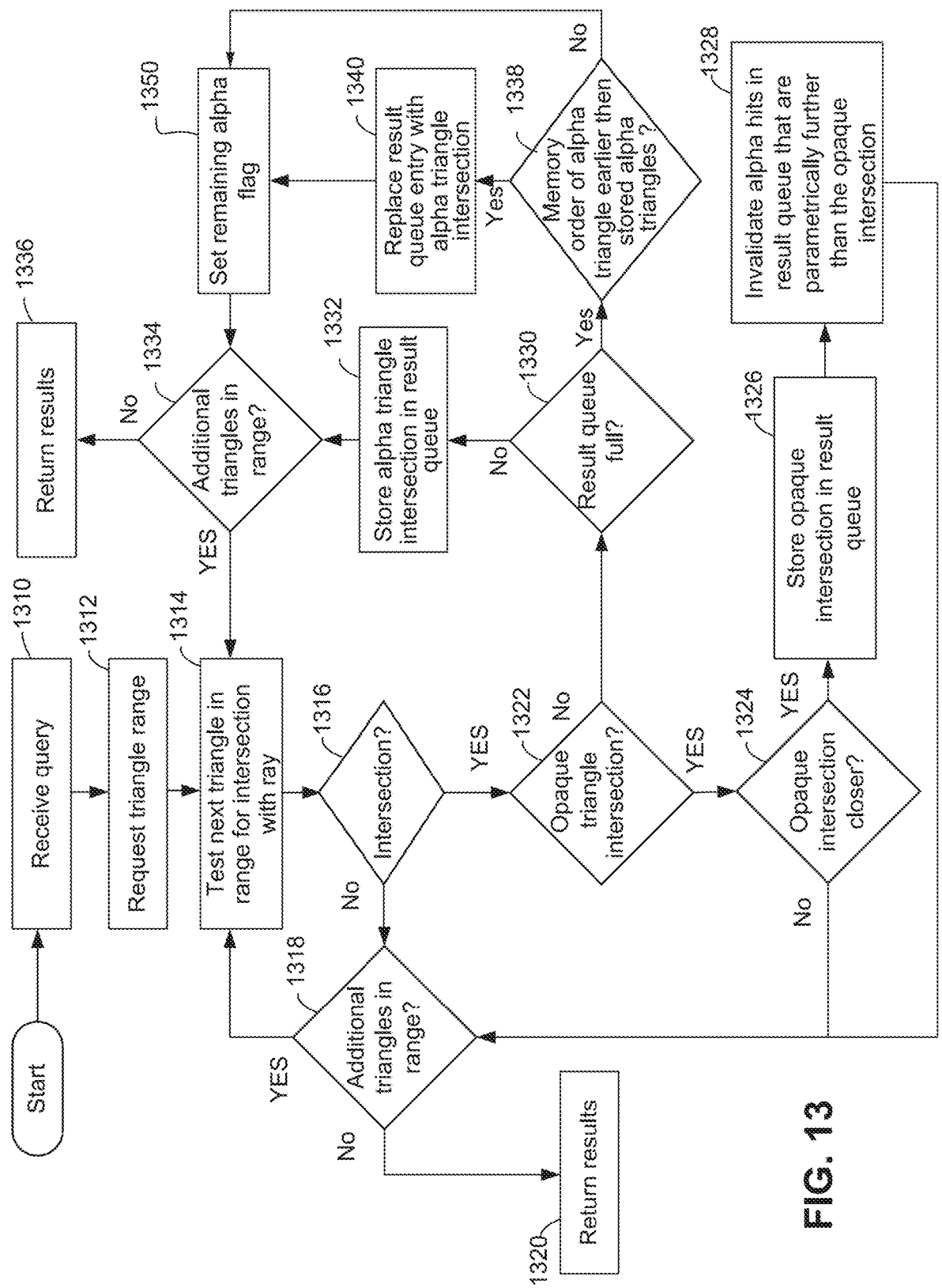
FIG. 13 is a flowchart of an example non-limiting method for accelerated ray-triangle intersection test.

FIG. 13 is a flowchart of an example non-limiting method for accelerated ray-triangle intersection test. The method may be performed by a TTU 700 disclosed in this application, but is not so limited.

The TTU may be configured to handle a certain geometry type primitives in the ray-primitive test path of the TTU. In some implementations, other primitive types may not be supported in the ray-primitive path of the TTU. Primitive types not supported in the ray-primitive path of the TTU may be returned to the SM for processing (e.g., after being identified in the ray-complet test path of the TTU or when they are encountered in the ray-intersection test path of the TTU). The flowchart in FIG. 13 is explained with reference to a TTU that is configured to handle triangles in the ray-primitive test path, but is not so limited. The ray-primitive test path of the TTU may be configured to determine intersections for other primitives, and may be configured to determine intersections for a plurality of different primitives. In some embodiments, the TTU may include a plurality of ray-primitive test paths each configured to handle a different primitive.

The flowchart illustrated in FIG. 13 includes the TTU 700 receiving a query requesting a nearest intersection between a ray and a primitive range (step 1310). The query may be received from an SM 132 or may be initiated based on the result of ray-complet test performed by the ray-complet test path of the TTU.

The ray may be identified by its three-coordinate origin, three-coordinate direction, and minimum and maximum values for the t-parameter along the ray. The primitive range for the query may be identified in one or more stack entries of a stack management block 740 in the TTU. In one embodiment, the ray-complet test may identify one or more intersected leaf nodes of a tree which point to a range of primitives or items. The primitive range can be a set of consecutive primitives that start at the n-th primitive in a block of memory and run for zero or more blocks until the m-th primitive of the last block. A block may be a cache line (e.g., 128B). The primitives may be compressed in the cache lines, with a varying number of primitives in each cache line. A range of primitives could span over a varying number of cache lines.

The primitive range is retrieved from memory (step 1312). The primitive range may be retrieved from the TTU memory (e.g., triangle cache 754 of L0 cache 750) or memory 140 outside of the TTU. The primitive range may be provided in a contiguous group of cacheline-sized block. Each cacheline-sized block may include a header identifying the type of geometry expressed within the block and a primitive type of each primitive in the block.

The method includes testing a primitive in the primitive range for intersection with the ray (step 1314). Because the block with the primitive range can encode multiple opaque or alpha primitives in any order, and the primitive range can span multiple blocks returned in arbitrary order by the memory subsystem of the TTU, the first primitive tested may not be the closest primitive to the ray origin. For similar reasons, the first primitive tested may not be the first primitive in memory order of the range of primitives.

The ray-triangle test and transform block 720 may test the primitive for intersection with the ray. If the ray-triangle test and transform block 720 determines an intersection, the ray-triangle test and transform block 720 may pass information about the intersection to the IMU 722. Testing the primitive for intersection may include determining whether the ray intersects an area identified by vertices of the primitive. The ray-triangle test and transform block 720 may transform the ray into object-space coordinates of the primitive before performing the intersection test.

If there is no intersection between the primitive and the ray (No in step 1316), then the primitive can be omitted from the results and a determination is made as to whether there is another primitive in the range to be tested (step 1318). If there is another primitive to be tested in the primitive range (Yes in step 1318), either in same block or another block associated with the primitive range, then the triangle-ray test may be performed on the next primitive (step 1314). If there are no other primitives in the primitive range to be tested (No in step 1318), then the ray-triangle test is complete and the results of the ray-triangle test can be sent to the SM or another block inside or outside of the TTU 700 initiating the query (step 1320). Returning the results (step 1320) may provide the parametric opaque intersection in the primitive range which is closest to the ray origin and/or one or more alpha intersections stored in the queue. For each primitive determined to be intersected, the results may include the triangle ID, along with the t-value, and coordinates of the intersection (e.g., barycentric coordinates of the intersection). If no intersections are identified in the primitive range, the result to the SM will indicate that no intersections were found.

If there is an intersection between the primitive and the ray (Yes in step 1316), then a determination is made (step 1322) whether the primitive is an opaque primitive. This determination may be performed by the IMU 722 based on the alpha bit associated with the primitive. If the intersection is with an opaque primitive (Yes in step 1322), then the IMU 722 may determine whether the opaque primitive intersection is closer to the ray origin than an opaque intersection stored in the result queue (step 1324). If the incoming opaque primitive intersection is closer to the ray origin than a previously stored opaque primitive intersection in the result queue (Yes in step 1324), then the opaque primitive intersection will replace the previously stored opaque primitive intersection in the result queue (step 1326). Similarly, if the there is no opaque primitive intersection stored in the result queue and there are no alpha intersections in the result queue, then the incoming opaque intersection is the closest intersection to the ray origin and will be stored in the queue (step 1326).

Determining whether the incoming opaque intersection is closer to the ray origin than the opaque intersection stored in the result queue may include the IMU 722 comparing the intersections' t-values representing a parametric length along the ray (point along the ray where the intersection occurred). The intersection having the smaller t-value may be stored in the result queue because it is closer to the ray origin and hides other primitives from the viewer along the ray. Primitives having a larger parametric length will be culled.

In determining which intersection is closer (step 1324), two primitives could have the same parametric intersection value. "T-fighting" may exist in two triangle blocks of the same triangle range. In one embodiment, whichever primitive would go first by memory order would win and be stored in the result queue. Other embodiments could use different mechanisms to determine which triangle wins.

In some exemplary embodiments, when a new intersection for an opaque primitive is stored in the result queue (step 1326), the length of the ray may be shortened to the parametric length of the opaque primitive's intersection. In this manner, when the ray intersection test is repeated for other primitives, the TTU will not record an incoming opaque or alpha intersection in the result queue if its t-value is beyond the t-value of the opaque intersection stored in the result queue. To provide deterministic results (e.g., when two primitives could have the same t-value), the ray may only be shortened after an entire primitive range has been processed. In this embodiment, the closest intersection test in (step 1324) may be sufficient to cull further primitives without needing to shorten the ray until all of the primitives in the primitive range are tested for intersections.

When a new opaque primitive intersection is stored in the result queue (step 1326), any alpha intersection stored in the result queue which is parametrically farther away from the origin of the ray may be invalidated in the result queue (step 1328). Which alpha intersections to invalidate may be determined based on the t-values of the intersected primitives. For example, alpha intersections in the result queue which have a greater t-value than the t-value of the newly stored opaque intersection may be removed from the result queue. After updating the result queue based on the t-value of the opaque intersection, if there are any remaining alpha intersections, they must be parametrically closer than the intersected opaque intersection stored in the result queue.

If the intersected opaque primitive is not closer to the ray origin than a previously stored opaque intersection in the result queue (No in step 1324), then the intersected opaque primitive is omitted from the result queue and a determination is made whether there are any additional primitives in the range (step 1318). If there is another primitive to be tested in the primitive range (Yes in step 1318) either in the same block or another block associated with the primitive range, then the triangle-ray test may be performed on the next primitive (step 1314). If there are no other primitives in the primitive range to be tested (No in step 1318), then the processing of the primitive range is complete and the results of the ray-triangle test can be sent to the SM or another block inside or outside of the TTU issuing the query (step 1320).

Accordingly, after an intersection of an opaque primitive, rather than return that primitive intersection to be recorded by the SM, the IMU unit instead stores the primitive information and the distance at which the primitive was hit. The ray may be internally shortened in the TTU such that any item or primitives beyond that opaque primitive are culled. Any previously intersected alpha primitives that are located parametrically behind the opaque primitive are invalidated. In other examples, the length of the ray may be maintained by the TTU until the range is tested and be shortened by the SM on subsequent queries.

If the intersection is with an alpha primitive (No in step 1322), then the IMU determines whether the result queue is full (step 1330). If the result queue is not full (No in step 1330), then the alpha intersection can be added to the result queue (step 1332). When other alpha intersections from the same primitive range are already stored in the result queue, the new alpha intersection may be stored in the result queue based on the memory order that the primitives are provided in the BVH. If the result queue is full the incoming alpha intersection may replace an alpha intersection from the same primitive range if the incoming alpha intersection is earlier in memory order than the alpha intersection After adding the alpha intersection to the result queue, a determination is made whether there are any additional primitives in the range (step 1334). If there is another primitive to be tested in the primitive range (Yes in step 1334) either in same block or another block associated with the primitive range, then the triangle-ray test may be performed on the next triangle (step 1314). If there are no other primitives in the primitive range to be tested (No in step 1334), then the results of the ray-triangle test can be sent to the SM or another block inside or outside of the TTU (step 1336). Accordingly, in one example embodiment, the intersection information in the result queue will not be returned to the SM until all of the blocks associated with the primitive range are processed.

If the result queue is full (Yes in step 1330), then the IMU determines if the memory address order of the new alpha primitive intersection is earlier than a memory address order of any alpha intersection from the same primitive range already stored in the result queue (step 1338). If the memory address of the incoming alpha intersection is earlier than the memory address order of any alpha intersection from the same primitive range stored in the result queue (Yes in step 1338), then the IMU will replace one of the alpha intersections stored in the result queue with the new alpha intersection (step 1340). In storing the new alpha intersection, the intersection of alpha primitive with the higher memory address can be replaced. Accordingly, the IMU inserts an incoming intersected alpha primitive from earlier in the memory address order of the primitive range ahead of an intersected alpha primitive from the same primitive range that appears later in the memory address order regardless of whether the incoming alpha intersection is parametrically closer or farther than the alpha intersection which was stored earlier in the memory address order.

After storing the intersected alpha primitive in the result queue (step 1340), a remaining alphas flag is set to indicate that there are additional alpha intersections in the primitive range that are not stored in the result queue (step 1350). If the remaining alphas flag is set, then other alpha hits were found in the primitive range later in memory order besides the alpha hits present in the result queue. Those remaining alpha hits may need to be processed after the SM consumes the set of alpha hits in the result queue.

After storing the alpha intersection in the result queue (step 1340) and setting the remaining alpha flag (step 1350), a determination is made whether there are any additional primitives in the range (step 1334). If there is another primitive to be tested in the primitive range (Yes in step 1334) either in same block or another block associated with the primitive range, then the triangle-ray test may be performed on the next primitive (step 1314). If there are no other primitives in the primitive range to be tested (No in step 1334), then the processing of the primitive range is complete and the results of the ray-triangle test can be sent to the SM (step 1336) or traversal can continue. In one embodiment, after the primitives in one block of the group of blocks are all tested for intersection, the pending cache line counter is decremented. When the pending cache line reaches zero, all blocks of the group of block have been processed.

If the memory address of the incoming alpha intersection is not earlier than the memory address order of any alpha intersection from the same primitive range stored in the result queue (No in step 1338), then the alpha intersections stored in the result queue will be maintained and a remaining alpha flag is set to indicate that there one or more additional alpha intersections in the primitive range that are not stored in the result queue (step 1350). If the remaining alpha flag is set, then other alpha hits were found in the primitive range later in memory order besides the alpha hits present in the result queue.

The operations illustrated in FIG. 13 may be repeated until all of the triangles in the primitive range are tested for intersection with the ray. After all of the triangles in the primitive range are tested, the results may be provided to the SM or another block for further processing (step 1336). As illustrated in FIG. 13, if all of the intersected alpha triangles cannot fit into the result queue, the TTU may return information for intersected alpha triangles starting with the intersected alpha triangles found earlier in the memory address order regardless of whether the other alpha intersections are parametrically closer or further away from the ray origin. The TTU provides current intersection information to the SM in memory address order together with the ray and stack information so that the SM can issue another query after receiving the results.

The TTU may modify the traversal state in the stack based on the progress of the operations illustrated in FIG. 13. The top stack entry (referencing the current primitive range) may set the cullOpaque to TRUE and advances the starting primitive index to 1+the largest alpha primitive index from the current primitive range stored in the resultQueue when all of the triangles in the range have been tested (No in step 1318 or No in step 1334). The modified top stack entry and the ray may be sent to the SM with the result queue (steps 1336 or 1320) to provide the stack entry information with a subsequent query to the TTU issues by the SM.

Returning the results of the ray-triangle test to the SM 132 (step 1336) may include indicating to the SM 132 that there are additional alpha intersections in the primitive range that were not included in the result queue due the limited size of the queue. The IMU may be configured to set a remaining alpha bit when a result of an alpha intersection is removed from the result queue because an alpha intersection that is earlier in memory order is identified or when an alpha intersection is identified but is not added to the result queue because it is located later in memory order then alpha intersections already stored in the result queue (step 1350). The remaining alpha bit is sent to the SM 132 so that the SM 132 can issue another ray-triangle intersection query. The result queue may be sent to the SM 132 with traversal stack information which contains the state needed to continue traversal for determining any remaining alpha intersections in the primitive range.

The SM 132 may issue the subsequent query based on processing performed related to the returned results or without performing any processing. The subsequent query issued by the SM 132 will include the stack information received from the TTU which will ensure that the primitive range in the subsequent query does not include the intersected alpha primitives that were already returned to the SM 132. The subsequent query may update the length of the ray to the parametric length of the opaque intersection or one of an alpha intersection, if the SM determines that one or more of the intersected alpha primitives will block the ray at a parametric distance closer to the ray origin than an opaque primitive intersection. If the SM 132 determines that the intersected alpha triangles did not block the ray, the SM 132 may maintain the same ray parameters in the subsequent query but modify the range of triangles to be tested.

In one embodiment with a range of triangles including both alpha and opaque intersections, the results of the ray-triangle test returned to the SM 132 (step 1336) may include one opaque intersection and one or more alpha intersections. The opaque intersection returned to the SM 132 will be parametrically closer to the ray origin than any other opaque intersection in the primitive range. The alpha intersection(s) returned to the SM 132 will be parametrically closer than any opaque intersection in the result queue, but will be stored in the result queue in memory order they are provided in the tree data structure.

In one embodiment with the result queue including a single entry for an opaque intersection or an alpha intersection, if an intersection with an alpha primitive is determined (No in step 1322) and an opaque intersection is stored in the single entry of the result queue, then the result queue may be returned to the SM 132 along with information on how to continue traversal before storing the alpha intersection in the result queue. After returning the opaque intersection to the SM 132, the TTU 700 may receive another query from the SM 132. The other query may include a modified query which will not consider any opaque triangles in that range because the closest hit opaque primitive has been provided to the SM. The other query may also update the length of the ray to the parametric length of the intersection, so that any primitives spatially located behind the opaque primitive are not intersected by the ray.

In this example, the TTU 700 returns the stored intersection to the calling thread with a request to ask again for the ray-triangle query because there are more triangles that need to be tested. The SM 132 may use the information on how to continue traversal to issue a query to the TTU 700 to continue the ray intersection test for the primitive range starting at the primitive following in memory the returned opaque primitive intersection. In this manner, the TTU 700 will once again identify the alpha primitive intersection, but this time there will not be an opaque intersection stored in the result queue and alpha intersection can be returned to the SM 132 for further processing (e.g., to determine if there is an actual hit).

Some implementations may use large buffers in IMU to accumulate a single opaque intersection and/or multiple alpha intersections before returning to the SM. Given the nature of opaque primitives, it is never necessary to accumulate more than one. This further reduces the number of returns between the TTU and the SM. Some implementations may use large buffers also to record item range intersections and continue traversal beyond the first identified item range, which may otherwise be returned mid-traversal when the item range is encountered.

The primary difference, and the use of a hardware solution enables this, is that we can hide those items or triangles which are provably capable of being hidden without a functional impact on the resulting scene while providing deterministic results. Determining which primitives can be hidden without a functional impact on the resulting scene may be done based on alpha based processing performed mid-traversal of the BVH. By handling the alpha based processing mid-traversal the ray does not have to be re-fired from the beginning every time.

The embodiments of this disclosure are different from software implemented approaches where the texture or shading functions are evaluated only after the closest hit in the BVH is determined for the whole triangle range. In software implemented approaches the closest hit is evaluated to determine if anything is blocking the light and then the shader launches a new ray. In contrast, embodiments of this disclosure provide for mid-traversal alpha processing which may reduce the number ray-casting queries that need to be made.

In one exemplary embodiment, the TTU may be configured to process all of the opaque primitives to determine the closest opaque hit before processing to processing the alpha primitive to determine possible intersections. In this embodiment, after testing all of the opaque primitives, the ray may be shortened to the parametric length of the closest opaque hit and any alpha primitives located parametrically farther from the origin than the opaque intersection will be determined to not be intersected by the ray.

After processing primitives in a primitive range, the TTU may continue traversal and stay in the TTU instead of returning the result queue to the SM every time primitive range processing which finds a hit is finished. In some embodiments, transmitting intersection information stored in the result queue to a can be held at least until after the last primitive of the last block of the primitive range has been processed. The TTU can continue traversal and defer returning a result queue with hits in it to the SM, when there is only an opaque hit in the result buffer, and no flags indicate that intersections found in the primitive range were dropped or invalidated because the result queue was full (e.g. remainingAlphas), or when there are alphas in the result queue, and no flags indicate that intersections found in the primitive range were dropped or invalidated because the result queue was full (e.g. remainingAlphas) and the result buffer is not currently full. In some embodiments, the TTU can continue traversal and defer returning a result queue with hits in it to the SM, as long as mode bits say it is ok to continue traversal (e.g. no terminateOnFirstHit flag is set), and the TTU returns the result queue when traversal completes.

FIG. 13 is discussed with reference to providing intersection results in a deterministic manner based on the ascending memory address order of the primitives. In other example embodiments, the results may be provided deterministically by returning the primitive intersections in descending memory address order. In other example embodiments, the results may be provided deterministically by returning the primitive intersections in the order the alpha primitives are spatially located in space regardless of the order that blocks are returned by the memory subsystem to the TTU for processing.

In some exemplary embodiments, the query may include information for modifying how opaque and/or alpha triangles are treated. For example, the query may instruct the TTU to treat opaque triangles as alpha triangles and/or alpha triangles as opaque triangles.

In some examples, the query-specific dynamic and programmable changes may be included in the traversal process by providing a per-ray set of ray operations (each ray operation is referred to as a "RayOp"), associated ray parameters, ray flags and mode flags, based upon which the default behavior of the TTU traversal can be changed on a per-ray and/or per-intersection basis. More details about setting per-ray operations are provided in co-pending U.S. application Ser. No. 16/101,180 titled "Query-Specific Behavioral Modification of Tree Traversal", which is hereby incorporated by reference in its entirety. The ray flag settings may determine how the alpha triangles and/or opaque triangles are treated. The ray flag setting may override the alpha bit setting in the triangle block. Accordingly, the bit in the triangle block may not be the definitive bit for specifying whether a triangle should be treated as opaque or alpha within the RTT. How the triangles are treated may be modified by the per-ray mode bits to have a different behavior.

The ray flag setting may instruct the TTU to treat all opaque triangles as alpha triangles for a given query so that the intersection results will return each intersected alpha and opaque triangle to the SM. In another example, the ray flag setting may instruct the TTU to treat all alpha triangles as opaque triangles for a given query to return the closest intersected triangle (regardless of whether the closest intersection is with an opaque triangle or an alpha triangle).

Example Ray Triangle Traversal Providing Deterministic Results

FIGS. 14, 15A-C, 16A-C, and 17A-D illustrate non-limiting example embodiments of returning intersection results for a range of triangles identified in a plurality of blocks stored in memory. In the example shown in FIG. 14, the number of intersected triangles in the triangle range does not exceed a number of entries in the result queue. In the example shown in FIGS. 15A-C and FIGS. 16A-C, the number of intersected triangles in the triangle range exceed a number of entries in the result queue and multiple mid-traversal returns are needed to return the intersection results to the SM. FIGS. 14, 15A-C, and 16A-C illustrate independent queues for storing opaque and alpha intersection results. In other embodiments, the result queue may be implemented as a single queue with opaque/alpha markings. FIGS. 17A-D illustrate an example embodiment with a single entry result queue.

Figure 14:
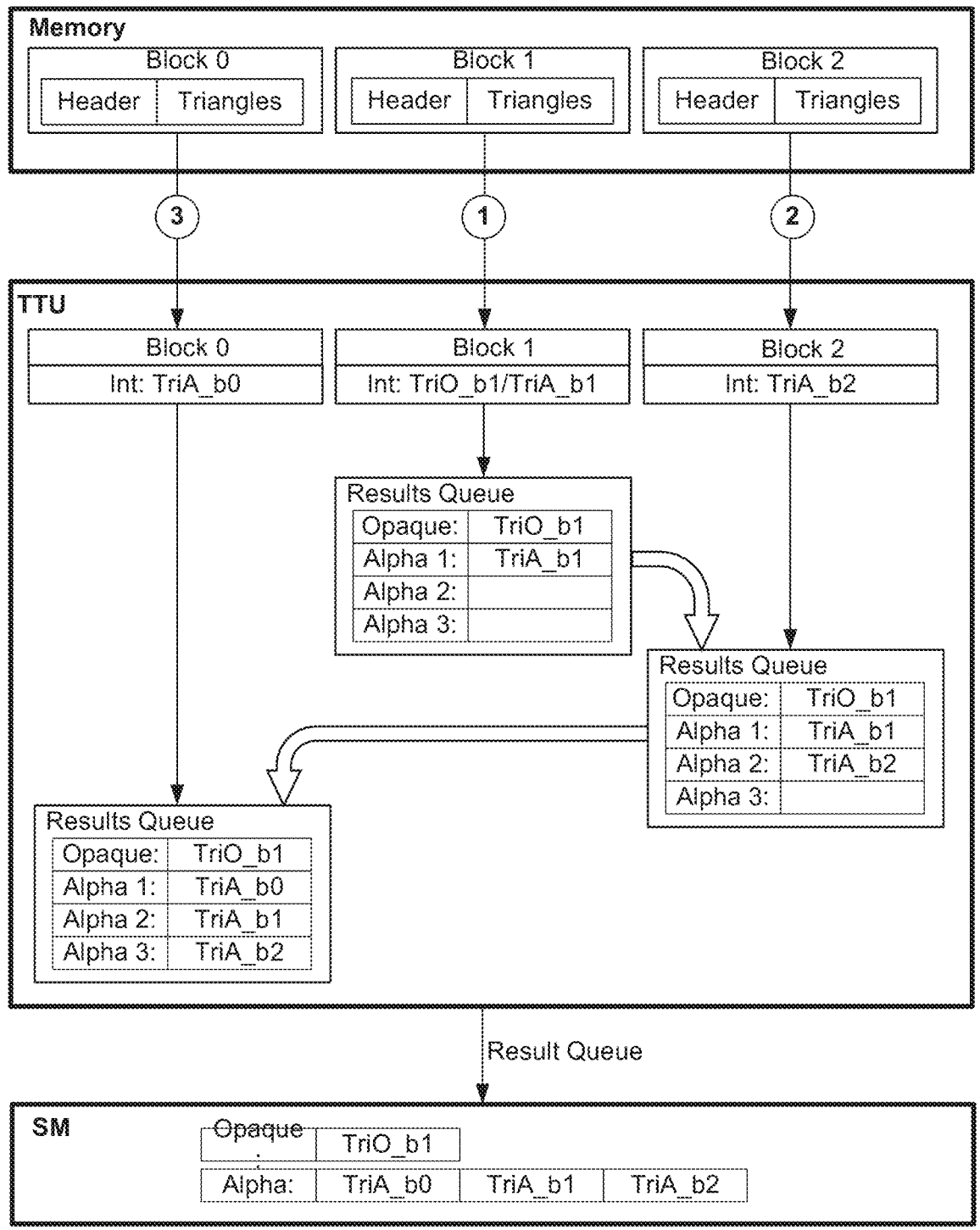
FIGS. 14, 15A-C, 16A-C, and 17A-D illustrate non-limiting example embodiments of returning intersection results for a range of triangles identified in a plurality of blocks stored in memory.

With reference to FIG. 14, a range of triangles to be tested for intersections with a ray are identified over three cache line sized blocks (Block 0, Block 1, and Block 2) stored in a memory system. The ray-triangle intersection test unit of the TTU receives the blocks from a memory system in response to a request for the blocks. The order the blocks are provided from the memory system may depend on where in the hierarchy of the BVH the requested blocks are located and/or where in the hierarchy of the memory system the requested blocks are located. In the example shown in FIG. 14, Block 1 is provided first, Block 2 is provided second, and Block 0 is provided last to the ray-triangle intersection unit of the TTU. The TTU is configured to process the triangles identified in the blocks in the order they are received from the memory system to avoid latency associated with waiting for each block of the triangle range to be received. In an example embodiment, the ray-triangle intersection test unit in the TTU process the triangles identified in the blocks in the order they are received from the L0 cache of the TTU.

As shown in FIG. 13, Block 1 is received first from the memory system and the triangles identified in Block 1 are processed (e.g., in the order they are arranged in the block) to determine if any triangles are intersected by the ray. The TTU determines that an opaque triangle TriO_b1 and alpha triangle TriA_b1 are intersected in Block 1. The TTU stores opaque triangle TriO_b1 and alpha triangle TriA_b1 intersections in the result queue and proceeds to process triangles identified in the next received block (i.e., Block 2).

Alpha triangle TriA_b1 is added to the result queue because Alpha triangle TriA_b1 is spatially located between an origin of the ray and the intersected opaque triangle TriO_b1. If Alpha triangle TriA_b1 was located behind the opaque triangle TriO_b1 it would not have been added to the result queue. Any alpha triangles that may be spatially intersected by the ray but located spatially behind the opaque triangle TriO_b1 are not included in the result queue.

The triangles identified in Block 2 are processed to determine if any triangles are intersected by the ray. The TTU determines that alpha triangle TriA_b2 is intersected by the ray in Block 2. The TTU stores alpha triangle TriA_b2 intersection in the result queue and proceeds to process triangles identified in the next received block (i.e., Block 0).

The triangles identified in Block 0 are processed to determine if any triangles are intersected by the ray. The TTU determines that alpha triangle TriA_b0 is intersected by the ray in Block 0. The TTU stores alpha triangle TriA_b0 intersection in the result queue. Alpha triangle TriA_b0 is a triangle that is spatially located between an origin of the ray and the intersected opaque triangle TriO_b1.

After all of the blocks and triangles identified in the blocks are processed, the intersection results in the result queue can be provided to the SM for further processing. The intersection results include a single opaque triangle intersection (opaque triangle TriO_b1) which is the closest intersected opaque triangle to the ray origin and a plurality of alpha triangles which are spatially located between the ray origin and the opaque triangle. As shown in FIG. 14, the alpha triangles may be returned to the SM in memory address order. The alpha triangles returned to the SM may need to be further processed by the SM to determine if there is a hit based on texture information associated with the alpha triangles.

In the example shown in FIG. 14, the result queue includes sufficient space to store all of the intersection results. However, in some example embodiments, the result queue size may be limited (e.g., to a single entry or few entries) to save chip area, and/or the intersection results may exceed the size of the queue. In these cases, the TTU will need to perform several mid-traversal returns to the SM to provide all of the intersection results.

If the intersection results are provided in the order they are determined by the TTU, the order of the intersection results provided to the SM may vary based on which blocks identifying the triangle range are processed first by the TTU. Returning the intersection results based on the order they are determined may not just vary the order in which the intersected triangles are provided to the SM but also vary which triangles are returned to the SM. For example, if Block 2 includes five alpha triangles, and Block 0 is processed before Block 1, then four of the alpha triangles may be added to the queue and returned to the SM before it is determined that opaque triangle TriO_b1 would have blocked the ray from reaching most of those triangles.

FIGS. 15A-C, 16A-C, and 17A-D illustrate a method for returning intersection results using a small result queue for the same triangle range shown in FIG. 14. In FIGS. 15A-C and 16A-C, the result queue includes a single entry for an opaque triangle intersection and a single entry for an alpha triangle intersection. FIGS. 17A-D illustrate a result queue with a single entry. FIGS. 15A-C and 16A-C illustrate a different order in which the blocks are received from the memory but with a same final result being provided to the SM.

Figure 15A:
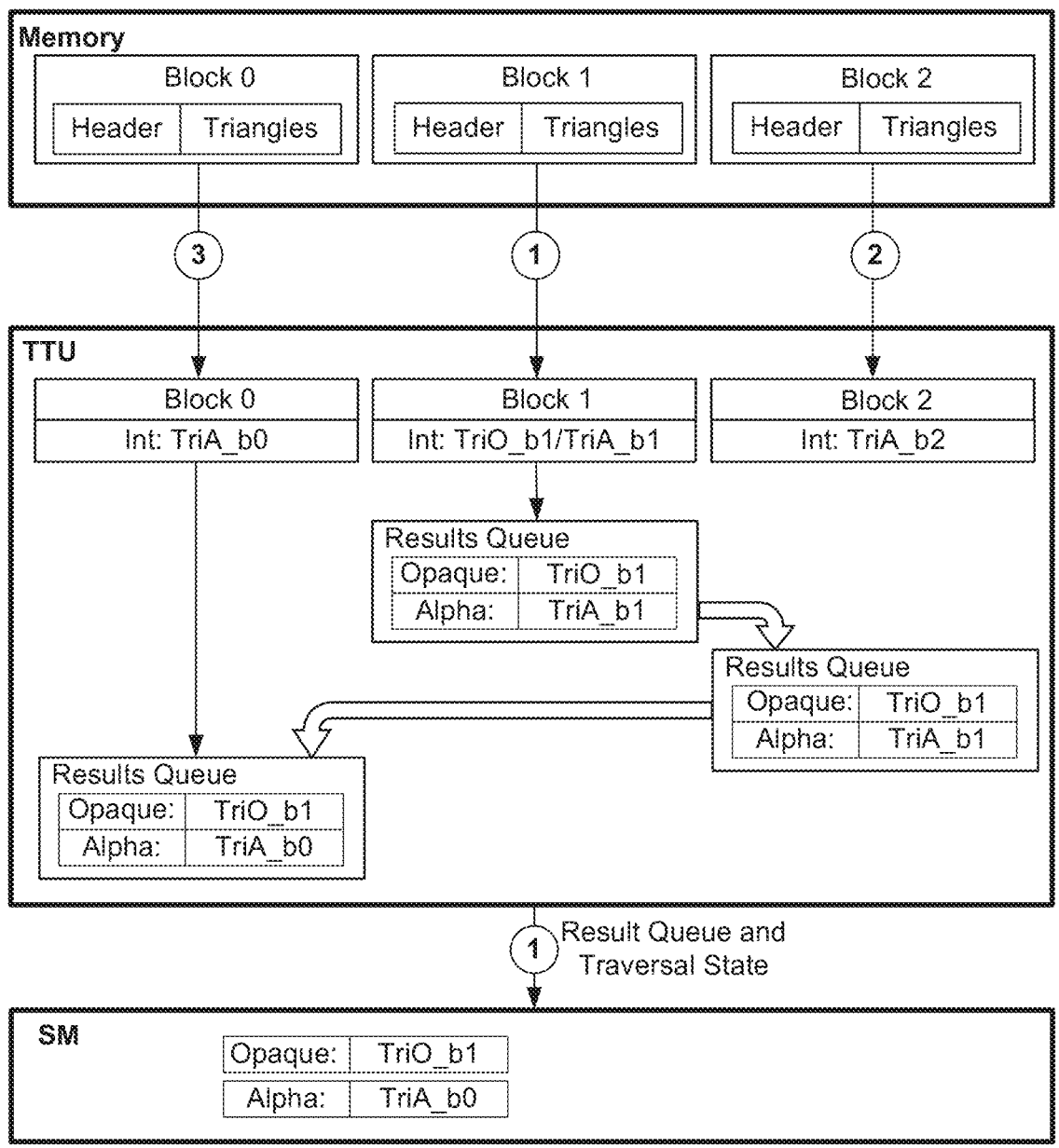

In the example shown in FIG. 15A, Block 1 is provided first, Block 2 is provided second, and Block 0 is provided last to the ray-triangle intersection unit of the TTU. As shown in FIG. 15A, Block 1 is received first from the memory system and the triangles identified in Block 1 are processed to determine if any triangles are intersected by the ray. The TTU determines that an opaque triangle TriO_b1 and alpha triangle TriA_b1 are intersected in Block 1. The TTU stores opaque triangle TriO_b1 and alpha triangle TriA_b1 intersections in the result queue and proceeds to process triangles identified in the next received block (i.e., Block 2).

The triangles identified in Block 2 are processed to determine if any triangles are intersected by the ray. The TTU determines that alpha triangle TriA_b2 is intersected by the ray in Block 2. However, because there is no space in the result queue for additional intersection results and alpha triangle TriA_b2 is found later in memory order (e.g., after block 1), alpha triangle TriA_b2 is not added to the result queue and the next triangle/block is processed for intersection. Because an alpha triangle intersection is identified but not added to the result queue the remaining alpha flag is set to indicate that intersected alpha triangles not included in the result queue are still present in the triangle range.

After processing triangles in Block 2, the TTU proceeds to process triangles identified in the next received block (i.e., Block 0). The TTU determines that alpha triangle TriA_b0 is intersected by the ray in Block 0. Because alpha triangle TriA_b0 is located in memory order before alpha triangle TriA-b1 stored in the result queue, the intersection information for alpha triangle TriA-b1 in the result queue is replaced with the intersection information for alpha triangle TriA_b0.

After all of the blocks and triangles identified in the blocks are processed, the intersection results in the result queue can be provided to the SM for further processing. The intersection results include a single opaque triangle intersection (opaque triangle TriO_b1) which is the closest intersected opaque triangle to the ray origin and a single alpha triangle which is the first intersected alpha triangle in memory order. The intersection results are provided with traversal stack information which contains the state needed to continue traversal for determining any remaining alpha triangle intersections in the triangle range. Based on the traversal stack the SM issues a query to the TTU to find other alpha triangles intersections in the triangle range. In the query, the triangle range does not include the intersected alpha triangles already provided to the SM. The query may set cullOpaque flag for this primitive range so that opaque triangles are not tested again because the closest opaque intersection has already been returned to the SM.

Figure 15B:
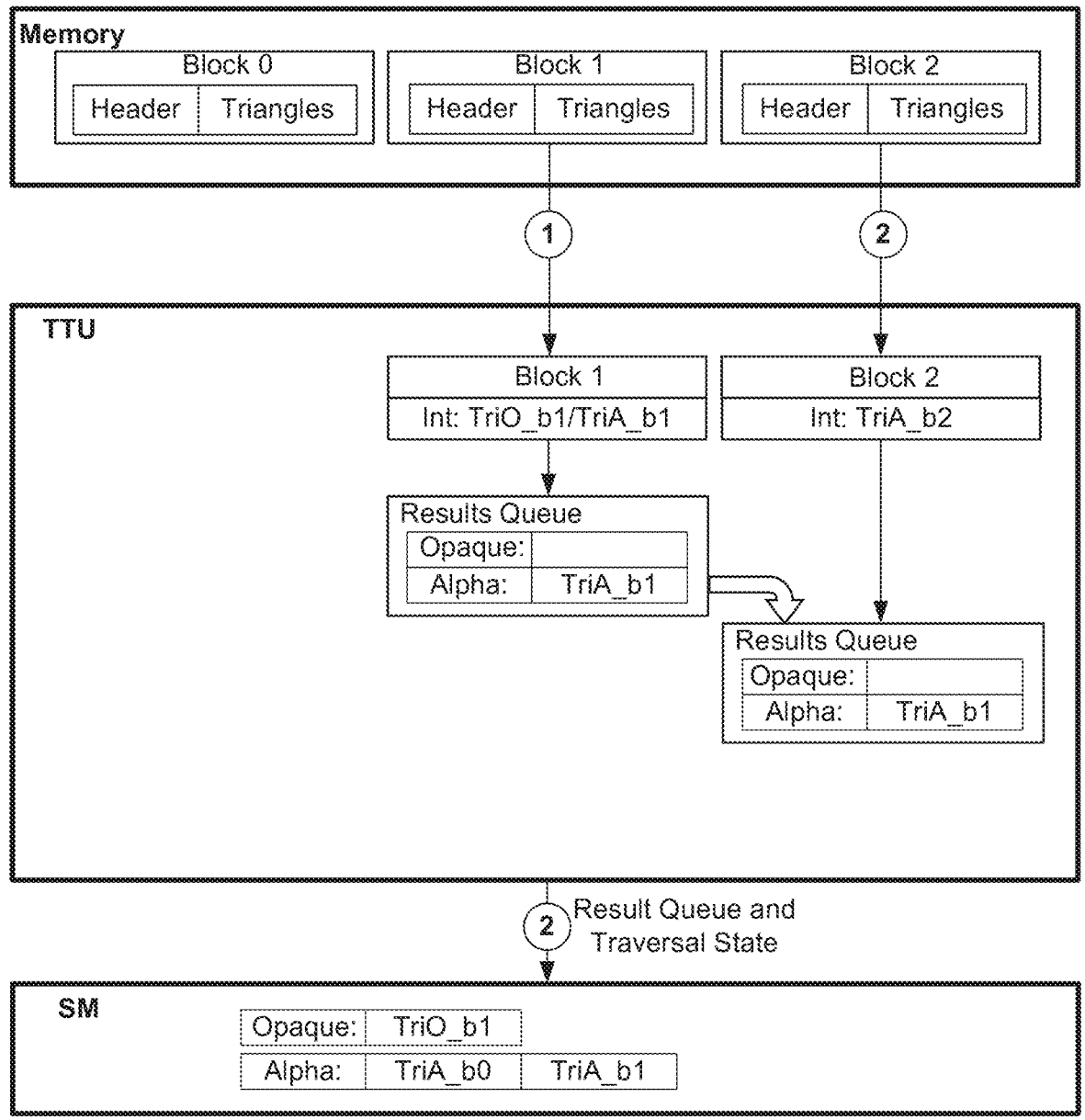

FIG. 15B shows a second query in which triangle ranges identified in Block 1 and Block 2 are tested for intersections. Block 0 in this case is not tested because the intersected alpha triangle returned to the SM from Block 0 may have been last triangle of Block 0 in memory order, and the traversal stack no longer included Block 0. In the example shown in FIG. 15B, Block 1 is provided first and Block 2 is provided second to the ray-triangle test unit. The triangles identified in Block 1 are processed to determine if any triangles are intersected by the ray. The TTU determines that alpha triangle TriA_b1 is intersected in Block 1. At this point opaque triangles may not be tested because the cullOpaque flag is set. The TTU stores alpha triangle TriA_b1 intersection in the result queue and proceeds to process triangles identified in the next received block (i.e., Block 2).

The triangles identified in Block 2 are processed to determine if any triangles are intersected by the ray. The TTU determines that alpha triangle TriA_b2 is intersected by the ray in Block 2. However, as before, because there is no space in the result queue for additional intersection results and alpha triangle TriA_b2 is found later in memory order (e.g., after block 1), alpha triangle TriA_b2 is not added to the result queue. Again, because an alpha triangle intersection is identified but not added to the result queue the remaining alpha flag is set to indicate that intersected alpha triangles not included in the result queue are still present in the triangle range.

After all of the blocks and triangles identified in the blocks are processed, the intersection results in the result queue are provided to the SM for further processing. The intersection results include a single alpha triangle TriA-b1 which is the second intersected alpha triangle in memory order. The intersection results are provided with traversal stack information which contains the state needed to continue traversal for determining any remaining alpha triangle intersections in the triangle range. Based on the traversal stack the SM issues another query to the TTU to find other alpha triangles intersections in the triangle range.

Figure 15C:
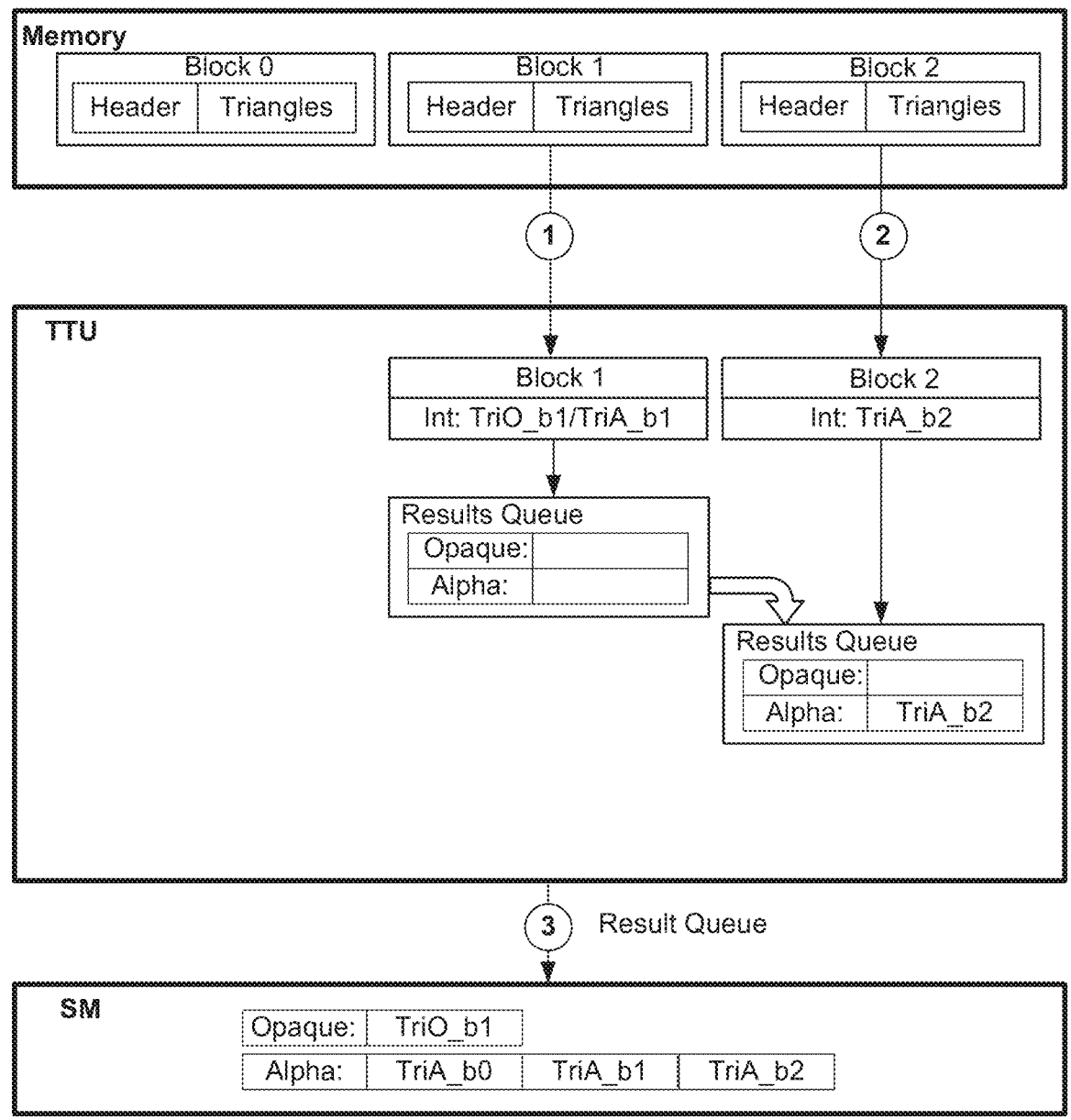

FIG. 15C shows a third query in which triangle ranges identified in Block 1 and Block 2 are tested for intersections. Triangles preceding the alpha triangle TriA-b1 are not tested in Block 1 because the traversal stack returned with the new query will point to the triangle following the TriA_b1 just returned to the SM. In the example shown in FIG. 15C, Block 1 is provided first and Block 2 is provided second. The triangles identified in Block 1 are processed to determine if any triangles are intersected by the ray. Because all intersected triangles in Block 1 have been identified and returned to the SM, no other intersected triangles are identified in Block 1 and the TTU proceeds to process triangles identified in the next received block (i.e., Block 2). The triangles identified in Block 2 are processed to determine if any triangles are intersected by the ray. The TTU determines that alpha triangle TriA_b2 is intersected by the ray in Block 2 and that no other triangles are intersected. At this point the remainingAlphas flag is not set and the result queue is returned to the SM for further processing.

FIGS. 15A-C illustrate independent queues for storing opaque and alpha intersection results, but embodiments of this disclosure are not so limited. In some embodiments, the result queue may be implemented as a single queue with opaque/alpha markings. For example, the result queue in FIG. 15B with two entries may store the intersection result from Block 1 (TriA_b1) in a first entry in the result queue and the intersection result from Block 2 (TriA_b2) in the second entry of the result queue. A flag set for each entry may indicate whether the entry is an opaque or alpha intersection.

Figure 16A:
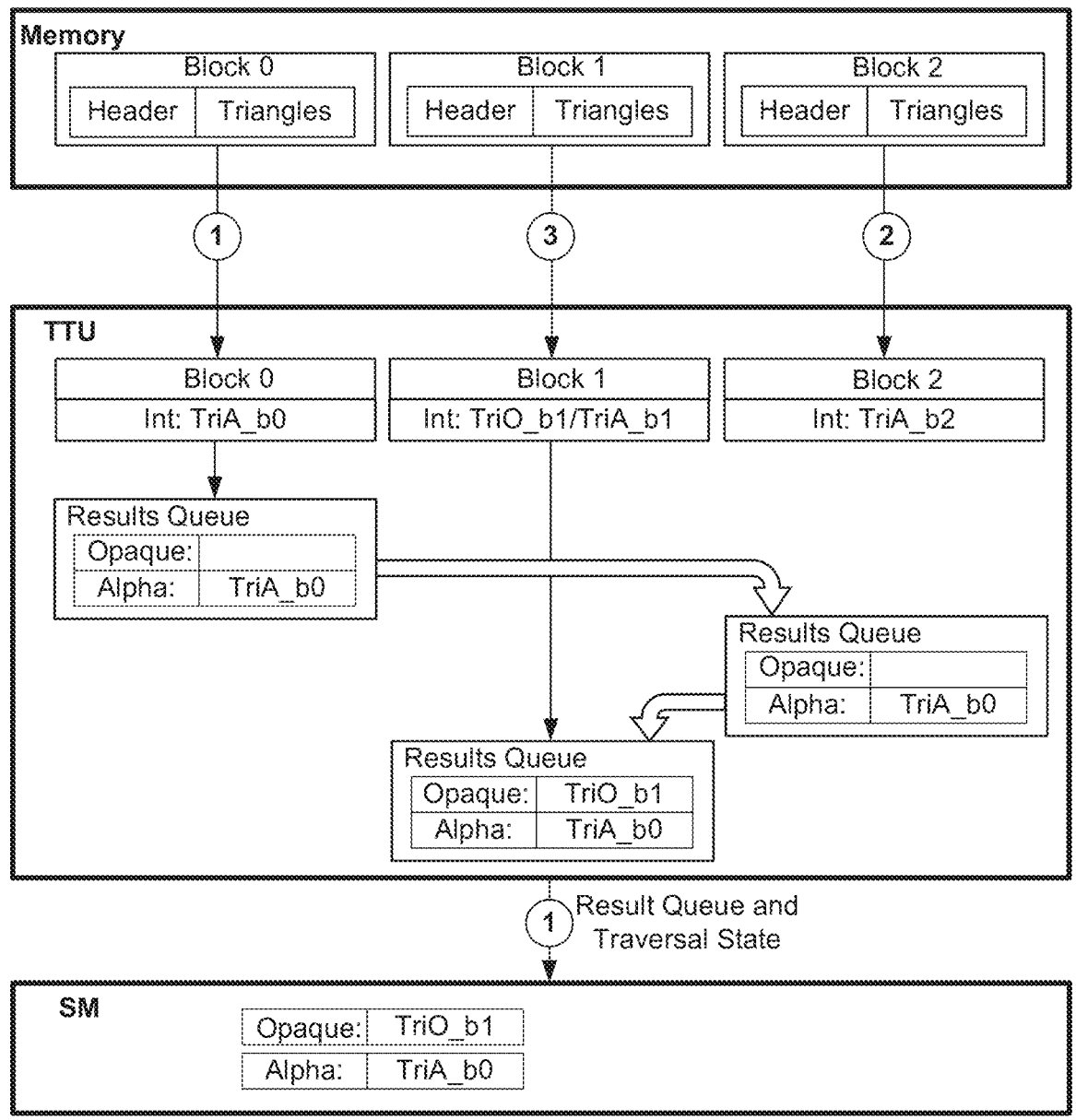
Figure 16B:
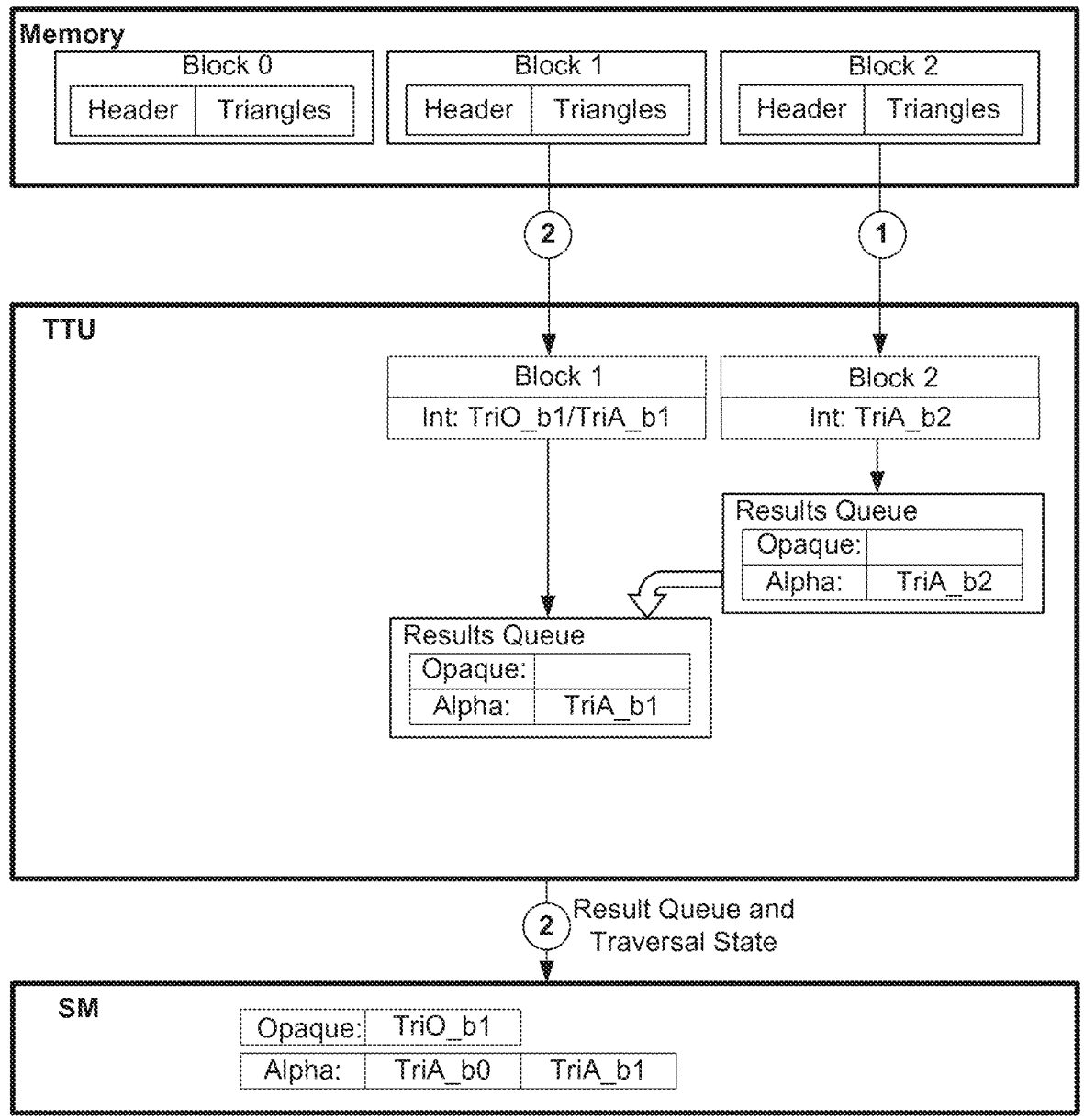
Figure 16C:
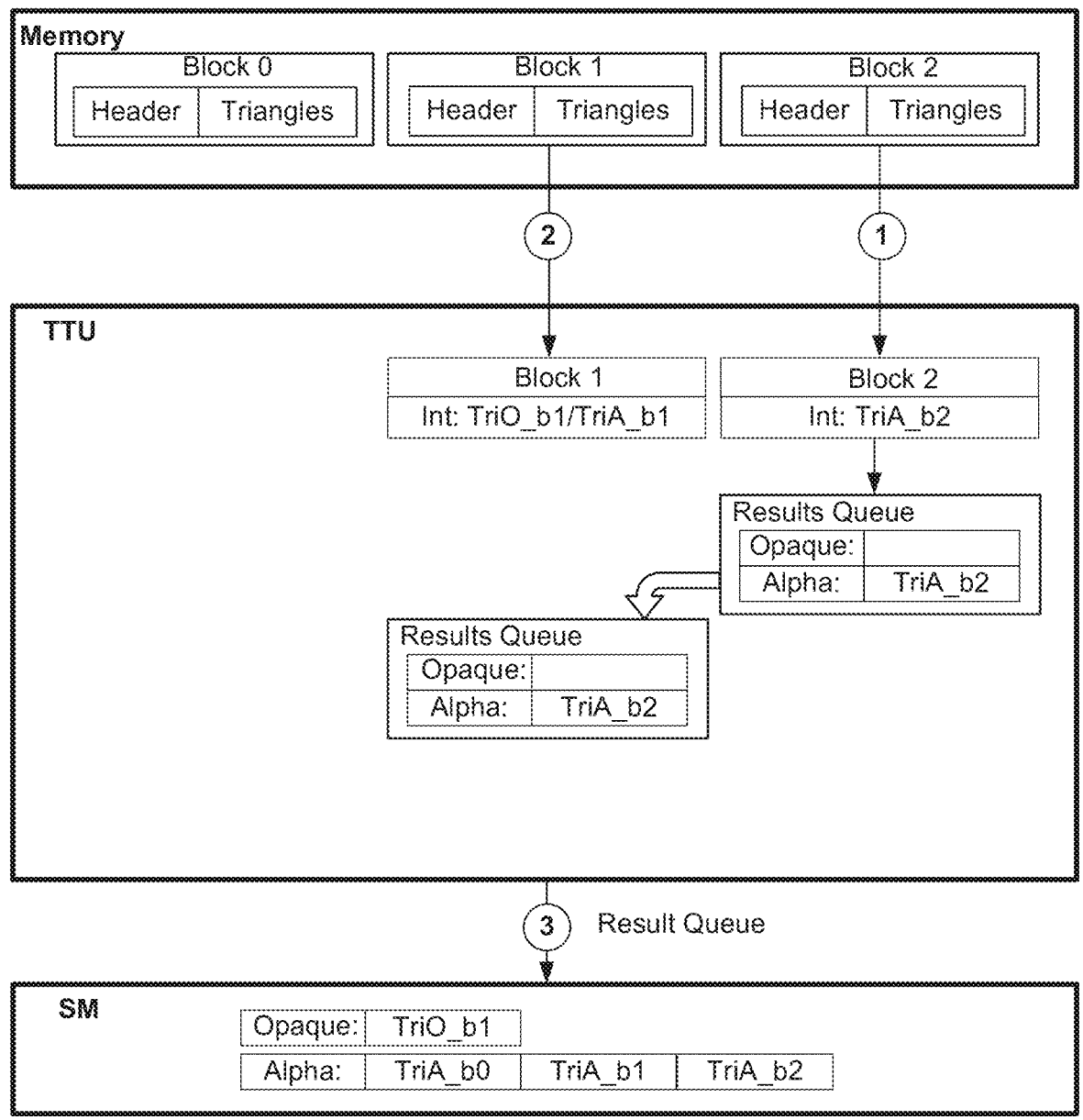

FIGS. 16A-C illustrate processing of triangles identified in a plurality of blocks which are received in a different order form the memory as compared to FIGS. 14A-C. In FIGS. 16A-C, Block 0 is received first, Block 2 is received second, and Block 1 is received last. As shown in FIGS. 16A-C while the blocks are received and processed in a different order, the intersection results provided to the SM are provided in the same order as the example shown in FIGS. 15A-C. Similar process described above with regard to FIGS. 15A-C is performed in FIGS. 16A-C. FIGS. 16A-C illustrate independent queues for storing opaque and alpha intersection results, but embodiments of this disclosure are not so limited. In some embodiments, the result queue may be implemented as a single queue with opaque/alpha markings. For example, the result queue in FIG. 16B with two entries may store the intersection result from Block 1 (TriA_b1) in a first entry in the result queue and the intersection result from Block 2 (TriA_b2) in the second entry of the result queue. A flag set for each entry may indicate whether the entry is an opaque or alpha intersection.

FIGS. 17A-D illustrate processing of triangles identified in a plurality of blocks which are received in the order received with reference to FIGS. 16A-C. In the implementation illustrated with reference to FIGS. 17A-D, a single entry in the Result Queue is used for Opaque and Alpha results. An opaque or alpha marking is provided to the entry in the result queue to indicate whether the result is an alpha or opaque intersection.

Figure 17A:
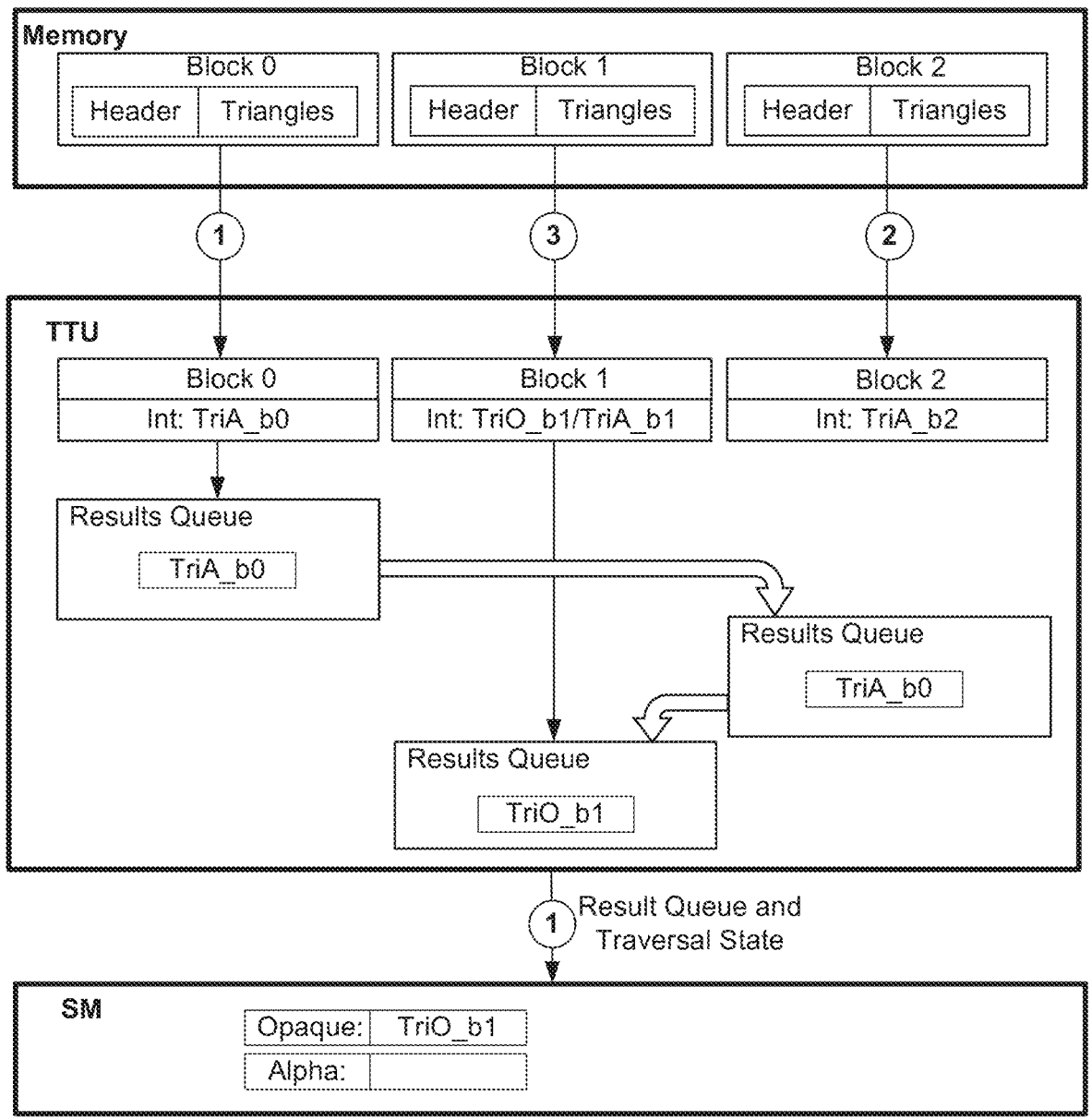

In FIG. 17A, Block 0 is received first from the memory system and the triangles identified in Block 0 are processed to determine if any triangles are intersected by the ray. The TTU determines that an alpha triangle TriA_b0 is intersected in Block 0. The TTU stores the alpha triangle TriA_b0 intersections in the result queue and proceeds to process triangles identified in the remaining blocks (i.e., Blocks 1 and 2) in the order they are received from memory. Other alpha and opaque intersection are identified in Block 1 and Block 2. As each block is processed, individual primitives within the block are processed in memory order. As each alpha intersection arrives it is inserted into the result queue as long as there is capacity. If the result queue is full when intersections from Block 1 and Block 2 arrive, those intersections do not replace the alpha intersection from Block 0 (already stored in the result queue because intersections from Block 1 and Block 2 come from primitives that are later in memory order. As shown in FIG. 17A, the opaque intersection (TriO_b1) in Block 1 may replace the alpha triangle intersection stored in the result queue even though it is found earlier in memory order.

After processing Blocks 0-2, the intersection results in the results queue are provided to the SM with traversal stack information which contains the state needed to continue traversal for determining any remaining alpha triangle intersections in the triangle range. The intersection results may include a stack entry to point to the TriA_b0 (the next identified intersection) on return. Based on the traversal stack, the SM issues a query to the TTU to find other triangles intersections in the triangle range. In the query, the cullOpaque flag may be set for this primitive range so that opaque triangles are not tested again because the closest opaque intersection has already been returned to the SM.

Figure 17B:
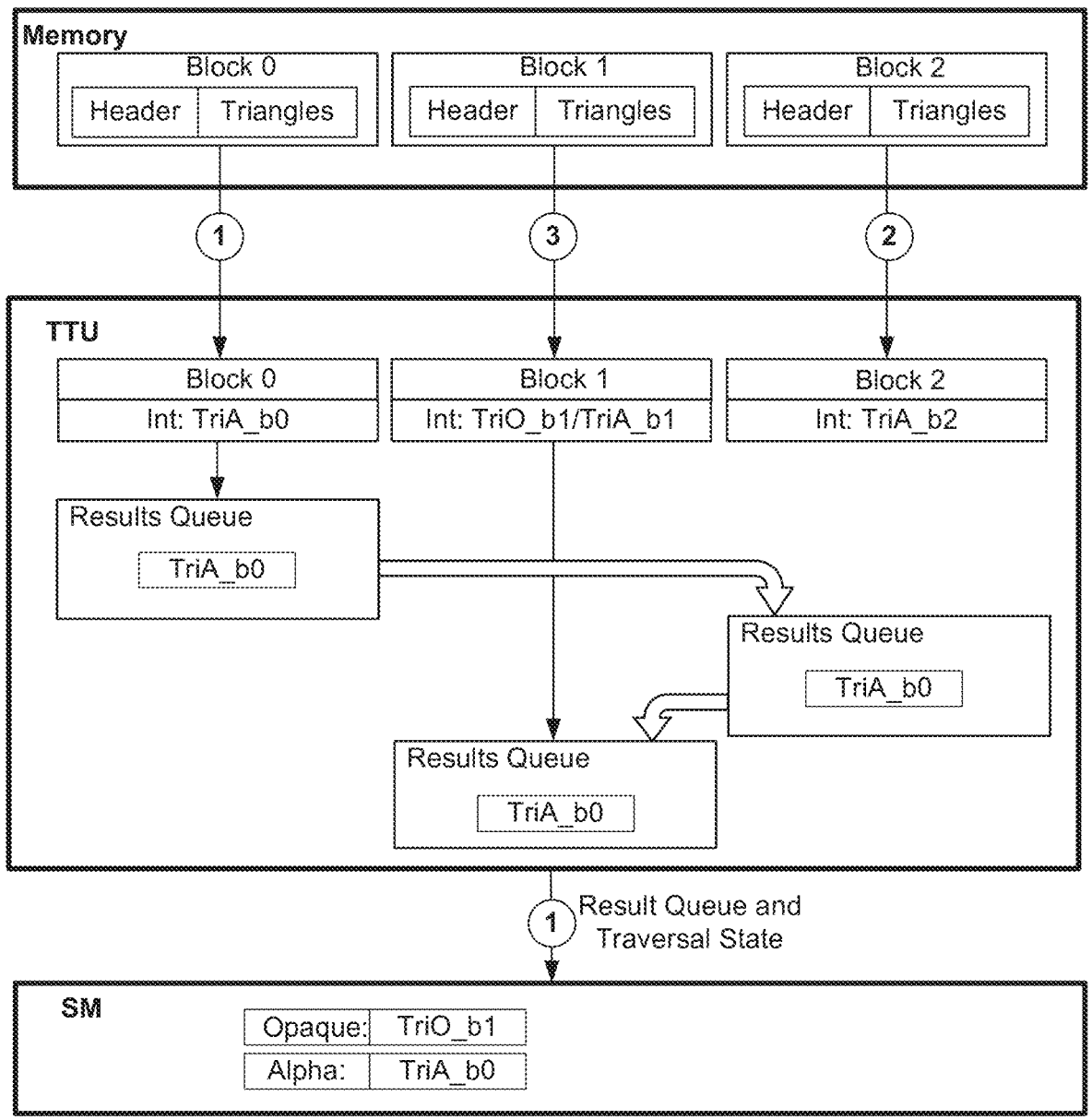

FIG. 17B shows a second query in which triangle ranges starting with entry to TriA_b0 in Block 0 are tested followed by the triangles in Block 1 and Block 2. At this point opaque triangles may not be tested because the cullOpaque flag is set. The TTU tests triangles in Block 0 starting with TriA_b0. The TTU stores alpha triangle TriA_b0 intersection in the result queue and proceeds to process triangles identified in the other received blocks (i.e., Blocks 1 and 2) in the order they are received. Because the alpha intersection in the other blocks are not found earlier in memory order, the already stored result in the result queue is not replaced by the other identified intersections and the remainingAlphas flag is set.

The intersection results in the results queue (i.e., TriA_b0) are provided to the SM with traversal stack information which contains the state needed to continue traversal for determining any remaining alpha triangle intersections in the triangle range. The intersection results may include a stack entry to point to the TriA_b0 or TriA_b1 (e.g., the next identified alpha intersection) on return. Based on the traversal stack, the SM issues another query to the TTU to find other triangles intersections in the triangle range.

Figure 17C:
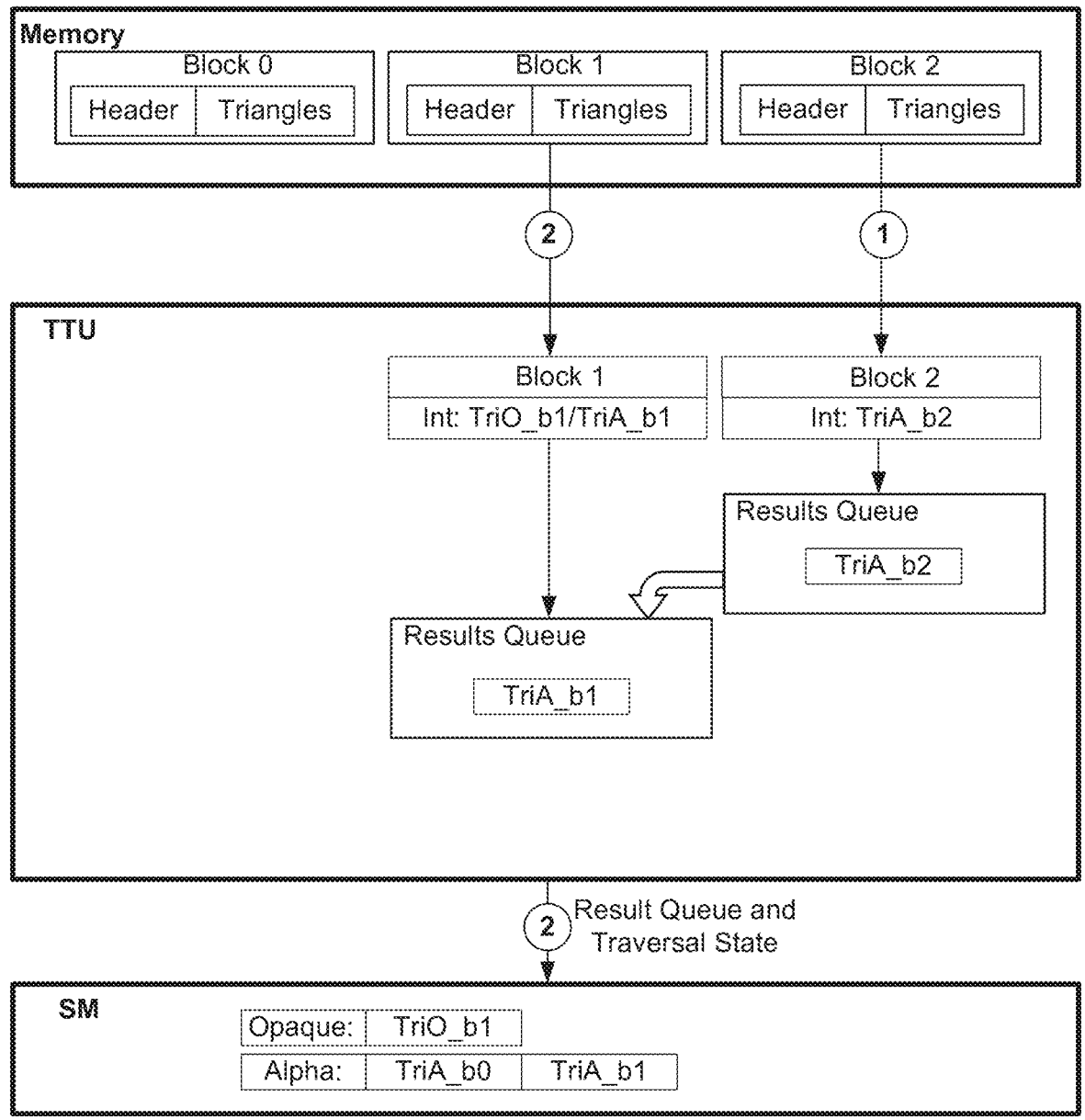

FIG. 17C shows a third query in which triangle ranges identified in Block 1 and Block 2 are tested for intersections.

In the example shown in FIG. 17C, Block 2 is provided first and Block 1 is provided second to the ray-triangle test unit. The triangles identified in Block 2 are processed to determine if any triangles are intersected by the ray. The TTU determines that alpha triangle TriA_b2 is intersected in Block 2 and stores the alpha triangle TriA_b2 intersection in the result queue. The TTU processes the remaining triangles in Block 2 and the triangles identified in the next received block (i.e., Block 1). The TTU determines that alpha triangle TriA_b1 is intersected in Block 1. The TTU stores alpha triangle TriA_b1 in the result queue (by replacing already stored alpha intersection TriA_b2) because alpha triangle TriA_b1 is found earlier in memory order as compared to TriA_b2.

The intersection results in the results queue (i.e., TriA_b1) are provided to the SM with traversal stack information which contains the state needed to continue traversal for determining any remaining alpha triangle intersections in the triangle range. The intersection results may include a stack entry to point to the TriA_b1 or TriA_b2 (e.g., the next identified alpha intersection) on return. Based on the traversal stack, the SM issues another query to the TTU to find other triangles intersections in the triangle range.

Figure 17D:
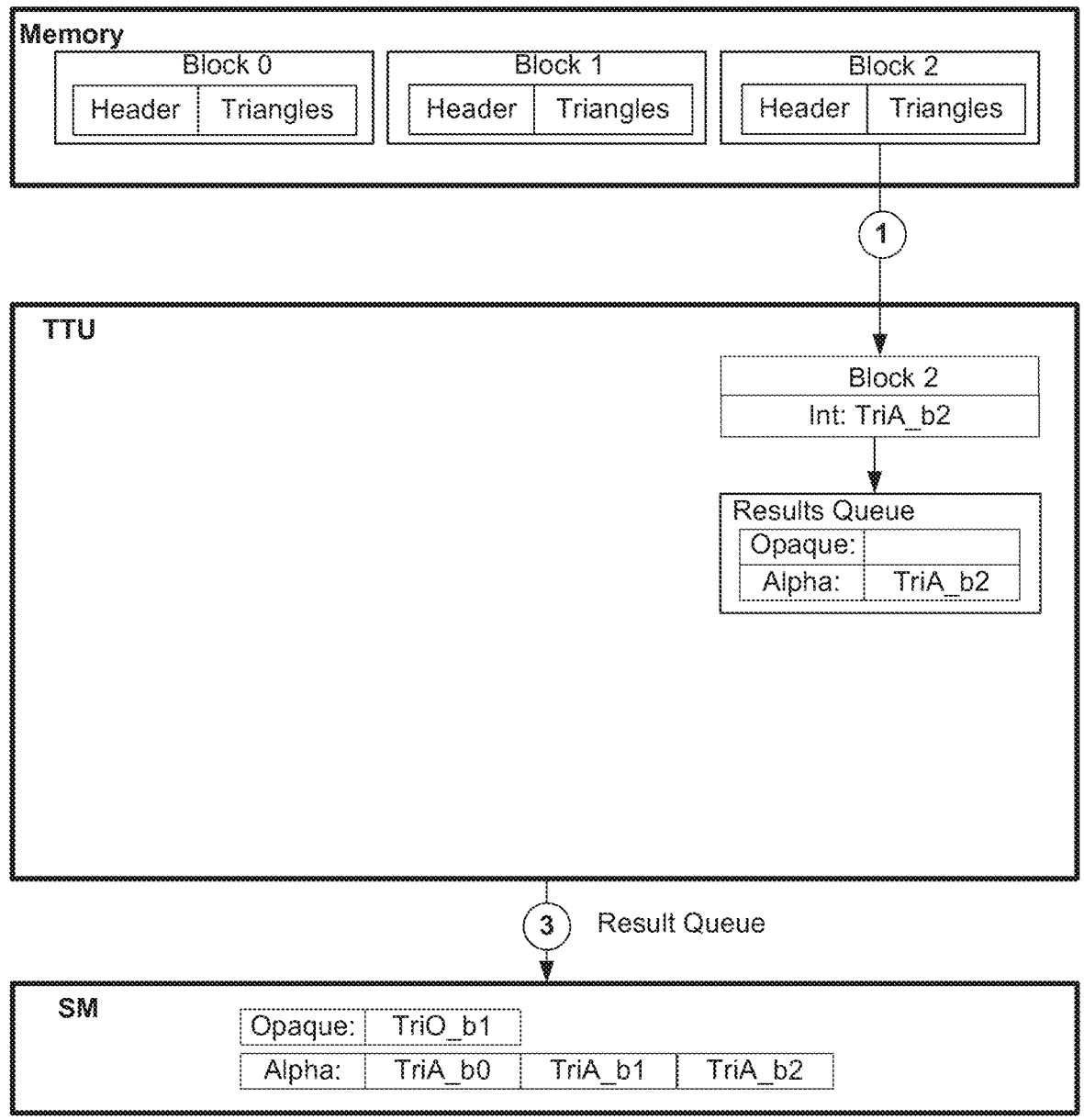

FIG. 17D shows a fourth query in which triangle ranges identified in Block 2 are tested for intersections. In the example shown in FIG. 17D, the query points to the next intersection (TriA_b2) identified in previous query. The TTU processes the triangles identified in Block 2 to determine intersected triangles. The TTU stores the identified alpha triangle intersection (TriA_b2) in the result queue. The TTU processes the remaining triangles in Block 2. Because no other triangles in Block 2 are intersected by the ray and all the blocks in the range have been processed, at this point the remainingAlphas flag is not set and the ray has finished processing the primitive range. If the result queue is full or the result queue contains alpha intersection the ray, the results can be returned to the SM for further processing. Otherwise, the ray can be shortened if necessary and the ray can stay within the TTU and start the next traversal step. In the example illustrated with reference to FIGS. 17A-D, there would be four returns in an order of: TriO_b1, TriA_b0, TriA_b1, and TriA_b2.

If alpha intersections found within a primitive range are returned to the SM before continuing traversal as shown in the above examples, the order in which the blocks are received by the TTU and/or the number of entries in the result queue do not change the order in which the intersection results are provided to the SM by the example embodiments. The number of entries in the queue may change the number of returns but the order in which the triangle intersections are provided to the SM may remain the same. Because the example embodiments disclosed in this application can provide deterministic results even with different number of entries in the result queue, in some example embodiments, the size of the result queue can be changed dynamically based on available resources without changing how the SM will see the results. If alpha intersections found within a primitive range are retained in the result queue instead of returning them to the SM when primitive range processing is complete subsequent traversal may yield closer opaque intersections which invalidate the alpha hits and eliminate the need to return them to the SM. Under these circumstances, the number of entries in the queue will affect both the number of returns and the number of intersections returned to the SM, however, this elimination of occluded primitives will not have a functional impact on visualizing the virtual scene.

In FIGS. 15A-C, 16A-C, and 17A-17D each time the query is performed the order of the blocks received is illustrated as being the same, but is not so limited. In some embodiments, the order may change depending on availability of the blocks in different parts of the memory system at the time the query is processed.

Furthermore, the processes described with reference to FIGS. 15A-C, 16A-C, and 17A-D did not include a description of processing alpha primitives returned mid-traversal before issuing a subsequent query to the TTU. In some non-limiting exemplary embodiments, before issuing a subsequent query to the TTU, the SM may perform alpha triangle related processing to determine if the ray will be blocked by the alpha triangle. If the ray is determined to be blocked, the SM may modify the length of the ray in the subsequent query. The operations described above with reference to FIGS. 15A-C, 16A-C, and 17A-D would similarly provide deterministic results if the SM performs alpha intersection related processing and issues a query that is based on the results of the processing.

In the examples discussed with reference to FIGS. 14, 15A-C, 16A-C, and 17A-D, the deterministic results were provided to the SM by returning intersected alpha triangles in ascending memory address order. In other non-limiting exemplary embodiments, similar operations can be applied to provide deterministic results based on other criteria. For example, deterministic results of intersected triangles can be provided to the SM by returning the results based on descending memory address order, regardless of the order in which the triangles are processed by the TTU. In another example, deterministic results of intersected triangles can be provided to the SM by returning the results based on spatial location of the triangles relative to the ray origin, regardless of the order in which the triangles are processed by the TTU.

In embodiments which provide result queues that can store multiple intersections and where alpha hits are found without exceeding the result queue capacity, the TTU can be configured to retain alpha intersections instead of immediately returning them to the SM. The motivation for doing this is that subsequent traversal might encounter closer opaque hits that invalidate the retained alpha hits and thus eliminate an unnecessary synchronization. In this embodiment, when processing an incoming alpha hit when the result queue is full, the incoming alpha hit may replace an intersection in the result queue from the same primitive range as the incoming alpha hit if the incoming alpha hit appears earlier in the memory order. In cases where alpha hits are retained after primitive processing get eliminated because of opaque hits found later in traversal, changes in the size of the result queue would change both the number of returns and the number of intersections returned but without impacting the functional correctness of the resulting image.

More Specific Example Ray Primitive Traversal with Deterministic Results

As discussed above, ray intersection points for opaque primitives unambiguously occlude other potential intersection points further along the ray. Ray intersection points for alpha primitives may require additional streaming processor computation to account for or resolve transparency, trimming, displacement, constructive solid geometry, or other effects. When computing a nearest intersection between a ray and a primitive range composed of multiple contiguous blocks of memory that can contain opaque and alpha primitives, it is desirable to provide deterministic results while eliminating intersected primitives from the result that do not have a functional impact on visualizing the virtual scene.

Example embodiments of this disclosure provide for hardware circuitry that is configured to produce a deterministic result regardless of the order that a memory subsystem returns Primitive Range blocks to the TTU while opportunistically eliminating alpha intersections that lie further along the length of the ray than closer opaque intersections.

While other ray traced rendering architectures support transparency or trimming effects (which require launching rays after shading from trimmed or transparent points), the exemplary embodiments of this application allow content with programmable transparency or trimming effects that are evaluated mid traversal. The exemplary embodiments provide performance of fixed-function traversal without sacrificing context flexibility or performance, or requiring additional rays to be traced. The exemplary embodiments improve ray-traced rendering performance and ensure reliable image quality and stability in scenes with alpha and opaque primitives. The resultQueue allows product planners to trade area for performance (larger result queues allow the TTU to delay and potentially avoid costly synchronizations). By evaluating trimming or transparency of primitives in mid-traversal we avoid the overhead of relaunching rays when shaded fragments are trimmed or transparent.

In a compressed acceleration data structure, one or more logical I-Nodes or Leaf Nodes are stored in cacheline-sized compressed blocks (Complets) each of which encodes a common LeafType, a child CompletPointer, a child LeafPointer, the index of the first primitive of the first child leaf, and per-child data encoding the coefficients defining geometry which bounds the extents of the child leafData or descendent leaf data, and data which enumerates a range of primitives encoded within a contiguous group of blocks expressed relative to the LeafPointer(or the end of the previous leaf child). Primitive Ranges are one such leaf type. If LeafType=PrimitiveRange then the per-child bits include an alpha bit (indicating if any alpha primitives are present in the range), the number of cachelines and the starting index of where the first primitive of the next leaf node begins.

Each cacheline-sized block within a Primitive Range has a header which identifies the type of geometry expressed within the block and the encoding scheme (for example, compressed triangles), the number of primitives in the block (minus one), and a set of ForceNoCull bits which indicate whether culling should be disabled for each primitive in the block, and a set of Alpha bits which indicate for each primitive in the block whether the primitive is an Alpha primitive or an Opaque primitive.

When the Ray Complet Test (RCT) finds the first leaf node child whose bounding geometry is hit by the ray the Traversal Logic in the RCT pushes a First stack entry onto the top of the ray's stack whose contents:
  Identify the stack entry as a primitive range
  Specify
    addrLast (the address of last line of the primitive range),
    triIdx (the index of the first primitive in the first cacheline of the range),
    triEnd (one plus the index of the last primitive in the last cacheline, or a zero to indicate that the range runs to the end of the last cacheline), and
    lines (the number of contiguous cachelines in the range plus one, unless triEnd=0 in which case lines is the number of contiguous cachelines touched by the triangle range).
Each stack entry may also include a bit co(Cull Opaque Hits).

If the co-processor employs short stack traversal, it will only push a stack entry that directly references the Primitive Range onto the top of the stack or below other leaf nodes pushed onto the top of the stack in the same traversal step. If the query dictated that a Primitive Range should be pushed after one or more I-nodes (whose descendants could potentially push enough stack entries to overflow the stack) or if pushing the Primitive Range would exceed the capacity of the stack and cause the remaining I-nodes to be 'lost' the co-processor will instead push a continuation node that indirectly references the Primitive Range (as the Nth child of its parent I-Node) because unlike the Primitive Range, the parent I-Node has parent pointers that can be used, if necessary, to continue the traversal after the Primitive Range and all the leaf nodes on top of the stack have finished processing.

When the Stack Management Unit (SMU) pops a Primitive Range stack entry off of the top of the traversal stack, SMU notifies the Primitive Scheduler that a ray is ready to be scheduled for intersection testing against a primitive range by sending an Activation Request to the Primitive Scheduler. The Primitive Scheduler records a bit indicating that a Primitive Activation has been requested. When the Primitive Scheduler has enough SMU and Dispatch Entry Credits, the Primitive Scheduler will send a Top-of-Stack Leaf Query to the Stack Management Unit. The Stack Management Unit will send a TopLeafReturn to the Primitive Scheduler which includes the ray slot index for the ray, addrLast, triIdx, triEnd, lines, rayOpPass, CullOpaque, and CullAlpha. The Primitive Scheduler will record these values into an entry in the Primitive Scheduler Dispatch Queue.

For purposes of culling due to RayOps, the RayOp test result is passed into the ray-triangle test block (RTT) along with those mode bits from the Ray Flags stored in Ray Management Unit (RMU). The cull opaque and cull alpha bits in the stack entry may be used differently. Cull Alpha (ca) may be set if the complet does not have the 'alpha' flag set for that child. Cull Opaque (co) may be set after RTT executes and there is an Opaque triangle to return with remaining alphas set. A final condition is to set both Cull Alpha and Cull Opaque in ray complet test/traversal logic (RCT/TL) which is interpreted by SMU as the primitive range should be returned to SM instead of processed locally. In the course of processing the Primitive Range the IMU may override the value of the TriIdx or CullOpaque fields when returning the ray to the streaming processor to deliver alpha intersections, so that when the streaming processor resubmits the ray to the TTU intersection testing skips over any alpha primitives that have already been returned to the streaming processor or all opaque primitives if all of the opaque primitives have already been processed by the triangle range.

To handle the different primitive hit types, the Intersection Management Unit of the TTU maintains a resultQueue data structure which contains storage for each ray for one opaque primitive intersection, or one alpha primitive intersection, and zero or more additional entries for additional alpha intersections. The resultQueue can be returned to the SM when a query completes or in mid-traversal if the need should arise for SM intervention (for example, if the number of alpha hits found within a single triangle range exceeds the storage capacity for alphaHits of the resultQueue).

Each resultQueue entry specifies a hit type and a parametric length which specifies the point along the ray where the hit occurred and attributes of the hit such as the instance ID, material ID, or primitive ID which can be used by the SM to select a specific material shader and a set of resource bindings, and primitive IDs and (u,v) coordinates which can be used by the SM during shading to retrieve and interpolate attributes or sample textures.

Because primitive blocks can encode multiple opaque or alpha primitives in any order, and because primitive ranges can span multiple blocks returned in arbitrary order by the memory subsystem the TTU has mechanisms to ensure that a query produces a deterministic result regardless of the memory return order of blocks in a primitive range:

The TTU maintains state for each query which tracks the progress of the processing of the Primitive Block.
- An initialized flag is set false between primitive ranges, and gets set to true when the resultQueue receives the first primitive from the primitive range.
- A count of pendingCacheLines gets initialized to the number of remaining blocks to be processed in the primitive range.
- A remainingAlphas flag indicates if there are other alpha hits in the primitive range besides those stored in the resultQueue.
- A hitUpdated flag indicates if a hit has been found in the primitive range.

The TTU will not record an incoming opaque or alpha intersection in the result queue if its t-value is beyond the t-value of an opaque intersection.

The TTU will insert an incoming alpha hit from earlier in the memory address order of the primitive range ahead of an alpha hit from the same primitive range that appears later in the memory address order regardless of whether the incoming alpha hit is parametrically closer or farther than the hit which was temporally earlier but later in memory address order.

If there are no available entries to store the incoming earlier in memory address order alpha hit, the incoming hit will replace the temporally earlier but later in memory address order alpha hit and will set the remainingAlphas to TRUE.

If an incoming alpha hit is parametrically closer than an opaque hit from the same Primitive Range, but there are no available entries to store the incoming alpha hit (i.e. they are occupied by alpha hits that are earlier in memory order) the TTU will drop the incoming alpha hit, retain the opaque hit, and set remainingAlphas to TRUE.

If an incoming opaque hit is parametrically-closer than any of the alpha hits in the resultQueue, the TTU will invalidate those alpha hits in the resultQueue that are parametrically farther than in the incoming opaque hit. The TTU will store the incoming opaque hit. The remainingAlphas flag will not be cleared in this instance, however.

If the parametric length of an incoming opaque hit is identical to the parametric length of an opaque hit stored in the resultQueue the hit that was earlier in the memory ordering of the primitive range wins the tie-break replaces the opaque hit that was later in the memory ordering.

As each block completes, pendingCacheLines is decremented

When pendingCacheLines reaches zero, all blocks have been processed,
- At this point, if there is an opaque hit in the resultQueue it will be the parametrically-closest opaque hit encountered during the traversal.

If there are any alpha hits in the resultQueue they will be parametrically-closer than any opaque hit in the result Queue, but will be stored in the resultQueue in memory order.

If remainingAlphas is set, then other alpha hits were found in the primitive range later in memory order besides the alpha hits present in the resultQueue. Those remaining alpha hits must be processed after the SM consumes the set of alpha hits in the resultQueue. The TTU modifies the traversal state so that the top stack entry (referencing the current primitive range) sets cullOpaque to TRUE and advances the starting primitive index to 1+the largest alpha triangle index from the current primitive range stored in the resultQueue.

The TTU returns the ray, its resultQueue, and traversal state to the streaming processor.

The streaming processor performs any required alpha test operations and filters-out any alpha intersections that fail the alpha test and any opaque or alpha intersections that lie beyond the closest alpha intersection that passed the alpha test, and records any valid hits in registers or memory accessible by the query's parent thread, and then resubmit the query to resume traversal.

If remainingAlphas is not set
- If the query still has unallocated entries in the resultQueue the TTU can continue traversal without returning to the SM
- If the query has no remaining unallocated entries in the resultQueue and there are one or more alpha hits in the resultQueue, the TTU returns the query and its associated traversal state to the SM so that the SM can
  - Perform any alpha tests
  - Filter-out any alpha hits that fail the alpha test and filter out any opaque or alpha hits that lie beyond the closest opaque or alpha-hit that passed the alpha test.
  - Resubmit the query with potentially shortened ray (if necessary) to resume traversal The resultQueue performs a visible surface compositing function similar to the way a depth buffer in raster graphics sorts rasterized fragments in visibility order. The capacity of the resultQueue allows the architecture to trade area for efficiency in reducing the frequency of costly synchronizations required to return alpha hits (or, also potentially item range hits) to the SM. By processing alpha hits in a primitive block in memory address order rather than the order that blocks are returned by the memory subsystem the TTU is able to produce deterministic results without constraining memory subsystem performance.

Each compressed block in the acceleration structure hierarchy has one or more children some of which may be other internal nodes in the tree, and some are leaf nodes in the context of an acceleration data structure traversed by the TTU) composed of multiple blocks of memory containing both opaque primitives (whose ray intersection points unambiguously occlude other potential intersection points further along the ray) and alpha primitives (whose intersection points require streaming processor computation to account for or resolve transparency, trimming, displacement, constructive solid geometry, or other effects).

In example non-limiting embodiment, primitive ranges provide method of specifying within an acceleration data structure a group of primitives of a class of geometry supported by the co-processor which are encoded within a sequence of compressed or uncompressed blocks of memory which the co-processor is to test against any rays which reach a specific point (or specific points) in the traversal space of the acceleration data structure. Within a primitive range each primitive indicates whether it is designated as Opaque (indicating that any intersection between a ray and the primitive unambiguously occludes any intersections that are parametrically farther along the ray) or Alpha (indicating that the geometric intersection may be suppressed, perturbed, or augmented by an alpha test operation on the SM).

In example non-limiting embodiment, primitive ranges may be placed within the context of an acceleration structure (at a specific point in the traversal of the acceleration structure) to specify an array of primitives of a common type that are to be tested against any ray that reaches that specific point in the traversal of the acceleration structure.

Thus, within the acceleration structure the Primitive Range may express within the leaf data of the acceleration structure the address of the first block containing the first triangle in the range, the index of the first triangle within that first block, the total number of blocks in the range, and the index of the last primitive in the last block. Multiple Primitive Ranges within the acceleration structure may reference different subsets of the triangles in block. For example, in the TTU when the ray intersects a child bounding box associated with a primitive range child block, the TTU pushes a stack entry onto the traversal stack containing one or more of the following bitfields:

- addrLast—The address of the last block in the primitive range
- triIdx—The (inclusive) index of the first primitive in the primitive range in the first cacheline
- triEnd—The (exclusive) index of the last primitive in the last cacheline in the range, or zero indicating that the range ended in the previous cacheline
- lines—The number of blocks-1 that contain the primitive range (unless triEnd=0, then lines is the number of blocks)

A co flag, indicating that opaque primitive hits are to be culled

Multiple Primitive Ranges within the acceleration structure can reference the same block, thus, the blocks containing primitives in a primitive range may not have parent pointers.

When a ray encounters a Primitive Range during traversal of an acceleration data structure (for example, when a ray intersects the bounding box of a leaf node whose child data specifies a Primitive Range) the co-processor may push the Primitive Range on the top of its traversal stack for immediate testing, or may place the entry deeper in the stack below other Primitive Ranges pushed earlier in the same traversal step in accordance with the criteria specified by the query (for example, to test parametrically-closer Primitive Ranges or nodes first).

In example non-limiting embodiment, ray primitive range processing provides a mechanism for offloading from the streaming processor the task of testing rays against primitive ranges referenced by the acceleration data structure spanning multiple blocks.

In example non-limiting embodiment, item ranges provide method of specifying within an acceleration data structure a group of primitives of a class of geometry which may or may not be supported by the co-processor which are encoded within a sequence of blocks of memory.

In example non-limiting embodiment, item intersection test delegation provide a mechanism for the co-processor to delegate mid-traversal intersection testing of primitive ranges containing primitives of a class not supported by the co-processor's ray-primitive processing to the streaming processor to execute with programmable functionality, and then conditionally resume traversal in the co-processor.

In example non-limiting embodiment, alpha test delegation provides a mechanism for the co-processor to return intersections found between specifically-configured rays and specifically configured-primitives in a primitive range to the streaming processor so that the streaming processor can override, suppress, or augment the result of the intersection test with programmable functionality like alpha testing (or other features known to those familiar with the state of the art) and then conditionally resume traversal in the co-processor.

In example non-limiting embodiment, result queue provides data structure within the co-processor for storing one or more opaque or alpha primitive intersections found during traversal. The result queue allows the co-processor to defer alpha tests and potentially avoid them altogether if a closer opaque intersection occludes an alpha intersection.

In example non-limiting embodiment, out-of-order block processing provides a set of rules for Ray/Primitive Range processing to ensure that queries produce robust, deterministic results when testing primitive ranges than span multiple blocks returned by the memory subsystem in arbitrary order regardless of the order and number of alpha and opaque intersections found.

The co-processor may be configured to produce stable images without objectionable artifacts with traversal that produces a deterministic result for a query given a ray and a primitive range containing a mixture of opaque and alpha primitives spanning multiple blocks regardless of the order that the memory subsystem returns those blocks to the co-processor.

To achieve that result, the co-processor may perform a number of mid-traversal returns to the SM to handle alpha intersections whose number and content may vary from run to run as changes in the order of blocks returned to the TTU produce a different ordering of opaque intersections that can mask or not mask different sets of alpha intersections found within the same Primitive Range, but the result queue and the rules for out-of-order block processing ensure that the side-effects resulting from the completed processing of the Primitive Range will be consistent from run to run.

Example Image Generation Pipeline Including Ray Tracing

Figure 18:
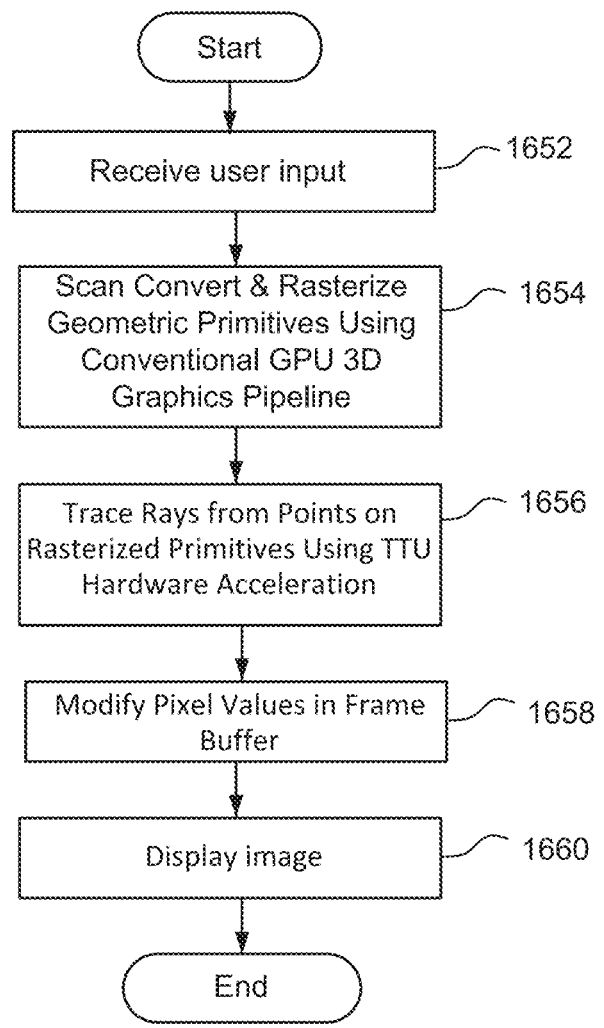
FIG. 18 illustrates an example flowchart for generating an image.

The ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 1). FIG. 18 illustrates an example flowchart for processing primitives to provide image pixel values of an image, in accordance with an embodiment.

As FIG. 18 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art and discussed below in connection with FIG. 22. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described in relation to FIGS. 19-21, 23, 24, 25 and/or 26, and ray tracing may be implemented by the SM's 132 using the TTU architecture described in relation to FIG. 9, to add further visualization features (e.g., specular reflection, shadows, etc.). FIG. 18 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

Example Parallel Processing Architecture Including Ray Tracing

The TTU structure described above can be implemented in, or in association with, an example non-limiting parallel processing system architecture such as that described below in relation to FIGS. 19-26. Such a parallel processing architecture can be used for example to implement the GPU 130 of FIG. 1.

Example Parallel Processing Architecture

Figure 19:
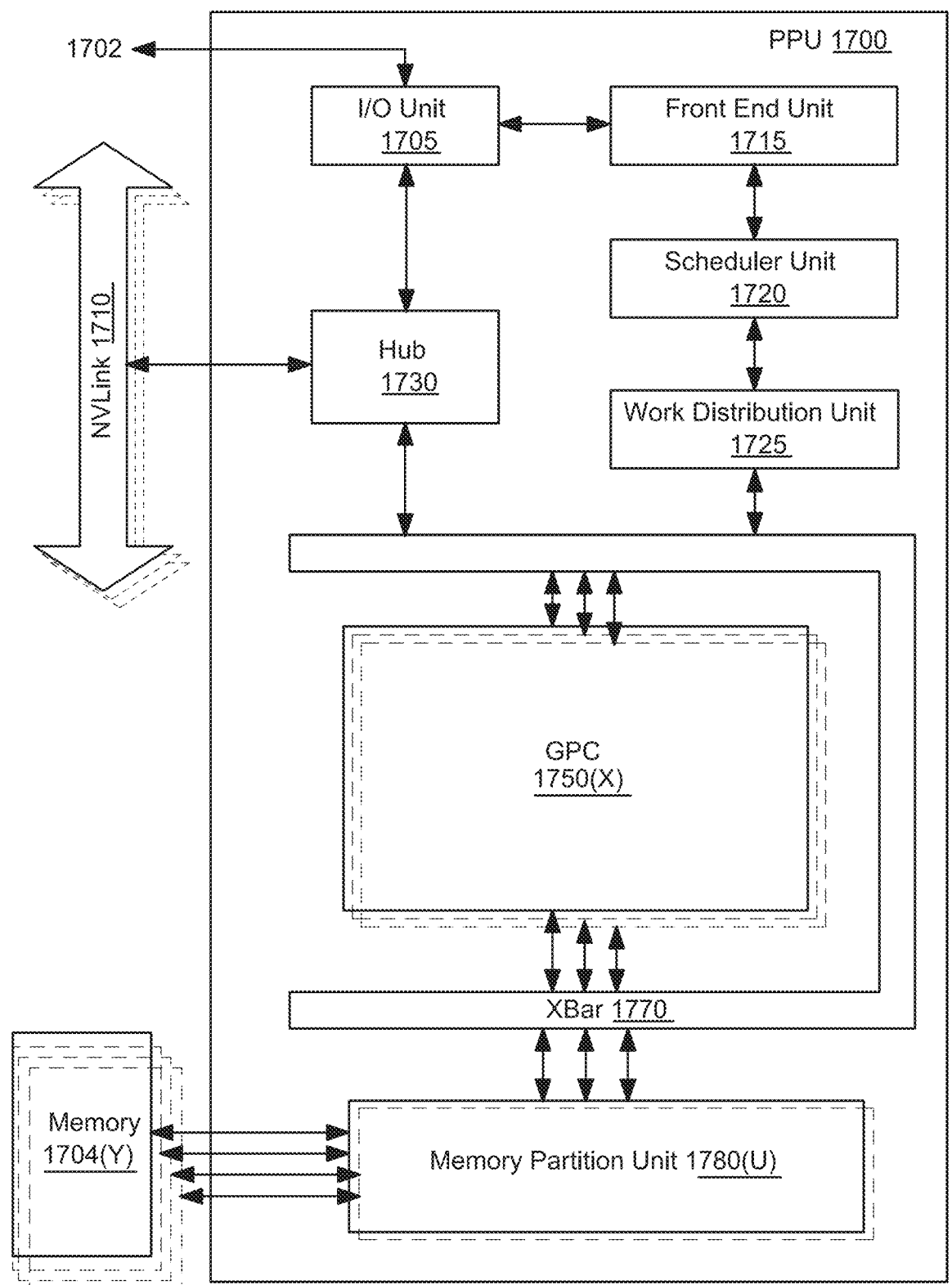
FIG. 19 illustrates an example parallel processing unit (PPU).

FIG. 19 illustrates an example non-limiting parallel processing unit (PPU) 1700. In an embodiment, the PPU 1700 is a multi-threaded processor that is implemented on one or more integrated circuit devices. The PPU 1700 is a latency hiding architecture designed to process many threads in parallel. A thread (i.e., a thread of execution) is an instantiation of a set of instructions configured to be executed by the PPU 1700. In an embodiment, the PPU 1700 is configured to implement a graphics rendering pipeline for processing three-dimensional (3D) graphics data in order to generate two-dimensional (2D) image data for display on a display device such as a liquid crystal display (LCD) device, an organic light emitting diode (OLED) device, a transparent light emitting diode (TOLED) device, a field emission display (FEDs), a field sequential display, a projection display, a head mounted display or any other desired display. In other embodiments, the PPU 1700 may be utilized for performing general-purpose computations. While one exemplary parallel processor is provided herein for illustrative purposes, it should be noted that such processor is set forth for illustrative purposes only, and that any processor may be employed to supplement and/or substitute for the same.

For example, one or more PPUs 1700 may be configured to accelerate thousands of High Performance Computing (HPC), data center, and machine learning applications. The PPU 1700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

The PPU 1700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1700 is embodied on a single semiconductor substrate. In another embodiment, the PPU 1700 is included in a system-on-a-chip (SoC) along with one or more other devices such as additional PPUs 1700, the memory 1704, a reduced instruction set computer (RISC) CPU, a memory management unit (MMU), a digital-to-analog converter (DAC), and the like.

In an embodiment, the PPU 1700 may be included on a graphics card that includes one or more memory devices 1704. The graphics card may be configured to interface with a PCIe slot on a motherboard of a desktop computer. In yet another embodiment, the PPU 1700 may be an integrated graphics processing unit (iGPU) or parallel processor included in the chipset of the motherboard.

As shown in FIG. 19, the PPU 1700 includes an Input/Output (I/O) unit 1705, a front end unit 1715, a scheduler unit 1720, a work distribution unit 1725, a hub 1730, a crossbar (Xbar) 1770, one or more general processing clusters (GPCs) 1750, and one or more partition units 1780. The PPU 1700 may be connected to a host processor or other PPUs 1700 via one or more high-speed NVLink 1710 interconnect. The PPU 1700 may be connected to a host processor or other peripheral devices via an interconnect 1702. The PPU 1700 may also be connected to a local memory comprising a number of memory devices 1704. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1710 interconnect enables systems to scale and include one or more PPUs 1700 combined with one or more CPUs, supports cache coherence between the PPUs 1700 and CPUs, and CPU mastering. Data and/or commands may be transmitted by the NVLink 1710 through the hub 1730 to/from other units of the PPU 1700 such as one or more copy engines, a video encoder, a video decoder, a power management unit, etc. (not explicitly shown). The NVLink 1710 is described in more detail in conjunction with FIG. 25.

The I/O unit 1705 is configured to transmit and receive communications (i.e., commands, data, etc.) from a host processor (not shown) over the interconnect 1702. The I/O unit 1705 may communicate with the host processor directly via the interconnect 1702 or through one or more intermediate devices such as a memory bridge. In an embodiment, the I/O unit 1705 may communicate with one or more other processors, such as one or more of the PPUs 1700 via the interconnect 1702. In an embodiment, the I/O unit 1705 implements a Peripheral Component Interconnect Express (PCIe) interface for communications over a PCIe bus and the interconnect 1702 is a PCIe bus. In alternative embodiments, the I/O unit 1705 may implement other types of well-known interfaces for communicating with external devices.

The I/O unit 1705 decodes packets received via the interconnect 1702. In an embodiment, the packets represent commands configured to cause the PPU 1700 to perform various operations. The I/O unit 1705 transmits the decoded commands to various other units of the PPU 1700 as the commands may specify. For example, some commands may be transmitted to the front end unit 1715. Other commands may be transmitted to the hub 1730 or other units of the PPU 1700 such as one or more copy engines, a video encoder, a video decoder, a power management unit, etc. (not explicitly shown). In other words, the I/O unit 1705 is configured to route communications between and among the various logical units of the PPU 1700.

In an embodiment, a program executed by the host processor encodes a command stream in a buffer that provides workloads to the PPU 1700 for processing. A workload may comprise several instructions and data to be processed by those instructions. The buffer is a region in a memory that is accessible (i.e., read/write) by both the host processor and the PPU 1700. For example, the I/O unit 1705 may be configured to access the buffer in a system memory connected to the interconnect 1702 via memory requests transmitted over the interconnect 1702. In an embodiment, the host processor writes the command stream to the buffer and then transmits a pointer to the start of the command stream to the PPU 1700. The front end unit 1715 receives pointers to one or more command streams. The front end unit 1715 manages the one or more streams, reading commands from the streams and forwarding commands to the various units of the PPU 1700.

The front end unit 1715 is coupled to a scheduler unit 1720 that configures the various GPCs 1750 to process tasks defined by the one or more streams. The scheduler unit 1720 is configured to track state information related to the various tasks managed by the scheduler unit 1720. The state may indicate which GPC 1750 a task is assigned to, whether the task is active or inactive, a priority level associated with the task, and so forth. The scheduler unit 1720 manages the execution of a plurality of tasks on the one or more GPCs 1750.

The scheduler unit 1720 is coupled to a work distribution unit 1725 that is configured to dispatch tasks for execution on the GPCs 1750. The work distribution unit 1725 may track a number of scheduled tasks received from the scheduler unit 1720. In an embodiment, the work distribution unit 1725 manages a pending task pool and an active task pool for each of the GPCs 1750. The pending task pool may comprise a number of slots (e.g., 32 slots) that contain tasks assigned to be processed by a particular GPC 1750. The active task pool may comprise a number of slots (e.g., 4 slots) for tasks that are actively being processed by the GPCs 1750. As a GPC 1750 finishes the execution of a task, that task is evicted from the active task pool for the GPC 1750 and one of the other tasks from the pending task pool is selected and scheduled for execution on the GPC 1750. If an active task has been idle on the GPC 1750, such as while waiting for a data dependency to be resolved, then the active task may be evicted from the GPC 1750 and returned to the pending task pool while another task in the pending task pool is selected and scheduled for execution on the GPC 1750.

The work distribution unit 1725 communicates with the one or more GPCs 1750 via XBar 1770. The XBar 1770 is an interconnect network that couples many of the units of the PPU 1700 to other units of the PPU 1700. For example, the XBar 1770 may be configured to couple the work distribution unit 1725 to a particular GPC 1750. Although not shown explicitly, one or more other units of the PPU 1700 may also be connected to the XBar 1770 via the hub 1730.

The tasks are managed by the scheduler unit 1720 and dispatched to a GPC 1750 by the work distribution unit 1725. The GPC 1750 is configured to process the task and generate results. The results may be consumed by other tasks within the GPC 1750, routed to a different GPC 1750 via the XBar 1770, or stored in the memory 1704. The results can be written to the memory 1704 via the partition units 1780, which implement a memory interface for reading and writing data to/from the memory 1704. The results can be transmitted to another PPU 1704 or CPU via the NVLink 1710. In an embodiment, the PPU 1700 includes a number U of partition units 1780 that is equal to the number of separate and distinct memory devices 1704 coupled to the PPU 1700. A partition unit 1780 will be described in more detail below in conjunction with FIG. 20.

In an embodiment, a host processor (e.g., processor 120 of FIG. 1) executes a driver kernel that implements an application programming interface (API) that enables one or more applications executing on the host processor to schedule operations for execution on the PPU 1700. In an embodiment, multiple compute applications are simultaneously executed by the PPU 1700 and the PPU 1700 provides isolation, quality of service (QoS), and independent address spaces for the multiple compute applications. An application may generate instructions (i.e., API calls) that cause the driver kernel to generate one or more tasks for execution by the PPU 1700. The driver kernel outputs tasks to one or more streams being processed by the PPU 1700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 23.

Example Memory Partition Unit

The MMU 1890 provides an interface between the GPC 1750 and the partition unit 1780. The MMU 1890 may provide translation of virtual addresses into physical addresses, memory protection, and arbitration of memory requests. In an embodiment, the MMU 1890 provides one or more translation lookaside buffers (TLBs) for performing translation of virtual addresses into physical addresses in the memory 1704.

Figure 20:
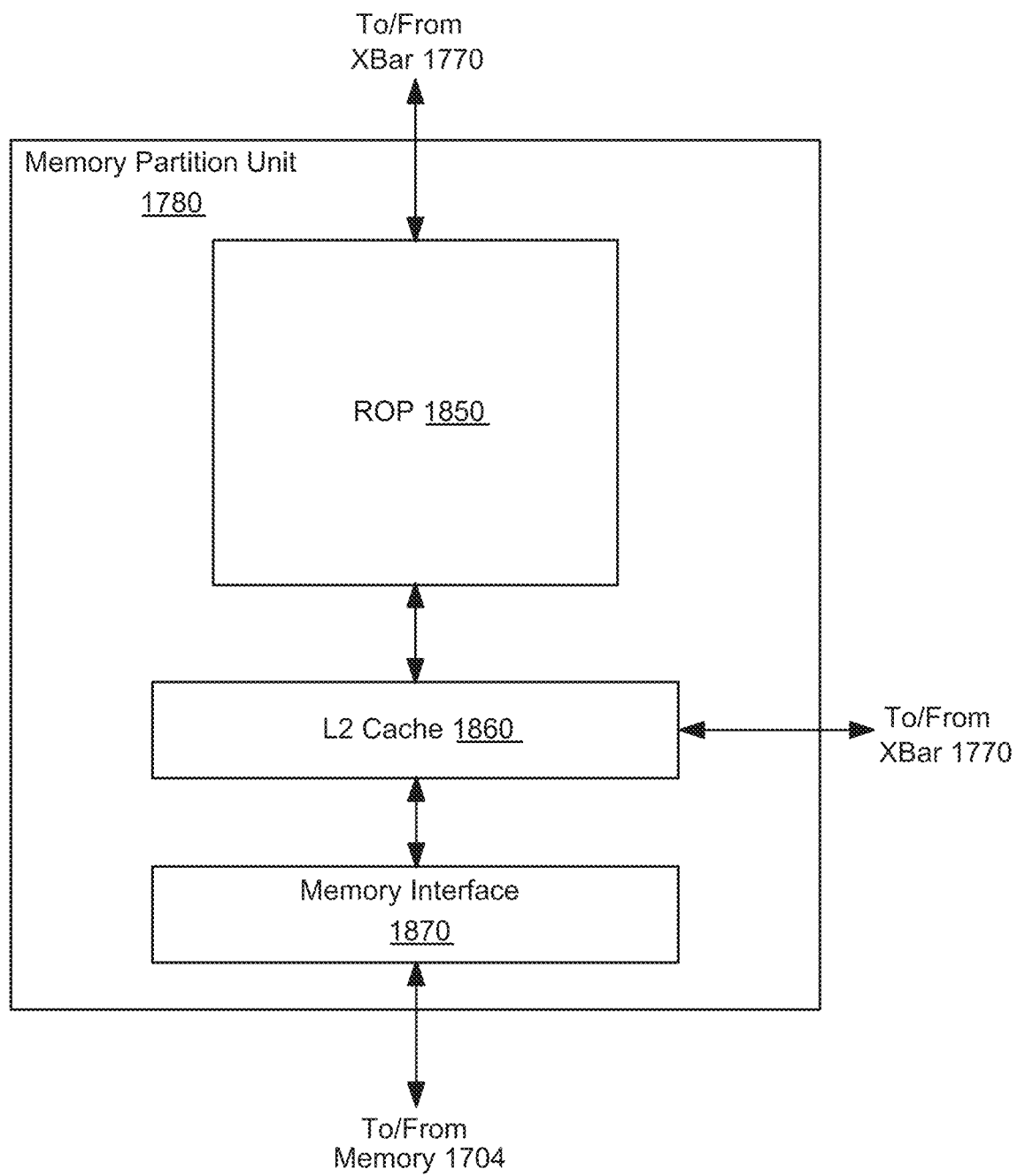
FIG. 20 illustrates an example memory partition unit.

FIG. 20 illustrates a memory partition unit 1780 of the PPU 1700 of FIG. 19, in accordance with an embodiment. As shown in FIG. 20, the memory partition unit 1780 includes a Raster Operations (ROP) unit 1850, a level two (L2) cache 1860, and a memory interface 1870. The memory interface 1870 is coupled to the memory 1704. Memory interface 1870 may implement 32, 64, 128, 1024-bit data buses, or the like, for high-speed data transfer. In an embodiment, the PPU 1700 incorporates U memory interfaces 1870, one memory interface 1870 per pair of partition units 1780, where each pair of partition units 1780 is connected to a corresponding memory device 1704. For example, PPU 1700 may be connected to up to Y memory devices 1704, such as high bandwidth memory stacks or graphics double-data-rate, version 5, synchronous dynamic random access memory, or other types of persistent storage.

In an embodiment, the memory interface 1870 implements an HBM2 memory interface and Y equals half U. In an embodiment, the HBM2 memory stacks are located on the same physical package as the PPU 1700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1700 process very large datasets and/or run applications for extended periods.

In an embodiment, the PPU 1700 implements a multi-level memory hierarchy. In an embodiment, the memory partition unit 1780 supports a unified memory to provide a single unified virtual address space for CPU and PPU 1700 memory, enabling data sharing between virtual memory systems. In an embodiment the frequency of accesses by a PPU 1700 to memory located on other processors is traced to ensure that memory pages are moved to the physical memory of the PPU 1700 that is accessing the pages more frequently. In an embodiment, the NVLink 1710 supports address translation services allowing the PPU 1700 to directly access a CPU's page tables and providing full access to CPU memory by the PPU 1700.

In an embodiment, copy engines transfer data between multiple PPUs 1700 or between PPUs 1700 and CPUs. The copy engines can generate page faults for addresses that are not mapped into the page tables. The memory partition unit 1780 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1704 or other system memory may be fetched by the memory partition unit 1780 and stored in the L2 cache 1860, which is located on-chip and is shared between the various GPCs 1750. As shown, each memory partition unit 1780 includes a portion of the L2 cache 1860 associated with a corresponding memory device 1704. Lower level caches may then be implemented in various units within the GPCs 1750. For example, each of the SMs 1840 may implement a level one (L1) cache. The L1 cache is private memory that is dedicated to a particular SM 1840. Data from the L2 cache 1860 may be fetched and stored in each of the L1 caches for processing in the functional units of the SMs 1840. The L2 cache 1860 is coupled to the memory interface 1870 and the XBar 1770.

The ROP unit 1850 performs graphics raster operations related to pixel color, such as color compression, pixel blending, and the like. The ROP unit 1850 also implements depth testing in conjunction with the raster engine 1825, receiving a depth for a sample location associated with a pixel fragment from the culling engine of the raster engine 1825. The depth is tested against a corresponding depth in a depth buffer for a sample location associated with the fragment. If the fragment passes the depth test for the sample location, then the ROP unit 1850 updates the depth buffer and transmits a result of the depth test to the raster engine 1825. It will be appreciated that the number of partition units 1780 may be different than the number of GPCs 1750 and, therefore, each ROP unit 1850 may be coupled to each of the GPCs 1750. The ROP unit 1850 tracks packets received from the different GPCs 1750 and determines which GPC 1750 that a result generated by the ROP unit 1850 is routed to through the Xbar 1770. Although the ROP unit 1850 is included within the memory partition unit 1780 in FIG. 20, in other embodiment, the ROP unit 1850 may be outside of the memory partition unit 1780. For example, the ROP unit 1850 may reside in the GPC 1750 or another unit.

Example General Processing Clusters

Figure 21:
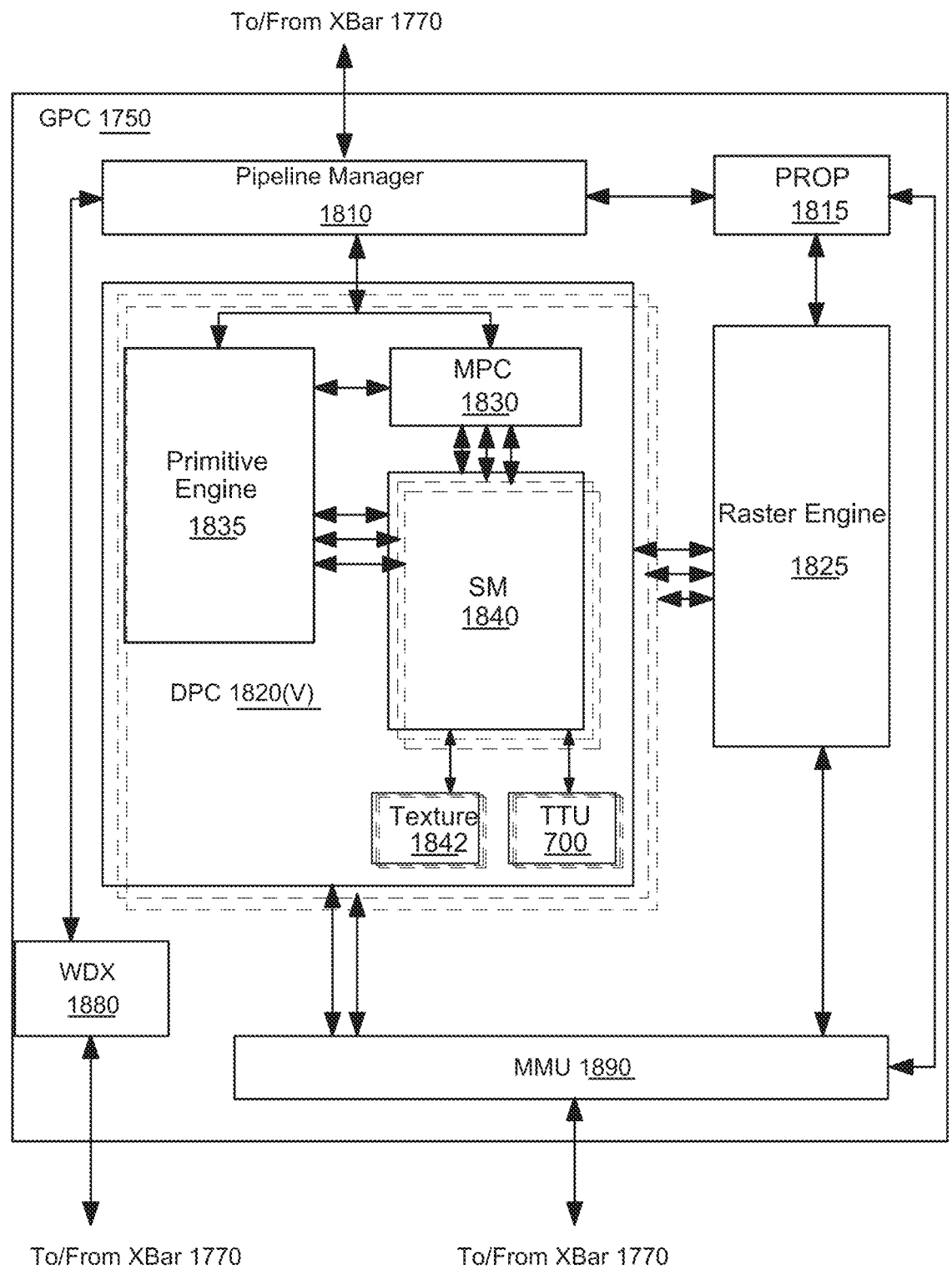
FIG. 21 illustrates an example general processing cluster (GPC) within the parallel processing unit of FIG. 18.

FIG. 21 illustrates a GPC 1750 of the PPU 1700 of FIG. 19, in accordance with an embodiment. As shown in FIG. 21, each GPC 1750 includes a number of hardware units for processing tasks. In an embodiment, each GPC 1750 includes a pipeline manager 1810, a pre-raster operations unit (PROP) 1815, a raster engine 1825, a work distribution crossbar (WDX) 1880, a memory management unit (MMU) 1890, and one or more Data Processing Clusters (DPCs) 1820. It will be appreciated that the GPC 1750 of FIG. 21 may include other hardware units in lieu of or in addition to the units shown in FIG. 21.

In an embodiment, the operation of the GPC 1750 is controlled by the pipeline manager 1810. The pipeline manager 1810 manages the configuration of the one or more DPCs 1820 for processing tasks allocated to the GPC 1750. In an embodiment, the pipeline manager 1810 may configure at least one of the one or more DPCs 1820 to implement at least a portion of a graphics rendering pipeline.

Each DPC 1820 included in the GPC 1750 includes an M-Pipe Controller (MPC) 1830, a primitive engine 1835, one or more SMs 1840, one or more Texture Units 1842, and one or more TTUs 700. The SM 1840 may be structured similarly to SM 132 described above. The MPC 1830 controls the operation of the DPC 1820, routing packets received from the pipeline manager 1810 to the appropriate units in the DPC 1820. For example, packets associated with a vertex may be routed to the primitive engine 1835, which is configured to fetch vertex attributes associated with the vertex from the memory 1704. In contrast, packets associated with a shader program may be transmitted to the SM 1840.

When configured for general purpose parallel computation, a simpler configuration can be used compared with graphics processing. Specifically, the fixed function graphics processing units shown in FIG. 19, are bypassed, creating a much simpler programming model. In the general purpose parallel computation configuration, the work distribution unit 1725 assigns and distributes blocks of threads directly to the DPCs 1820. The threads in a block execute the same program, using a unique thread ID in the calculation to ensure each thread generates unique results, using the SM 1840 to execute the program and perform calculations, shared memory/L1 cache 1970 to communicate between threads, and the LSU 1954 to read and write global memory through the shared memory/L1 cache 1970 and the memory partition unit 1780. When configured for general purpose parallel computation, the SM 1840 can also write commands that the scheduler unit 1720 can use to launch new work on the DPCs 1820. The TTU 700 can be used to accelerate spatial queries in the context of general purpose computation.

Graphics Rendering Pipeline

A DPC 1820 may be configured to execute a vertex shader program on the programmable streaming multiprocessor (SM) 1840 which may accelerate certain shading operations with TTU 700. The pipeline manager 1810 may also be configured to route packets received from the work distribution unit 1725 to the appropriate logical units within the GPC 1750. For example, some packets may be routed to fixed function hardware units in the PROP 1815 and/or raster engine 1825 while other packets may be routed to the DPCs 1820 for processing by the primitive engine 1835 or the SM 1840. In an embodiment, the pipeline manager 1810 may configure at least one of the one or more DPCs 1820 to implement a neural network model and/or a computing pipeline.

The PROP unit 1815 is configured to route data generated by the raster engine 1825 and the DPCs 1820 to a Raster Operations (ROP) unit, described in more detail in conjunction with FIG. 20. The PROP unit 1815 may also be configured to perform optimizations for color blending, organize pixel data, perform address translations, and the like.

The raster engine 1825 includes a number of fixed function hardware units configured to perform various raster operations. In an embodiment, the raster engine 1825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1825 comprises fragments to be processed, for example, by a fragment shader implemented within a DPC 1820

In more detail, the PPU 1700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1700 can be configured to process the graphics primitives to generate a frame buffer (i.e., pixel data for each of the pixels of the display) using for example TTU 700 as a hardware acceleration resource.

An application writes model data for a scene (i.e., a collection of vertices and attributes) to a memory such as a system memory or memory 1704. The model data defines each of the objects that may be visible on a display. The model data may also define one or more BVH's as described above. The application then makes an API call to the driver kernel that requests the model data to be rendered and displayed. The driver kernel reads the model data and writes commands to the one or more streams to perform operations to process the model data. The commands may reference different shader programs to be implemented on the SMs 1840 of the PPU 1700 including one or more of a vertex shader, hull shader, domain shader, geometry shader, a pixel shader, a ray generation shader, a ray intersection shader, a ray hit shader, and a ray miss shader (these correspond to the shaders defined by the DirectX Raytracing (DXR) API, ignoring any distinction between "closest-hit" and "any-hit" shaders; see https://devblogs.nvidia.com/introduction-nvidia-rtx-directx-ray-tracing/). For example, one or more of the SMs 1840 may be configured to execute a vertex shader program that processes a number of vertices defined by the model data. In an embodiment, the different SMs 1840 may be configured to execute different shader programs concurrently. For example, a first subset of SMs 1840 may be configured to execute a vertex shader program while a second subset of SMs 1840 may be configured to execute a pixel shader program. The first subset of SMs 1840 processes vertex data to produce processed vertex data and writes the processed vertex data to the L2 cache 1860 and/or the memory 1704 (see FIG. 20). After the processed vertex data is rasterized (i.e., transformed from three-dimensional data into two-dimensional data in screen space) to produce fragment data, the second subset of SMs 1840 executes a pixel shader to produce processed fragment data, which is then blended with other processed fragment data and written to the frame buffer in memory 1704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 22:
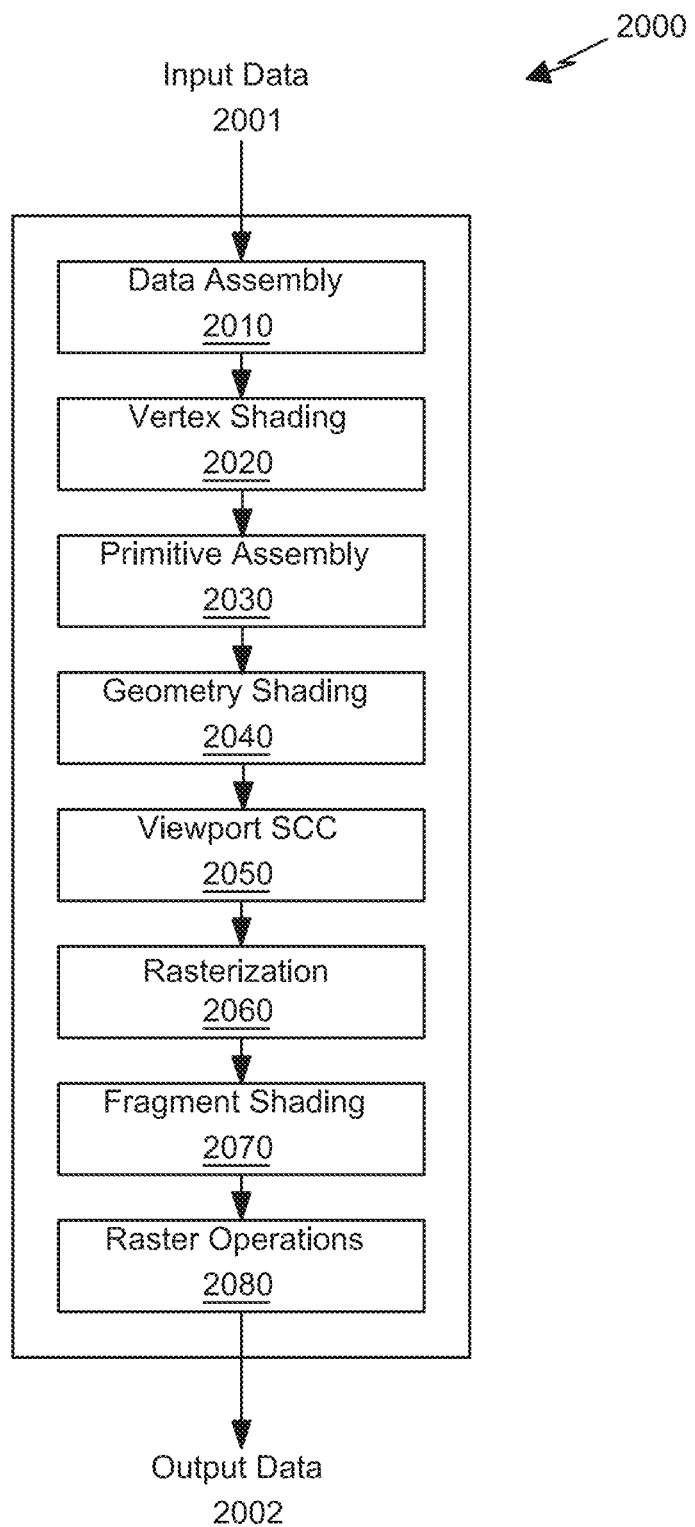
FIG. 22 is a conceptual diagram of a graphics processing pipeline implemented by the GPC of FIG. 21.

FIG. 22 is a conceptual diagram of a graphics processing pipeline 2000 implemented by the PPU 1700 of FIG. 19. The graphics processing pipeline 2000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2000 receives input data 2001 that is transmitted from one stage to the next stage of the graphics processing pipeline 2000 to generate output data 2002. In an embodiment, the graphics processing pipeline 2000 may represent a graphics processing pipeline defined by the OpenGL® API. As an option, the graphics processing pipeline 2000 may be implemented in the context of the functionality and architecture of the previous Figures and/or any subsequent Figure(s). As discussed above with reference to FIG. 18, the ray tracing may be used to improve the image quality generated by rasterization of geometric primitives. In some embodiments, ray tracing operations and TTU structure disclosed in this application may be applied to one or more states of the graphics processing pipeline 2000 to improve the subjective image quality.

As shown in FIG. 22, the graphics processing pipeline 2000 comprises a pipeline architecture that includes a number of stages. The stages include, but are not limited to, a data assembly stage 2010, a vertex shading stage 2020, a primitive assembly stage 2030, a geometry shading stage 2040, a viewport scale, cull, and clip (VSCC) stage 2050, a rasterization stage 2060, a fragment shading stage 2070, and a raster operations stage 2080. In an embodiment, the input data 2001 comprises commands that configure the processing units to implement the stages of the graphics processing pipeline 2000 and geometric primitives (e.g., points, lines, triangles, quads, triangle strips or fans, etc.) to be processed by the stages. The output data 2002 may comprise pixel data (i.e., color data) that is copied into a frame buffer or other type of surface data structure in a memory.

The data assembly stage 2010 receives the input data 2001 that specifies vertex data for high-order surfaces, primitives, or the like. The data assembly stage 2010 collects the vertex data in a temporary storage or queue, such as by receiving a command from the host processor that includes a pointer to a buffer in memory and reading the vertex data from the buffer. The vertex data is then transmitted to the vertex shading stage 2020 for processing.

The vertex shading stage 2020 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 2020 may manipulate individual vertex attributes such as position, color, texture coordinates, and the like. In other words, the vertex shading stage 2020 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 2020 generates transformed vertex data that is transmitted to the primitive assembly stage 2030.

The primitive assembly stage 2030 collects vertices output by the vertex shading stage 2020 and groups the vertices into geometric primitives for processing by the geometry shading stage 2040. For example, the primitive assembly stage 2030 may be configured to group every three consecutive vertices as a geometric primitive (i.e., a triangle) for transmission to the geometry shading stage 2040. In some embodiments, specific vertices may be reused for consecutive geometric primitives (e.g., two consecutive triangles in a triangle strip may share two vertices). The primitive assembly stage 2030 transmits geometric primitives (i.e., a collection of associated vertices) to the geometry shading stage 2040.

The geometry shading stage 2040 processes geometric primitives by performing a set of operations (i.e., a geometry shader or program) on the geometric primitives. Tessellation operations may generate one or more geometric primitives from each geometric primitive. In other words, the geometry shading stage 2040 may subdivide each geometric primitive into a finer mesh of two or more geometric primitives for processing by the rest of the graphics processing pipeline 2000. The geometry shading stage 2040 transmits geometric primitives to the viewport SCC stage 2050.

In an embodiment, the graphics processing pipeline 2000 may operate within a streaming multiprocessor and the vertex shading stage 2020, the primitive assembly stage 2030, the geometry shading stage 2040, the fragment shading stage 2070, a ray tracing shader, and/or hardware/software associated therewith, may sequentially perform processing operations. Once the sequential processing operations are complete, in an embodiment, the viewport SCC stage 2050 may utilize the data. In an embodiment, primitive data processed by one or more of the stages in the graphics processing pipeline 2000 may be written to a cache (e.g. L1 cache, a vertex cache, etc.). In this case, in an embodiment, the viewport SCC stage 2050 may access the data in the cache. In an embodiment, the viewport SCC stage 2050 and the rasterization stage 2060 are implemented as fixed function circuitry.

The viewport SCC stage 2050 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 2060.

The rasterization stage 2060 converts the 3D geometric primitives into 2D fragments (e.g. capable of being utilized for display, etc.). The rasterization stage 2060 may be configured to utilize the vertices of the geometric primitives to setup a set of plane equations from which various attributes can be interpolated. The rasterization stage 2060 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 2060 generates fragment data (i.e., interpolated vertex attributes associated with a particular sample location for each covered pixel) that are transmitted to the fragment shading stage 2070.

The fragment shading stage 2070 processes fragment data by performing a set of operations (i.e., a fragment shader or a program) on each of the fragments. The fragment shading stage 2070 may generate pixel data (i.e., color values) for the fragment such as by performing lighting operations or sampling texture maps using interpolated texture coordinates for the fragment. The fragment shading stage 2070 generates pixel data that is transmitted to the raster operations stage 2080.

The raster operations stage 2080 may perform various operations on the pixel data such as performing alpha tests, stencil tests, and blending the pixel data with other pixel data corresponding to other fragments associated with the pixel. When the raster operations stage 2080 has finished processing the pixel data (i.e., the output data 2002), the pixel data may be written to a render target such as a frame buffer, a color buffer, or the like.

It will be appreciated that one or more additional stages may be included in the graphics processing pipeline 2000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 2040). Other types of graphics processing pipelines are contemplated as being within the scope of the present disclosure. Furthermore, any of the stages of the graphics processing pipeline 2000 may be implemented by one or more dedicated hardware units within a graphics processor such as PPU 200. Other stages of the graphics processing pipeline 2000 may be implemented by programmable hardware units such as the SM 1840 of the PPU 1700.

The graphics processing pipeline 2000 may be implemented via an application executed by a host processor, such as a CPU 120. In an embodiment, a device driver may implement an application programming interface (API) that defines various functions that can be utilized by an application in order to generate graphical data for display. The device driver is a software program that includes a plurality of instructions that control the operation of the PPU 1700. The API provides an abstraction for a programmer that lets a programmer utilize specialized graphics hardware, such as the PPU 1700, to generate the graphical data without requiring the programmer to utilize the specific instruction set for the PPU 1700. The application may include an API call that is routed to the device driver for the PPU 1700. The device driver interprets the API call and performs various operations to respond to the API call. In some instances, the device driver may perform operations by executing instructions on the CPU. In other instances, the device driver may perform operations, at least in part, by launching operations on the PPU 1700 utilizing an input/output interface between the CPU and the PPU 1700. In an embodiment, the device driver is configured to implement the graphics processing pipeline 2000 utilizing the hardware of the PPU 1700.

Various programs may be executed within the PPU 1700 in order to implement the various stages of the graphics processing pipeline 2000. For example, the device driver may launch a kernel on the PPU 1700 to perform the vertex shading stage 2020 on one SM 1840 (or multiple SMs 1840). The device driver (or the initial kernel executed by the PPU 1800) may also launch other kernels on the PPU 1800 to perform other stages of the graphics processing pipeline 2000, such as the geometry shading stage 2040 and the fragment shading stage 2070. In addition, some of the stages of the graphics processing pipeline 2000 may be implemented on fixed unit hardware such as a rasterizer or a data assembler implemented within the PPU 1800. It will be appreciated that results from one kernel may be processed by one or more intervening fixed function hardware units before being processed by a subsequent kernel on an SM 1840.

Example Streaming Multiprocessor

The SM 1840 comprises a programmable streaming processor that is configured to process tasks represented by a number of threads. Each SM 1840 is multi-threaded and configured to execute a plurality of threads (e.g., 32 threads comprising a warp) from a particular group of threads concurrently. In an embodiment, the SM 1840 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 1840 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Figure 23:
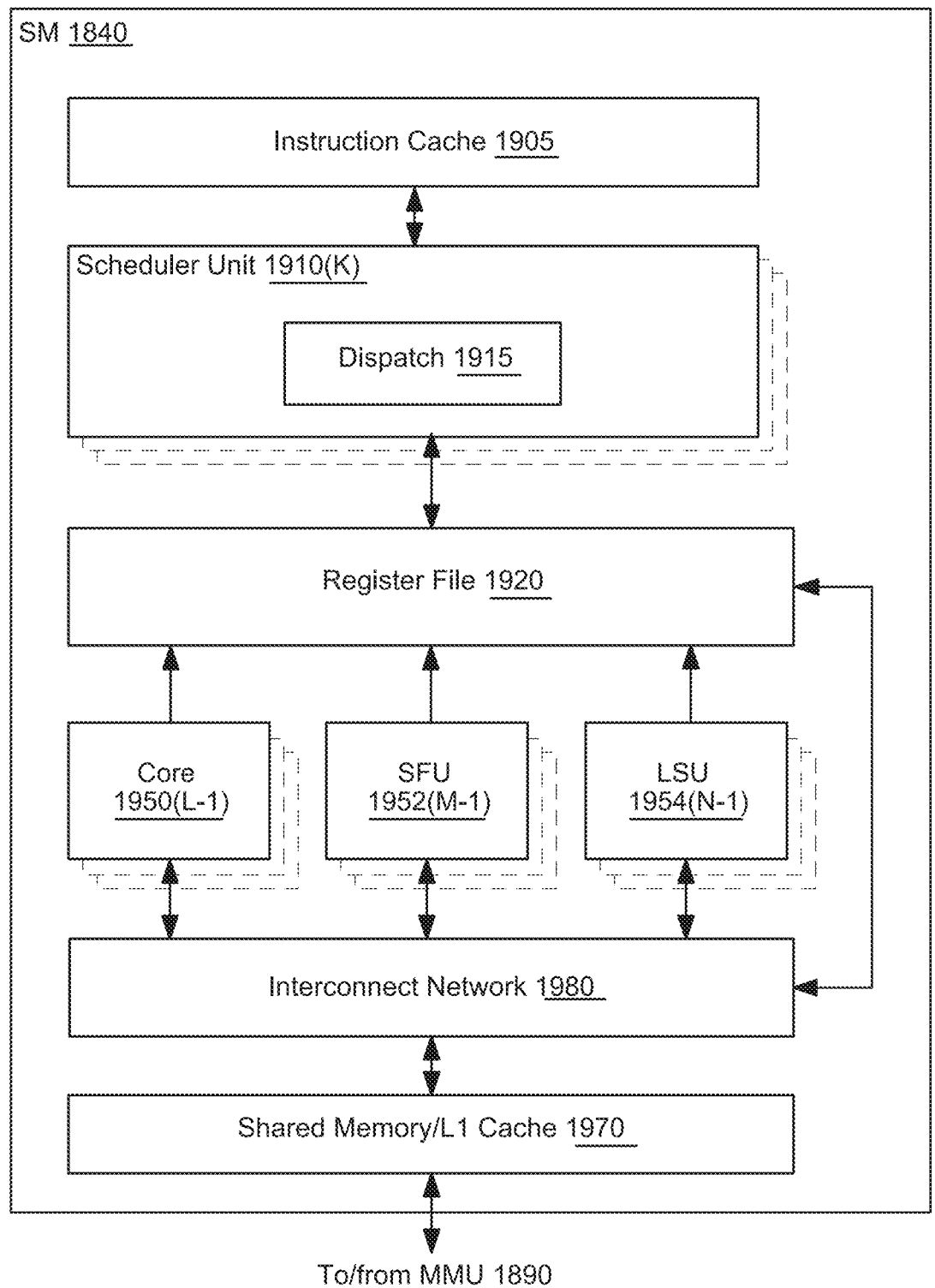
FIGS. 23 and 24 illustrate an example streaming multi-processor.

FIG. 23 illustrates the streaming multi-processor 1840 of FIG. 21, in accordance with an embodiment. As shown in FIG. 23, the SM 1840 includes an instruction cache 1905, one or more scheduler units 1910, a register file 1920, one or more processing cores 1950, one or more special function units (SFUs) 1952, one or more load/store units (LSUs) 1954, an interconnect network 1980, a shared memory/L1 cache 1970.

As described above, the work distribution unit 1725 dispatches tasks for execution on the GPCs 1750 of the PPU 1700. The tasks are allocated to a particular DPC 1820 within a GPC 1750 and, if the task is associated with a shader program, the task may be allocated to an SM 1840. The scheduler unit 1910 receives the tasks from the work distribution unit 1725 and manages instruction scheduling for one or more thread blocks assigned to the SM 1840. The scheduler unit 1910 schedules thread blocks for execution as warps of parallel threads, where each thread block is allocated at least one warp. In an embodiment, each warp executes 32 threads. The scheduler unit 1910 may manage a plurality of different thread blocks, allocating the warps to the different thread blocks and then dispatching instructions from the plurality of different cooperative groups to the various functional units (i.e., cores 1950, SFUs 1952, and LSUs 1954) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1915 is configured to transmit instructions to one or more of the functional units. In the embodiment, the scheduler unit 1910 includes two dispatch units 1915 that enable two different instructions from the same warp to be dispatched during each clock cycle. In alternative embodiments, each scheduler unit 1910 may include a single dispatch unit 1915 or additional dispatch units 1915.

Figure 24:
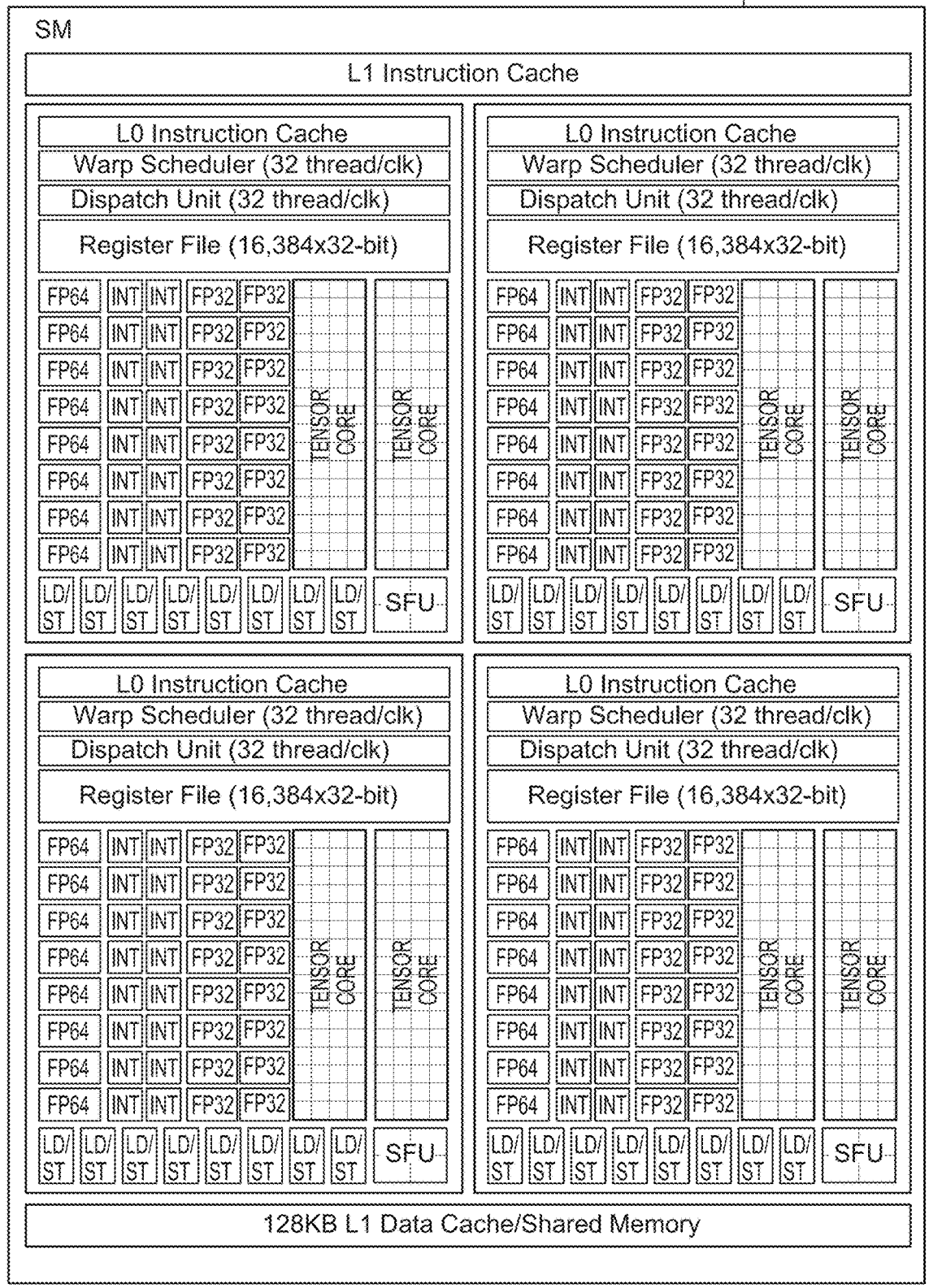

Each SM 1840 includes a register file 1920 that provides a set of registers for the functional units of the SM 1840. In an embodiment, the register file 1920 is divided between each of the functional units such that each functional unit is allocated a dedicated portion of the register file 1920. In another embodiment, the register file 1920 is divided between the different warps being executed by the SM 1840. The register file 1920 provides temporary storage for operands connected to the data paths of the functional units. FIG. 24 illustrates an example configuration of the registers files in the SM 1840.

Each SM 1840 comprises L processing cores 1950. In an embodiment, the SM 1840 includes a large number (e.g., 128, etc.) of distinct processing cores 1950. Each core 1950 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1950 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1950. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1840 also comprises M SFUs 1952 that perform special functions (e.g., attribute evaluation, reciprocal square root, and the like). In an embodiment, the SFUs 1952 may include a tree traversal unit configured to traverse a hierarchical tree data structure. In an embodiment, the SFUs 1952 may include texture unit configured to perform texture map filtering operations. In an embodiment, the texture units are configured to load texture maps (e.g., a 2D array of texels) from the memory 1704 and sample the texture maps to produce sampled texture values for use in shader programs executed by the SM 1840. In an embodiment, the texture maps are stored in the shared memory/L1 cache 1970. The texture units implement texture operations such as filtering operations using mip-maps (i.e., texture maps of varying levels of detail). In an embodiment, each SM 1740 includes two texture units.

Each SM 1840 also comprises N LSUs 1954 that implement load and store operations between the shared memory/L1 cache 1970 and the register file 1920. Each SM 1840 includes an interconnect network 1980 that connects each of the functional units to the register file 1920 and the LSU 1954 to the register file 1920, shared memory/L1 cache 1970. In an embodiment, the interconnect network 1980 is a crossbar that can be configured to connect any of the functional units to any of the registers in the register file 1920 and connect the LSUs 1954 to the register file and memory locations in shared memory/L1 cache 1970.

The shared memory/L1 cache 1970 is an array of on-chip memory that allows for data storage and communication between the SM 1840 and the primitive engine 1835 and between threads in the SM 1840. In an embodiment, the shared memory/L1 cache 1970 comprises 128 KB of storage capacity and is in the path from the SM 1840 to the partition unit 1780. The shared memory/L1 cache 1970 can be used to cache reads and writes. One or more of the shared memory/L1 cache 1970, L2 cache 1860, and memory 1704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1970 enables the shared memory/L1 cache 1970 to function as a high-throughput conduit for streaming data while simultaneously providing high-bandwidth and low-latency access to frequently reused data.

FIG. 24 illustrates one example architecture for the SM 1840. As illustrated in FIG. 21, the SM 1840 may be coupled to one or more Texture Unit 1842 and/or one or more TTUs 700. As a compromise between performance and area, one example non-limiting embodiment may include a single Texture Unit 1842 and/or a single TTU 700 per groups of SMs 1840 (e.g., See FIG. 21). The TTU 700 may communicate with the SMs 1840 via a TTU input/output block in memory input-output and with a L1 cache via a dedicated read interface. In one example embodiment, the TTU 700 only reads from the main memory and does not write to the main memory.

Example More Detailed TTU Architecture

As discussed above, the TTU 700 may be a coprocessor to the SM 1840. Like a texture processor, it is exposed via a set of SM instructions, accesses memory as a read-only client of the L1 cache, and returns results into the SM register file. Unlike some texture processors, the amount of data that may need to be passed into and out of the TTU 700 for a typical query makes it difficult in some embodiments to specify all the source and destination registers in a single instruction (and because most of this data is unique per-thread, there is no TTU analogue of texture headers and samplers). As a consequence, the TTU 700 in some embodiments is programmed via a multi-instruction sequence. This sequence can be conceptualized as a single "macro-instruction" in some implementations.

Also like a Texture Units 1842, the TTU 700 in some implementations may rely on certain read-only data structures in memory that are prepopulated by software. These include:

One or more BVHs, where each BVH is for example a tree of axis-aligned bounding boxes, stored in a compressed format that greatly reduces memory traffic compared to an uncompressed representation. Each node in the BVH is stored as a complet structure, with size and alignment in some implementations matched to that of an L1 cache line. Child complets of a given parent are preferably stored contiguously in memory and child pointers are stored in compressed form.

Zero or more instance nodes, which provide a way to connect a leaf of one BVH to the root of another. An instance node may be a data structure that is also aligned. This structure may contain a pointer to the sub-BVH, flags that affect back-face culling behavior in the sub-BVH, and a matrix that corresponds to the first three rows of an arbitrary transformation matrix (in homogeneous coordinates) from the coordinate system of the top-level BVH (commonly "world space") to that of the sub-BVH (commonly "object space"). The final row of the matrix in some embodiments is in some implementations implicitly (0, 0, 0, 1).

Zero or more triangle or other primitive buffers, containing for example triangles stored either as a triplet of coordinates per vertex or in a lossless compressed format understood by the TTU 700. In addition, an alpha bit may be provided per triangle or other primitive, indicating triangles that require special handling by software to determine whether the triangle is actually intersected by a given ray. Triangle buffers can be organized into blocks. There may also be a per-triangle force-no-cull function bit. When set, that bit indicates that both sides of the triangle should be treated as front-facing or back-facing with respect to culling, i.e., the triangle should not be culled because the ray intersects the "back" instead of the "front". The simplest use case for this is a single triangle used to represent a leaf, where we can still see the leaf if the ray hits it on the back surface.

The TTU 700 in some embodiments is stateless, meaning that no architectural state is maintained in the TTU between queries. At the same time, it is often useful for software running on the SM 1840 to request continuation of a previous query, which implies that relevant state should be written to registers by the TTU 700 and then passed back to the TTU in registers (often in-place) to continue. This state may take the form of a traversal stack that tracks progress in the traversal of the BVH.

A small number of stack initializers may also be provided for beginning a new query of a given type, for example:
  Traversal starting from a complet
  Intersection of a ray with a range of triangles
  Intersection of a ray with a range of triangles, followed by traversal starting from a complet
  Vertex fetch from a triangle buffer for a given triangle
  Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 700 can return to the SM. Example node types are:

A child complet (i.e., an internal node)
By default, the TTU 700 continues traversal by descending into child complets.

A triangle range, corresponding to a contiguous set of triangles within a triangle buffer
  (1) By default, triangle ranges encountered by a ray are handled natively by the TTU 700 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
  (2) By default, intersected triangles with the alpha bit set are returned to SM 1840 even if traversal has not completed. The returned traversal stack contains the state required to continue traversal if software determines that the triangle was in fact transparent.
  (3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.

An item range, consisting of an index (derived from a user-provided "item range base" stored in the complet) and a count of items.
  By default, item ranges are returned to SM 1840 as an "ItemRange" hit type, consisting of for example an index, a count, and the t-value of the intersection with the leaf bounding box.

An instance node.
  The TTU 700 in some embodiments can handle one level of instancing natively by transforming the ray into the coordinate system of the instance BVH. Additional levels of instancing (or every other level of instancing, depending on strategy) may be handled in software. The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 700.

Additional mode flags may be provided for control handling of alpha triangles.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased data transmission between the processing devices.

Figure 25:
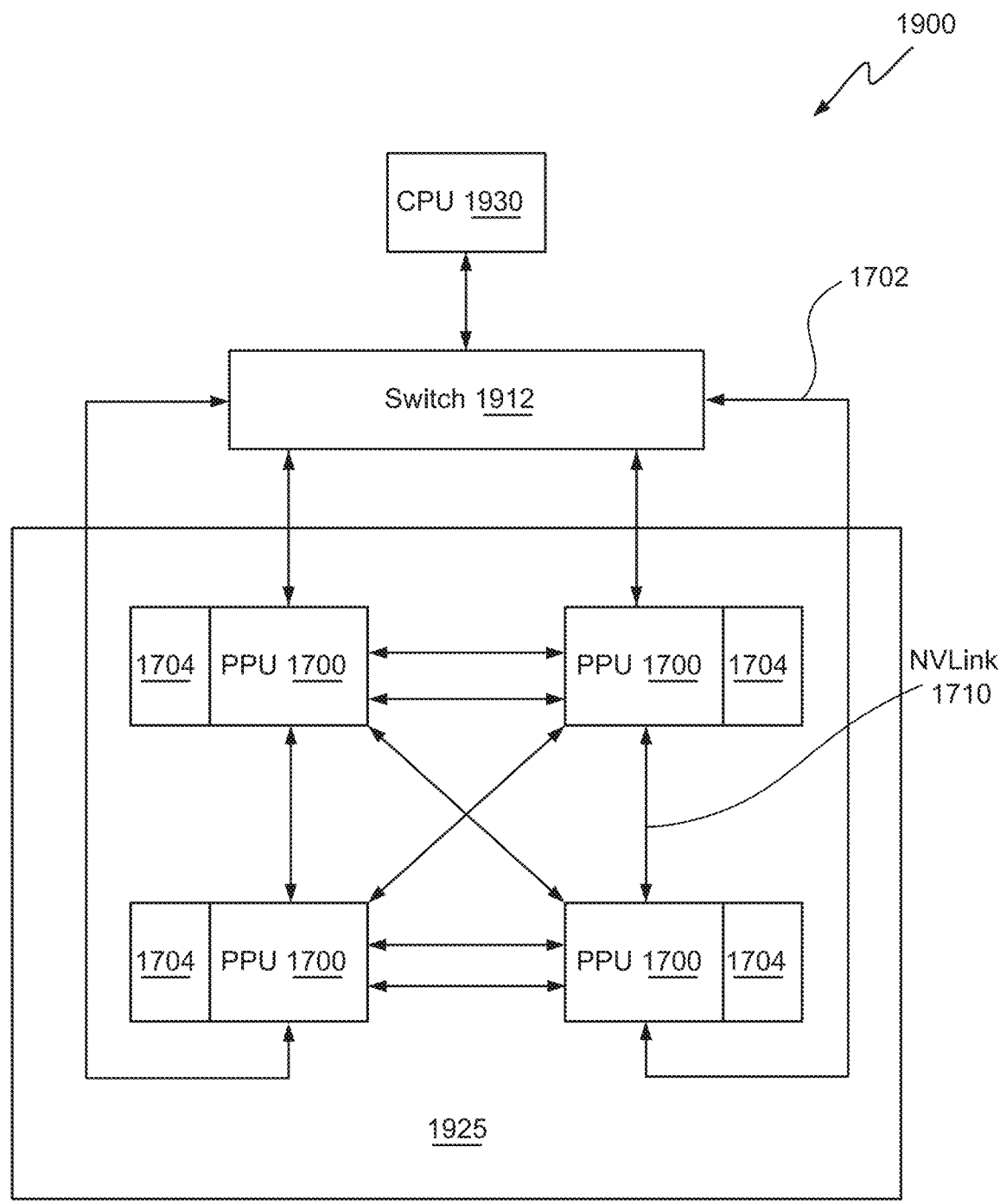
FIG. 25 is a conceptual diagram of a processing system implemented using PPUs of FIG. 19.

FIG. 25 is a conceptual diagram of a processing system 1900 implemented using the PPU 1700 of FIG. 19, in accordance with an embodiment. The exemplary system 1900 may be configured to implement one or more methods disclosed in this application. The processing system 1900 includes a CPU 1930, switch 1912, and multiple PPUs 1700 each and respective memories 1704. The NVLink 1710 provides high-speed communication links between each of the PPUs 1700. Although a particular number of NVLink 1710 and interconnect 1702 connections are illustrated in FIG. 25, the number of connections to each PPU 1700 and the CPU 1930 may vary. The switch 1912 interfaces between the interconnect 1702 and the CPU 1930. The PPUs 1700, memories 1704, and NVLinks 1710 may be situated on a single semiconductor platform to form a parallel processing module 1925. In an embodiment, the switch 1912 supports two or more protocols to interface between various different connections and/or links.

In another embodiment (not shown), the NVLink 1710 provides one or more high-speed communication links between each of the PPUs 1700 and the CPU 1930 and the switch 1912 interfaces between the interconnect 1702 and each of the PPUs 1700. The PPUs 1700, memories 1704, and interconnect 1702 may be situated on a single semiconductor platform to form a parallel processing module 1925. In yet another embodiment (not shown), the interconnect 1702 provides one or more communication links between each of the PPUs 1700 and the CPU 1930 and the switch 1912 interfaces between each of the PPUs 1700 using the NVLink 1710 to provide one or more high-speed communication links between the PPUs 1700. In another embodiment (not shown), the NVLink 1710 provides one or more high-speed communication links between the PPUs 1700 and the CPU 1930 through the switch 1912. In yet another embodiment (not shown), the interconnect 1702 provides one or more communication links between each of the PPUs 1700 directly. One or more of the NVLink 1710 high-speed communication links may be implemented as a physical NVLink interconnect or either an on-chip or on-die interconnect using the same protocol as the NVLink 1710.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1925 may be implemented as a circuit board substrate and each of the PPUs 1700 and/or memories 1704 may be packaged devices. In an embodiment, the CPU 1930, switch 1912, and the parallel processing module 1925 are situated on a single semiconductor platform.

In an embodiment, the signaling rate of each NVLink 1710 is 20 to 25 Gigabits/second and each PPU 1700 includes six NVLink 1710 interfaces (as shown in FIG. 25, five NVLink 1710 interfaces are included for each PPU 1700). Each NVLink 1710 provides a data transfer rate of 25 Gigabytes/second in each direction, with six links providing 1700 Gigabytes/second. The NVLinks 1710 can be used exclusively for PPU-to-PPU communication as shown in FIG. 25, or some combination of PPU-to-PPU and PPU-to-CPU, when the CPU 1930 also includes one or more NVLink 1710 interfaces.

In an embodiment, the NVLink 1710 allows direct load/store/atomic access from the CPU 1930 to each PPU's 1700 memory 1704. In an embodiment, the NVLink 1710 supports coherency operations, allowing data read from the memories 1704 to be stored in the cache hierarchy of the CPU 1930, reducing cache access latency for the CPU 1930. In an embodiment, the NVLink 1710 includes support for Address Translation Services (ATS), allowing the PPU 1700 to directly access page tables within the CPU 1930. One or more of the NVLinks 1710 may also be configured to operate in a low-power mode.

Figure 26:
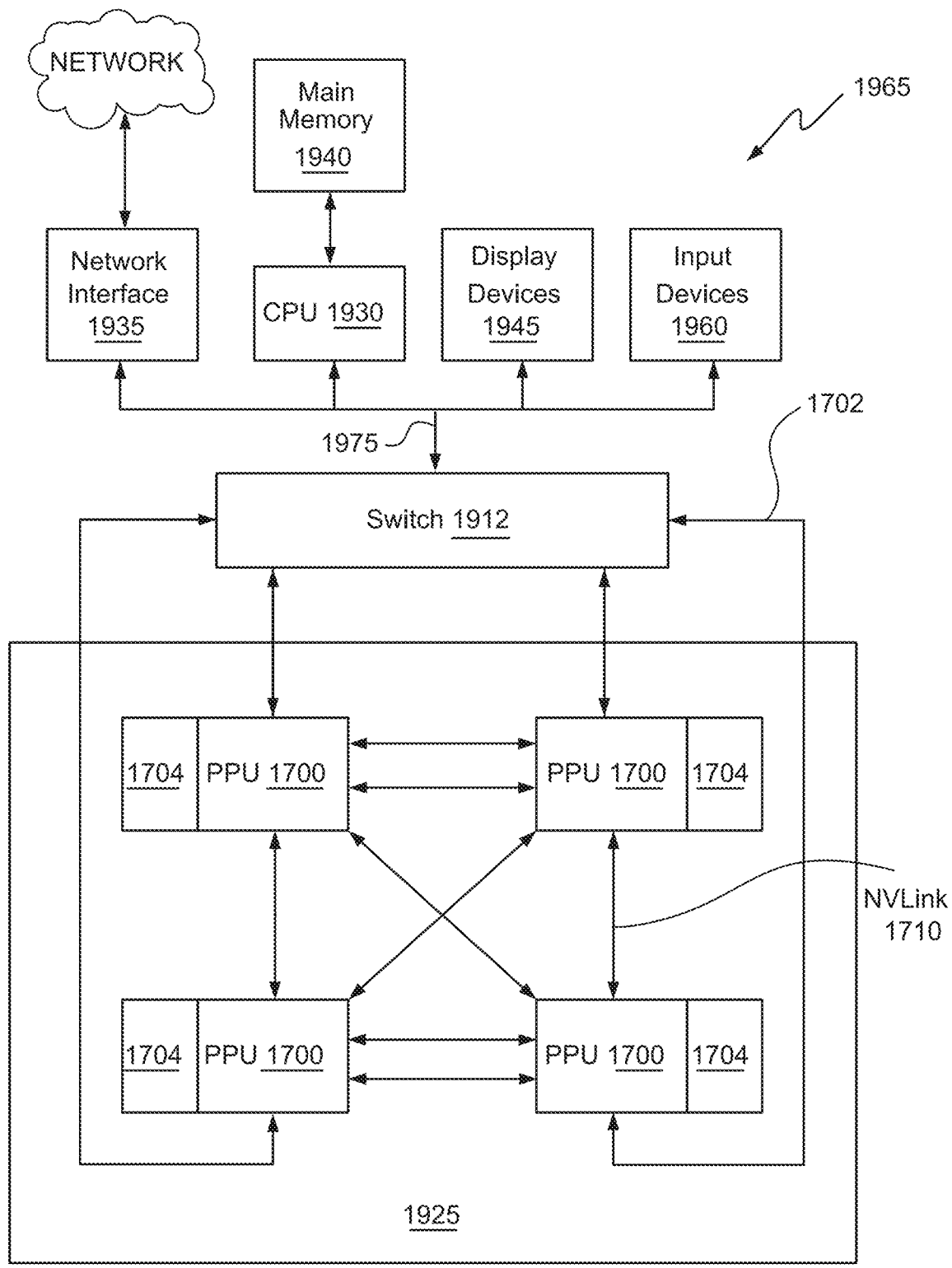
FIG. 26 expands FIG. 25 to show additional interconnected devices.

FIG. 26 illustrates an exemplary system 1965 in which the various architecture and/or functionality of the various previous embodiments may be implemented. The exemplary system 1965 may be configured to implement one or more methods disclosed in this application.

As shown, a system 1965 is provided including at least one central processing unit 1930 that is connected to a communication bus 1975. The communication bus 1975 may be implemented using any suitable protocol, such as PCI (Peripheral Component Interconnect), PCI-Express, AGP (Accelerated Graphics Port), HyperTransport, or any other bus or point-to-point communication protocol(s). The system 1965 also includes a main memory 1940. Control logic (software) and data are stored in the main memory 1940 which may take the form of random access memory (RAM).

The system 1965 also includes input devices 1960, the parallel processing system 1925, and display devices 1945, i.e. a conventional CRT (cathode ray tube), LCD (liquid crystal display), LED (light emitting diode), plasma display or the like. User input may be received from the input devices 1960, e.g., keyboard, mouse, touchpad, microphone, and the like. Each of the foregoing modules and/or devices may even be situated on a single semiconductor platform to form the system 1965. Alternately, the various modules may also be situated separately or in various combinations of semiconductor platforms per the desires of the user.

Further, the system 1965 may be coupled to a network (e.g., a telecommunications network, local area network (LAN), wireless network, wide area network (WAN) such as the Internet, peer-to-peer network, cable network, or the like) through a network interface 1935 for communication purposes.

The system 1965 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1940 and/or the secondary storage. Such computer programs, when executed, enable the system 1965 to perform various functions. The memory 1940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Machine Learning

Deep neural networks (DNNs) developed on processors, such as the PPU 1700 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1700. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1700 is a computing platform capable of delivering performance required for deep neural network-based artificial intelligence and machine learning applications.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system including:
    memory configured to store at least a portion of an acceleration data structure including a plurality of hierarchical nodes, at least one node identifying primitives of a virtual scene; and
    hardware circuitry operatively coupled to the memory configured to:
        determine, in an order the primitives identified in the at least one node are received from the memory, primitives which are intersected by a ray; and
        report at least a portion of the primitives the ray is determined to intersect, wherein based on two or more primitives the ray is determined to intersect having a same parametric length intersection along the ray, deterministically reporting a single primitive intersection of the two or more primitives, wherein the primitives identified in the at least one node are received in cache line sized blocks, each of the cache line sized blocks including a different set of primitives identified in the at least one node, and the cache line sized blocks are returned from the memory in an order that is different from the memory address order the cache line sized blocks are stored in the memory.

2. The system of claim 1, wherein the portion of the primitives the ray is determined to intersect are reported in the memory order the primitives are stored in the memory regardless of the order the primitives identified in the at least one node are received from the memory.

3. The system of claim 1, wherein each of the primitives the ray is determined to be intersected and reported is an opaque primitive.

4. The system of claim 1, wherein each of the two or more primitives having the same parametric length intersection along the ray is an opaque primitive.

5. The system of claim 1, wherein the single primitive intersection of the two or more primitives that is reported is stored earlier in a memory order the two or more primitives are stored in the memory.

6. A system including:
memory configured to store at least a portion of an acceleration data structure including a plurality of hierarchical nodes, at least one node identifying primitives of a virtual scene; and
hardware circuitry operatively coupled to the memory configured to:
determine, in an order the primitives identified in the at least one node are received from the memory, primitives which are intersected by a ray; and
report at least a portion of the primitives the ray is determined to intersect, wherein based on two or more primitives the ray is determined to intersect having a same parametric length intersection along the ray, deterministically reporting a single primitive intersection of the two or more primitives, wherein the portion of the primitives the ray is determined to intersect is reported in the memory order the primitives are stored in the memory while omitting from the report one or more primitives which are provably capable of being omitted without a functional impact on visualizing the virtual scene.

7. The system of claim 6, wherein the primitives intersected by the ray which are provably capable of being omitted without the functional impact on visualizing the virtual scene are parametrically farther away from an origin of the ray than another primitive determined to be intersected by the ray.

8. The system of claim 7, wherein the omitted one or more primitives include at least one opaque primitive.

9. A method implemented by a hardware-based traversal coprocessor coupled to a processor and memory configured to store at least a portion of an acceleration data structure including a plurality of hierarchical nodes, at least one node identifying primitives of a virtual scene, the method comprising:
determining, in an order the primitives identified in the at least one node are received from the memory, primitives which are intersected by a ray; and
report at least a portion of the primitives the ray is determined to intersect, wherein based on two or more primitives the ray is determined to intersect having a same parametric length intersection along the ray, deterministically reporting a single primitive intersection of the two or more primitives,
wherein the primitives identified in the at least one node are received in cache line sized blocks, each of the cache line sized blocks including a different set of primitives identified in the at least one node, and the cache line sized blocks are returned from the memory in an order that is different from the memory address order the cache line sized blocks are stored in the memory.

10. The method of claim 9, wherein the portion of the primitives the ray is determined to intersect are reported in the memory order the primitives are stored in the memory regardless of the order the primitives identified in the at least one node are received from the memory.

11. The method of claim 9, wherein each of the primitives the ray is determined to be intersected and reported is an opaque primitive.

12. The method of claim 9, wherein each of the two or more primitives having the same parametric length intersection along the ray is an opaque primitive.

13. The method of claim 9, wherein the single primitive intersection of the two or more primitives that is reported is stored earlier in a memory order the two or more primitives are stored in the memory.

14. A method implemented by a hardware-based traversal coprocessor coupled to a processor and memory configured to store at least a portion of an acceleration data structure including a plurality of hierarchical nodes, at least one node identifying primitives of a virtual scene, the method comprising:
determining, in an order the primitives identified in the at least one node are received from the memory, primitives which are intersected by a ray; and
report at least a portion of the primitives the ray is determined to intersect, wherein based on two or more primitives the ray is determined to intersect having a same parametric length intersection along the ray, deterministically reporting a single primitive intersection of the two or more primitives,
wherein the portion of the primitives the ray is determined to intersect is reported in the memory order the primitives are stored in the memory while omitting from the report one or more primitives which are provably capable of being omitted without a functional impact on visualizing the virtual scene.

15. The method of claim 14, wherein the primitives intersected by the ray which are provably capable of being omitted without the functional impact on visualizing the virtual scene are parametrically farther away from an origin of the ray than another primitive determined to be intersected by the ray.

16. The method of claim 15, wherein the omitted one or more primitives include at least one opaque primitive.

17. A system including:
memory configured to store at least a portion of an acceleration data structure including a plurality of hierarchical nodes, at least one node identifying primitives of a virtual scene stored in a plurality of data blocks; and
hardware circuitry operatively coupled to the memory configured to:
determine primitives in the plurality of data blocks which are intersected by a ray; and
report at least a portion of the primitives the ray is determined to intersect in a memory order the primitives are stored in the memory regardless of the order the plurality of data blocks are returned from the memory and while omitting from the report one or more primitives in the plurality of data blocks determined to be intersected by the ray,
wherein each of the plurality of data blocks are cache line sized blocks, each of the cache line sized blocks including a different set of primitives associated with at least one node of an acceleration data structure, and the cache line sized blocks are returned from the memory in an order that is different from the memory address order the cache line sized blocks are stored in the memory.

18. The system of claim 17, wherein the plurality of data blocks are returned from the memory in an order that is different from an order the plurality of data blocks are stored in the memory.

19. A system including:
memory configured to store at least a portion of an acceleration data structure including a plurality of hierarchical nodes, at least one node identifying primitives of a virtual scene stored in a plurality of data blocks; and hardware circuitry operatively coupled to the memory configured to:
  determine primitives in the plurality of data blocks which are intersected by a ray; and
  report at least a portion of the primitives the ray is determined to intersect in a memory order the primitives are stored in the memory regardless of the order the plurality of data blocks are returned from the memory and while omitting from the report one or more primitives in the plurality of data blocks determined to be intersected by the ray,
  wherein the omitted one or more primitives from the report include primitives which are provably capable of being omitted without a functional impact on visualizing the virtual scene.

20. A method implemented by a hardware-based traversal coprocessor coupled to a processor and memory configured to store at least a portion of an acceleration data structure including a plurality of hierarchical nodes, at least one node identifying primitives of a virtual scene stored in a plurality of data blocks, the method comprising:
  determining primitives in the plurality of data blocks which are intersected by a ray; and
  reporting at least a portion of the primitives the ray is determined to intersect in a memory order the primitives are stored in the memory regardless of the order the plurality of data blocks are returned from the memory and while omitting from the report one or more primitives in the plurality of data blocks determined to be intersected by the ray,
  wherein each of the plurality of data blocks are cache line sized blocks, each of the cache line sized blocks including a different set of primitives associated with at least one node of an acceleration data structure, and the cache line sized blocks are returned from the memory in an order that is different from the memory address order the cache line sized blocks are stored in the memory.

21. The method of claim 20, wherein the plurality of data blocks are returned from the memory in an order that is different from an order the plurality of data blocks are stored in the memory.

22. A method implemented by a hardware-based traversal coprocessor coupled to a processor and memory configured to store at least a portion of an acceleration data structure including a plurality hierarchical nodes, at least one node identifying primitives of a virtual scene stored in a plurality of data blocks, the method comprising:
  determining primitives in the plurality of data blocks which are intersected by a ray; and
  reporting at least a portion of the primitives the ray is determined to intersect in a memory order the primitives are stored in the memory regardless of the order the plurality of data blocks are returned from the memory and while omitting from the report one or more primitives in the plurality of data blocks determined to be intersected by the ray,
  wherein the omitted one or more primitives from the report include primitives which are provably capable of being omitted without a functional impact on visualizing the virtual scene.

* * * * *